(12) United States Patent
Richardson et al.

(10) Patent No.: US 10,007,587 B2
(45) Date of Patent: Jun. 26, 2018

(54) SYSTEMS AND METHODS FOR PRE-GENERATION AND PRE-STORAGE OF REPAIR FRAGMENTS IN STORAGE SYSTEMS

(71) Applicant: QUALCOMM Incorporated, San Diego, CA (US)

(72) Inventors: Thomas Joseph Richardson, South Orange, NJ (US); Michael George Luby, Berkeley, CA (US)

(73) Assignee: QUALCOMM Incorporated, San Diego, CA (US)

( * ) Notice: Subject to any disclaimer, the term of this patent is extended or adjusted under 35 U.S.C. 154(b) by 225 days.

(21) Appl. No.: 14/954,855

(22) Filed: Nov. 30, 2015

(65) Prior Publication Data

US 2017/0083416 A1    Mar. 23, 2017

Related U.S. Application Data

(60) Provisional application No. 62/220,780, filed on Sep. 18, 2015.

(51) Int. Cl.
*G06F 11/20*  (2006.01)
*G06F 11/16*  (2006.01)
*G06F 11/10*  (2006.01)

(52) U.S. Cl.
CPC ...... *G06F 11/2094* (2013.01); *G06F 11/1092* (2013.01); *G06F 11/1666* (2013.01); *G06F 2201/845* (2013.01)

(58) Field of Classification Search
CPC ...................................................... G06F 11/20
(Continued)

(56) References Cited

U.S. PATENT DOCUMENTS 5,485,571 A * 1/1996 Menon ................ G06F 11/1076
714/6.32
7,120,826 B2   10/2006 Fore et al.
(Continued)

FOREIGN PATENT DOCUMENTS

CN     103513942 A    1/2014
EP       2365439 A1   9/2011

OTHER PUBLICATIONS

International Search Report and Written Opinion—PCT/US2016/044557—ISA/EPO—dated Oct. 10, 2016.
(Continued)

*Primary Examiner* — Kamini B Patel
(74) *Attorney, Agent, or Firm* — Norton Rose Fulbright LLP

(57) ABSTRACT

Systems and methods utilizing available storage space within a storage system (e.g., as "supplemental" storage) and/or implement less physical storage space in the storage system (e.g., reduced storage overhead) through operation of fragment pre-storage techniques are disclosed. Such fragment pre-storage utilization of the aforementioned available storage space may provide operation emulating larger storage overhead than is actually provided in the storage system, facilitate improved repair rates, and/or facilitate reduced repair bandwidth in the storage system according to embodiments. A fragment pre-storage repair policy may implement source object repair whereby additional fragments for the source object are pre-generated and pre-stored in the storage system as transient fragments, whereby the transient fragments are moved to corresponding storage nodes when those storage nodes become physically present in the storage system.

39 Claims, 27 Drawing Sheets

(58) Field of Classification Search
USPC .......................................................... 714/6.3
See application file for complete search history.

(56) References Cited

U.S. PATENT DOCUMENTS

| | | | | |
|---|---|---|---|---|
| 8,099,623 B1* | 1/2012 | Li | ........................ | G06F 11/1084 |
| | | | | 714/6.22 |
| 8,631,269 B2* | 1/2014 | Vinayak | .............. | G06F 11/1662 |
| | | | | 714/4.11 |
| 9,305,666 B2* | 4/2016 | Rakitzis | .............. | G06F 11/2094 |
| 2004/0250161 A1 | 12/2004 | Patterson | | |
| 2010/0037056 A1* | 2/2010 | Follis | .................. | G06F 11/1464 |
| | | | | 713/171 |
| 2015/0358037 A1* | 12/2015 | Li | ........................ | G06F 11/1088 |
| | | | | 714/763 |
| 2016/0011935 A1* | 1/2016 | Luby | ..................... | G06F 3/0617 |
| | | | | 714/6.2 |
| 2016/0011936 A1* | 1/2016 | Luby | ..................... | G06F 3/0617 |
| | | | | 714/6.2 |
| 2016/0011939 A1* | 1/2016 | Luby | ................... | G06F 11/1076 |
| | | | | 714/764 |

OTHER PUBLICATIONS

Abd-El-Malek M., et al., "Lazy Verification in Fault-Tolerant Distributed Storage Systems," Proceedings of the 2005 24th IEEE Symposium on Reliable Distributed Systems (SRDS'05), 2005, pp. 179-190.

Chandy J.A., "A Generalized Replica Placement Strategy to Optimize Latency in a Wide Area Distributed Storage System," Proceedings of the 2008 International Workshop on Data-Aware Distributed Computing, 2008, 5 Pages.

Dimakis A.G., et al., "Network Coding for Distributed Storage Systems," IEEE Transactions on Information Theory, Mar. 5, 2008, pp. 1-12.

Duminuco A., et al., "Proactive Replication in Distributed Storage Systems Using Machine Availability Estimation," CoNEXT, Dec. 2007, 12 pages.

* cited by examiner

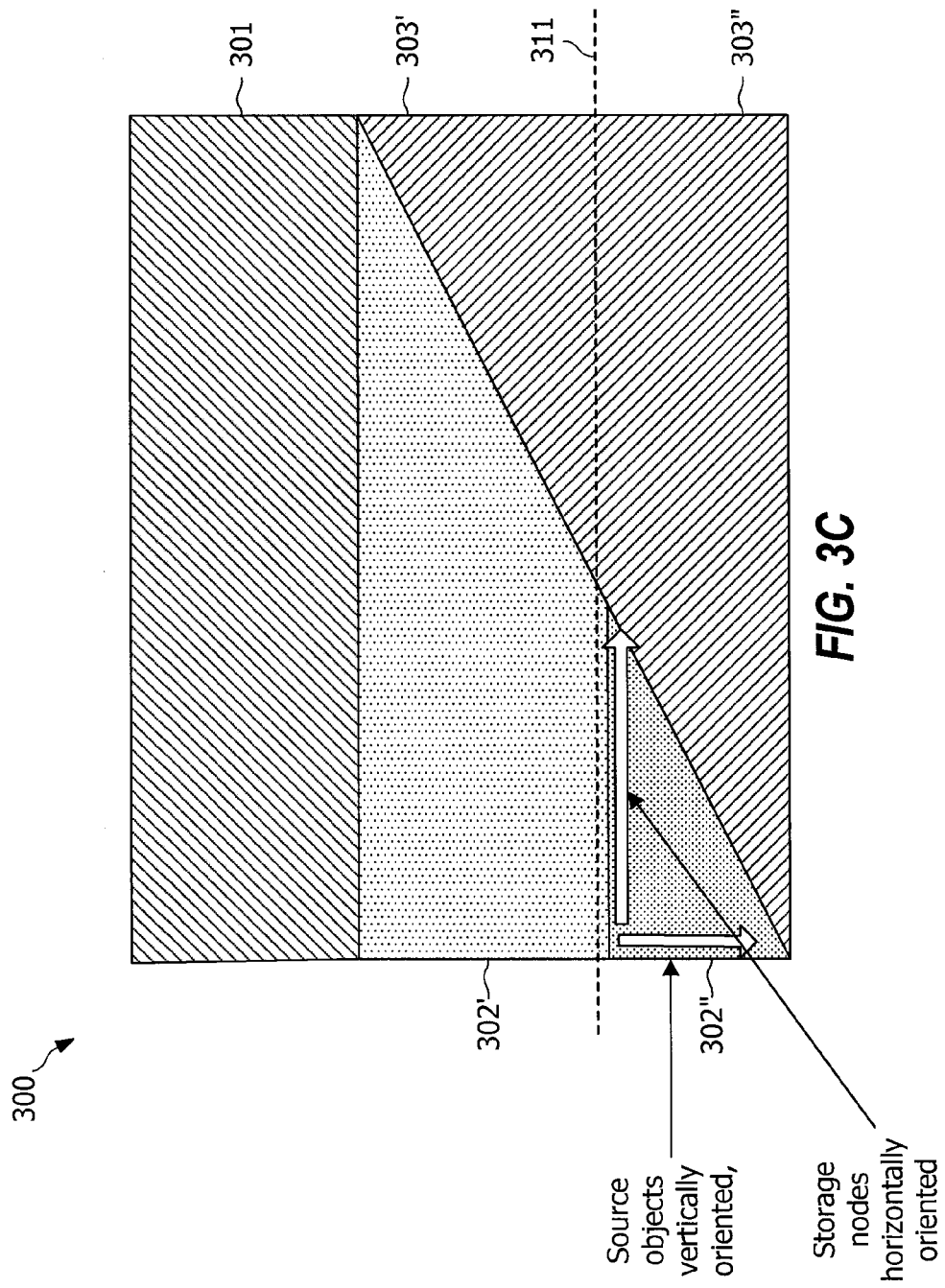

FIG. 4K

SYSTEMS AND METHODS FOR PRE-GENERATION AND PRE-STORAGE OF REPAIR FRAGMENTS IN STORAGE SYSTEMS

CROSS-REFERENCE TO RELATED APPLICATIONS

This application claims the benefit of U.S. Provisional Patent Application No. 62/220,780 entitled, "SYSTEMS AND METHODS FOR PRE-GENERATION AND PRE-STORAGE OF REPAIR FRAGMENTS IN STORAGE SYSTEMS", filed on Sep. 18, 2015, which is expressly incorporated by reference herein in its entirety

DESCRIPTION OF THE RELATED ART

The creation, management, storage, and retrieval of electronic data has become nearly ubiquitous in the day-to-day world. Such electronic data may comprise various forms of information, such as raw data (e.g., data collected from sensors, monitoring devices, control systems, etc.), processed data (e.g., metrics or other results generated from raw data, data aggregations, filtered data, etc.), produced content (e.g., program code, documents, photographs, video, audio, etc.), and/or the like. Such data may be generated by various automated systems (e.g., network monitors, vehicle on-board computer systems, automated control systems, etc.), by user devices (e.g., smart phones, personal digital assistants, personal computers, digital cameras, tablet devices, etc.), and/or a number of other devices.

Regardless of the particular source or type of data, large quantities of electronic data are generated, stored, and accessed every day. Accordingly sophisticated storage systems, such as network attached storage (NAS), storage area networks (SANs), and cloud based storage (e.g., Internet area network (IAN) storage systems), have been developed to provide storage of large amounts of electronic data. Such storage systems provide a configuration in which a plurality of storage nodes are used to store the electronic data of one or more users/devices, and which may be stored and retrieved via one or more access servers.

FIG. 1A shows an exemplary implementation of storage system 100A in which access server 110 is in communication with end user (EU) device 120 to provide storage services with respect thereto. Access server 110 may comprise one or more servers operable under control of an instruction set to receive data from devices such as EU device 120, and to control storage of the data and to retrieve data in response to requests from devices such as EU device 120. Accordingly, access server 110 is further in communication with a plurality, M, of storage nodes (shown here as storage nodes 130-1 through 130-M). Storage nodes 130-1 through 130-M may comprise a homogeneous or heterogeneous collection or array (e.g., redundant array of independent disks (RAID) array) of storage media (e.g., hard disk drives, optical disk drives, solid state drives, random access memory (RAM), flash memory, etc.) providing persistent memory in which the electronic data is stored by and accessible through access server 110. Each such storage node may be, for example, a commodity web server. Alternatively, in some deployments at least some storage nodes may be personal devices interconnected over the Internet. EU device 120 may comprise any configuration of device which operates to generate, manage, and/or access electronic data. It should be appreciated that although only a single such device is shown, storage system 100A may operate to serve a plurality of devices, some or all of which may comprise devices in addition to or in the alternative to devices characterized as "end user" devices.

FIG. 1B shows an exemplary implementation of storage system 100B in which access servers 110-1 through 110-14 may communicate with one or more EU devices of EU devices 120-1 through 120-3 to provide storage services with respect thereto. It should be appreciated that storage system 100B shows an alternative configuration to that of 100A discussed above wherein, although the access servers, EU devices, and storage nodes may be embodied as described above, the storage nodes of storage system 110B are deployed in a cluster configuration, shown as storage node cluster 130. In operation of storage system 100B, a cluster of access servers have access to the cluster of storage nodes. Thus, the EU devices may connect in a variety of ways to various access servers to obtain data services. In some cases, the access servers may be distributed around the country such that no matter where the EU device is located it may access the data stored in the storage node cluster. Storage nodes of such a configuration may be distributed geographically as well.

Source blocks of electronic data are typically stored in storage systems such as storage systems 100A and 100B as objects. Such source blocks, and thus the corresponding objects stored by the storage systems, may comprise individual files, collections of files, data volumes, data aggregations, etc. and may be quite large (e.g., on the order of megabytes, gigabytes, terabytes, etc.). The objects are often partitioned into smaller blocks, referred to as fragments (e.g., a fragment typically consisting of a single symbol), for storage in the storage system. For example, an object may be partitioned into k equal-sized fragments (i.e., the fragments comprise blocks of contiguous bytes from the source data) for storage in storage systems 100A and 100B. Each of the k fragments may, for example, be stored on a different one of the storage nodes.

In operation, storage systems such as storage systems 100A and 100B are to provide storage of and access to electronic data in a reliable and efficient manner. For example, in a data write operation, access server 110 may operate to accept data from EU device 120, create objects from the data, create fragments from the objects, and write the fragments to some subset of the storage nodes. Correspondingly, in a data read operation, access server 110 may receive a request from EU device 120 for a portion of stored data, read appropriate portions of fragments stored on the subset of storage nodes, recreate the object or appropriate portion thereof, extract the requested portion of data, and provide that extracted data to EU device 120. However, the individual storage nodes are somewhat unreliable in that they can intermittently fail, in which case the data stored on them is temporarily unavailable, or permanently fail, in which case the data stored on them is permanently lost (e.g., as represented by the failure of storage node 130-2 in FIG. 1C).

Erasure codes (e.g., tornado codes, low-density parity-check codes, Reed-Solomon coding, and maximum distance separable (MDS) codes) have been used to protect source data against loss when storage nodes fail. When using an erasure code, such as MDS erasure codes, erasure encoding is applied to each source fragment (i.e., the k fragments into which an object is partitioned) of an object to generate repair data for that fragment, wherein the resulting repair fragments are of equal size with the source fragments. In operation of the storage system, the source fragments and corresponding repair fragments are each stored on a different one of the storage nodes.

The erasure code may provide r repair fragments for each source object, whereby the total number of fragments, n, for a source object may be expressed as n=k+r. Thus, the erasure code may be parameterized as (n; k; r) where k is the number of source symbols in a source block, n is the total number of encoded symbols, and r=n−k is the number of repair symbols. A property of MDS erasure codes is that all k source symbols can be recovered from any k of the n encoded symbols (i.e., the electronic data of the source block may be retrieved by retrieving any combination (source and/or repair fragments) of k fragments. Although providing data reliability, it should be appreciated that where desired data is not directly available (e.g., a fragment is unavailable due to a failed storage node), to recreate the missing data k fragments must be accessed to recreate the missing data (i.e., k times the amount of data must be accessed to recreate the desired but missing data). This can result in inefficiencies with respect to the use of resources, such as communication bandwidth, computing resources, etc.

In providing reliable storage of the electronic data, storage systems such as storage systems 100A and 100B implementing erasure coding of the data (e.g., access server 110 of FIG. 1C operational to provide repair server functionality) have a repair process or policy running in the background to determine the number of fragments available with respect to the objects (e.g., to detect objects which are missing one or more fragments, such as due to a failed storage node). For objects with some level of missing fragments (e.g., as the number of available fragments approaches k) logic of the storage system repair process will read k remaining fragments for that object and recreate the object and write additional fragments to the storage system (e.g., on other of the storage nodes which remain available). Typically, the objects for which the fewest fragments are available are the ones that are repaired first, before objects that have more fragments available (assuming an equal number of fragments for the objects), according to such repair policies.

It should be appreciated that, although the example of FIG. 1C illustrates a repair server as being implemented by access server 110, repair servers operable to provide repair services herein may be provided in various configurations. For example, one or more repair servers may be provided separately from access servers of a storage system according to embodiments. As another example, repair servers and or access servers may be implemented by storage nodes 130-1 through 130-M.

The aforementioned intermittent node failures are far more typical than permanent node failures (e.g., 90% of the node failures are intermittent), and the repair policy is not needed to recover the data that is temporarily unavailable on these nodes as eventually this data will become available again when the node comes back online. Accordingly, when fragments become unavailable the repair process may detect and delay repairing the data for some period of time, T (e.g., intermittent failure threshold time), to determine whether the failure is intermittent or permanent.

The erasure code solutions that have been implemented with respect to storage systems have been small erasure code solutions due to their suitability for relatively rapid recreation of missing source data. An (n; k; r) erasure code solution is said to be a small erasure code solution if n<<M (i.e., for each source object there are fragments at a small fraction of the storage nodes). Such a small erasure code configuration (e.g., k=10) generally comprises a correspondingly small number of repair fragments (e.g., r=4, thus n=14). Accordingly, for a small erasure code solution it is beneficial to use a reactive repair policy (i.e., when a fragment of an object is lost due to a permanent node failure then the repair policy immediately or as quickly as possible replaces the lost fragment with another fragment in light of the total number of fragments, n, being so near the minimum number of fragments, k, needed to recover the data). Because a large amount of data is stored on each node (typically many terabytes), and all data comprising fragments stored on a node typically needs to be replaced when the node permanently fails, the repair process reads and writes a large amount of data after a node permanently fails. This reading and writing of large amounts of data generally results in the consumption of large amounts of bandwidth in the storage system by the repair policy and, when coupled with a reactive repair policy, can result in disruptive spikes in storage system bandwidth utilization (e.g., delaying or preventing primary data access services by the storage system). That is, the repair policy implemented with respect to a small erasure code configuration may act somewhat erratically whereby it utilizes a large amount of bandwidth for periods of time when attempting to repair data immediately upon determining fragments are unavailable due to a permanently failed node.

SUMMARY

A method, implemented by processor-based logic of a storage system storing source objects as a plurality of erasure coded fragments, for pre-storing transient fragments for one or more of the source objects is provided according to embodiments herein. The method of embodiments includes generating, by a repair process of the processor-based logic, fragments for a first source object represented in a repair queue, wherein the generated fragments include first one or more fragments for one or more storage nodes that are not physically present in the storage system at a time of the generating the fragments for the first source object. Embodiments of the method further include storing the first one or more fragments for the one or more storage nodes that are not physically present as first one or more transient fragments temporarily stored for moving to an added storage node corresponding to the one or more storage nodes that are not physically present when the corresponding added storage node is physically present in the storage system.

An apparatus for pre-storing transient fragments for one or more source objects stored by a storage system as a plurality of erasure coded fragments is provided according to further embodiments herein. The apparatus of embodiments includes one or more data processors and one or more non-transitory computer-readable storage media containing program code configured to cause the one or more data processors to perform particular operations. The operations performed according to embodiments include generating fragments for a first source object represented in a repair queue, wherein the generated fragments include first one or more fragments for one or more storage nodes that are not physically present in the storage system at a time of the generating the fragments for the first source object. The operations performed according to embodiments further include storing the first one or more fragments for the one or more storage nodes that are not physically present as first one or more transient fragments temporarily stored for moving to an added storage node corresponding to the one or more storage nodes that are not physically present when the corresponding added storage node is physically present in the storage system.

An apparatus for pre-storing transient fragments for one or more source objects stored by a storage system as a plurality of erasure coded fragments is provided according to still further embodiments herein. The apparatus of embodiments includes means for generating fragments for a first source object represented in a repair queue, wherein the generated fragments include first one or more fragments for one or more storage nodes that are not physically present in the storage system at a time of the generating the fragments for the first source object. The apparatus of embodiments further includes means for storing the first one or more fragments for the one or more storage nodes that are not physically present as first one or more transient fragments temporarily stored for moving to an added storage node corresponding to the one or more storage nodes that are not physically present when the corresponding added storage node is physically present in the storage system.

A non-transitory computer-readable medium comprising codes for pre-storing transient fragments for one or more source objects stored by a storage system as a plurality of erasure coded fragments is provided according to yet further embodiments herein. The codes of embodiments cause a computer to generate fragments for a first source object represented in a repair queue, wherein the generated fragments include first one or more fragments for one or more storage nodes that are not physically present in the storage system at a time of generating the fragments for the first source object. The codes of embodiments further cause a computer to store the first one or more fragments for the one or more storage nodes that are not physically present as first one or more transient fragments temporarily stored for moving to an added storage node corresponding to the one or more storage nodes that are not physically present when the corresponding added storage node is physically present in the storage system.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiments disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

FIGS. 3A-3E show repair queue organization of fragments stored within a storage system storage nodes according to embodiments of the present disclosure.

DETAILED DESCRIPTION

Figure 1A:
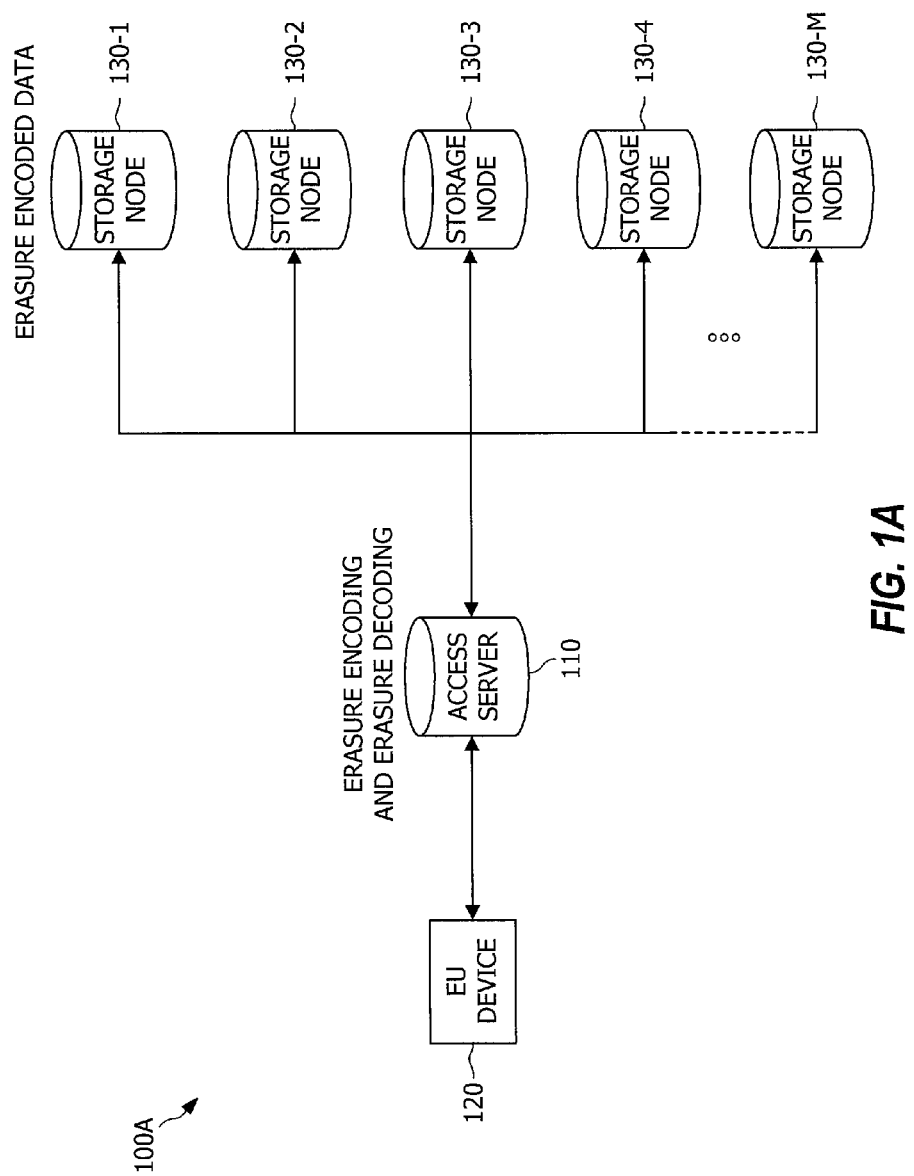
FIGS. 1A and 1B show exemplary implementations of storage systems as may be adapted to provide fragment pre-storage techniques according to embodiments of the present disclosure.
Figure 1B:
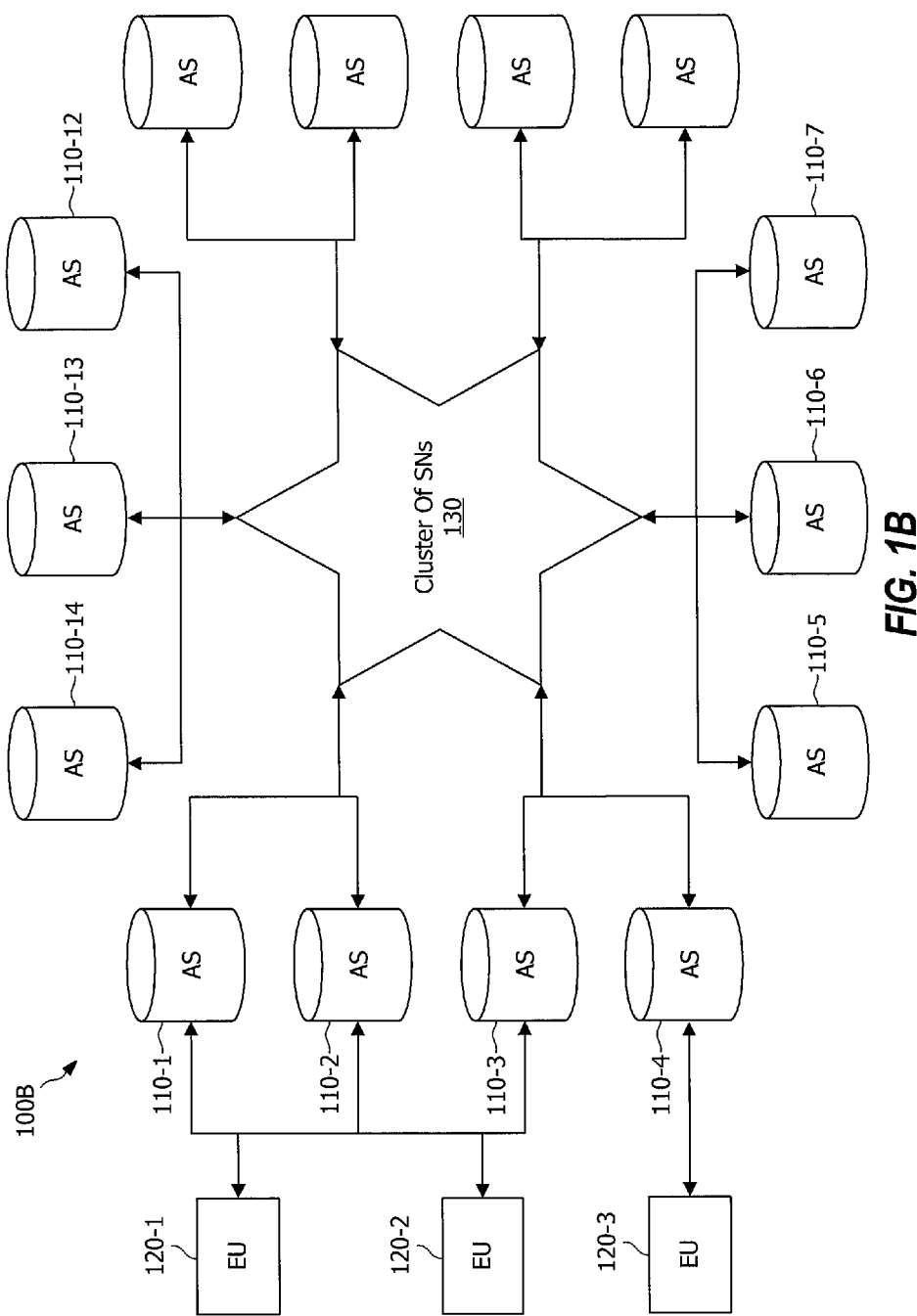
Figure 1C:
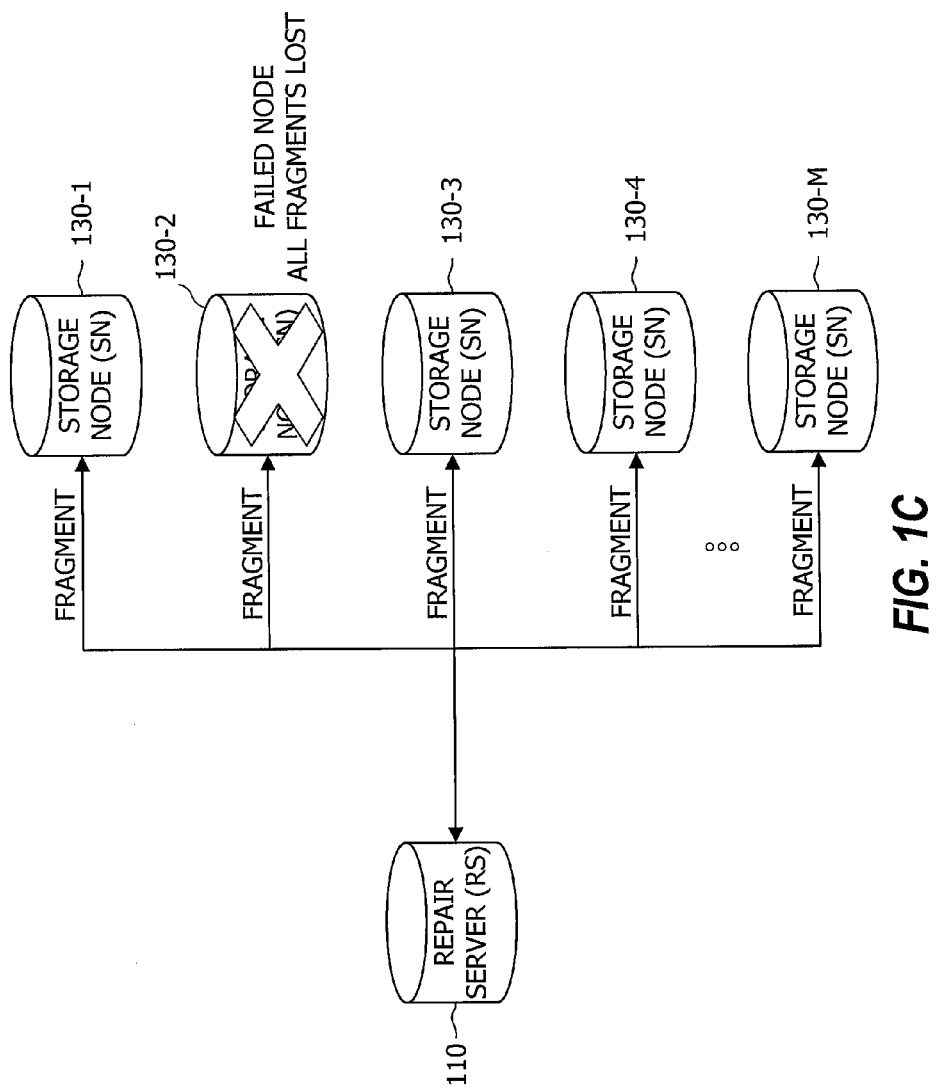
FIG. 1C shows failure of a storage node as may be experienced in the storage systems of FIGS. 1A and 1B.

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the terms "data" and "electronic data" may include information and content of various forms, including raw data, processed data, produced content, and/or the like, whether being executable or non-executable in nature. Such data may, for example, include data collected from sensors, monitoring devices, control systems, metrics or other results generated from raw data, data aggregations, filtered data, program code, documents, photographs, video, audio, etc. as may be generated by various automated systems, by user devices, and/or other devices.

As used in this description, the term "fragment" refers to one or more portions of content that may be stored at a storage node. For example, the data of a source object may be partitioned into a plurality of source fragments, wherein such source objects may comprise an arbitrary portion of source data, such as a block of data or any other unit of data including but not limited to individual files, collections of files, data volumes, data aggregations, etc. The plurality of source fragments may be erasure encoded to generate one or more corresponding repair fragments, whereby the repair fragment comprises redundant data with respect to the source fragments. The unit of data that is erasure encoded/decoded is a source block, wherein k is the number of source symbols per source block, Bsize is the source block size, Ssize is the symbol size (Bsize=k·Ssize), n is the number of encoded symbols generated and stored per source block, and r is the number of repair symbols (r=n−k), and wherein the symbol is the atomic unit of data for erasure encoding/decoding. Although the symbol size (Ssize) may be different for different source blocks, the symbol size generally remains the same for all symbols within a source block. Similarly, although the number of source symbols (k), the number of repair symbols (r), and the number of encoded symbols generated may be different for different source blocks, the values generally remain the same for all source blocks of a particular object. Osize is the size of the source object and Fsize is the size of the fragment (e.g., where k is both the number of source symbols per source block and the number of fragments per source object, Osize=k·Fsize).

As used in this description, the terms "component," "database," "module," "system," "logic" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

As used herein, the terms "user equipment," "user device," "end user device," and "client device" include devices capable of requesting and receiving content from a web server or other type of server and transmitting information to a web server or other type of server. In some cases, the "user equipment," "user device," "end user device," or "client device" may be equipped with logic that allows it to read portions or all of fragments from the storage nodes to recover portions or all of source objects. Such devices can be a stationary devices or mobile devices. The terms "user equipment," "user device," "end user device," and "client device" can be used interchangeably.

As used herein, the term "user" refers to an individual receiving content on a user device or on a client device and transmitting information or receiving information from a website or other storage infrastructure.

Embodiments according to the concepts of the present disclosure provide solutions with respect to storing and accessing source data in a reliable and efficient manner within a storage system of unreliable nodes (i.e., nodes that can store data but that can intermittently fail, in which case the data stored on them is temporarily unavailable, or permanently fail, in which case the data stored on them is permanently lost). In particular, embodiments herein provide methodologies, as may be implemented in various configurations of systems and methods, for reliably storing data and/or facilitating access to data within a storage system using fragment encoding techniques other than Maximum Distance Separable (MDS) codes, such as may utilize large erasure codes (e.g., RAPTOR Forward Error Correction (FEC) code as specified in IETF RFC 5053, and RAPTORQ Forward Error Correction (FEC) code as specified in IETF RFC 6330, of which software implementations are available from Qualcomm Incorporated). Although, large erasure codes have generally not been considered with respect to solutions for reliably and efficiently storing and accessing source data within a storage system of unreliable nodes due to potential demands on repair bandwidth and potential inefficient access when the desired data is not directly available, embodiments described in U.S. patent application Ser. Nos. 14/567,203, 14/567,249, and 14/567,303, each entitled "SYSTEMS AND METHODS FOR RELIABLY STORING DATA USING LIQUID DISTRIBUTED STORAGE," each filed Dec. 11, 2014, the disclosures of which are hereby incorporated herein by reference, utilize a lazy repair policy (e.g., rather than a reactive, rapid repair policy as typically implemented by systems implementing a short erasure code technique) to control the bandwidth utilized for data repair processing within the storage system. The large erasure code storage control of embodiments operates to compress repair bandwidth (i.e., the bandwidth utilized within a storage system for data repair processing) to the point of operating in a liquid regime (i.e., a queue of items needing repair builds up and the items are repaired as a flow), thereby providing large erasure code storage control in accordance with concepts herein.

In some embodiments, repair can be executed in such a way that if a first object has less available fragments than a second object, then the set of ESIs associated with the available fragments for the first object is a subset of the set of ESIs associated with the available fragments for the second object, i.e., all the available fragments for the first object are in common with the available fragments for the second object, and thus the ESIs of the available fragments for the first object are nested within the ESIs of the available fragments for the second object, in which case the available fragments for the first source object are referred to herein as commonly available for the first and second source objects. In this case, if an object with the least number of available fragments is decodable (recoverable) then all other objects are decodable (recoverable), and thus decodability of all the objects can be verified by verifying that decoding is possible from the (unique) set of ESIs associated with an object with the least number of available fragments, since all of the fragments available for an object with the least number of available fragments are common to the set of available fragments for any other object. More generally stated, a set of fragments is commonly available for a set of one or more source objects if each fragment in the set of fragments (e.g., as identified by its ESI) is available for each source object in the set of source objects. Thus verifying decodability with respect to a set of commonly available fragments (e.g., based on their ESIs) can be used to verify decodability of all source objects in the set of source objects. Thus, even if the ESIs for a set of source objects do not have the nesting property described above, a set of commonly available fragments for the set of source objects may still be determined and used to verify decodability of all source objects in the set of source objects. For example, a first source object may have available fragments identified by ESIs 0, 1, 2, 3, 4, 5, 6, whereas a second source object may have available fragments identified by ESIs 2, 3, 4, 5, 6, 7, 8, and thus even though this pair of source objects do not have the nesting property described above, the commonly available fragments for this pair of source objects can be identified by the ESIs 2, 3, 4, 5, 6, and if decodability is possible using only these commonly available fragments then decoding is possible for both source objects. Thus verifying decodability with respect to a set of commonly available fragments (e.g., based on their ESIs) can be used to verify decodability of all source objects in a set of source objects.

It should be appreciated that there are various metrics by which to evaluate a storage system solution. Such metrics include reliability, storage efficiency, repair bandwidth efficiency, and access efficiency.

Reliability provides a measure of the amount of time that all source data can be stored without loss of any of the data. Reliability is usually measured as a mean time to source data loss, and typically measured in years. The reliability metric used in accordance with some embodiments herein is the mean time to loss of any source data, or mean time to data loss (MTTDL). MTTDL is sometimes estimated, for example, by calculating a mean time to loss of a particular piece of source data and multiplying that metric by the number of pieces of source data in the storage system. However, the accuracy of this estimate method relies upon the assumption that each piece of source data is lost independently of other pieces, and this assumption may not be true for some systems.

Storage efficiency provides a measure of the fraction of the available storage within the storage system that can be used to store source data. Storage efficiency ($\alpha$) measures the ratio of the total size of source objects in the system to the total target amount of data used to store the source objects, and the storage overhead or storage redundancy ($\beta$) is 1-$\alpha$. That is, storage overhead or storage redundancy is the ratio of the total target amount of repair data for all objects divided by the total target amount of source and repair data for all objects in the storage system when using a systematic erasure code to store the objects. Thus, the storage overhead is the target fraction of the used storage that is not for source data. The storage efficiency ($\alpha$), being the target fraction of storage usable for source data, may thus be represented in terms of the storage overhead as $\alpha=1-\beta$.

Repair bandwidth efficiency provides a measure of the amount of network bandwidth used for repairing lost data from failed storage nodes. It should be appreciated that repair bandwidth may be a shared resource with the access bandwidth and/or storage bandwidth (e.g., each taken from the available data communication bandwidth). Accordingly, an upper bound on the repair bandwidth (R) may be provided according to embodiments herein.

The ratio of an amount of data that is read from storage nodes to a resulting amount of repair data that is generated and stored on storage nodes is one measure of repair bandwidth efficiency. Accordingly, repair bandwidth efficiency may be measured by the ratio of the number of fragments that need to be read to decode the source data to the number of fragments that are generated for the repair. Thus, the larger the number of fragments generated for a particular source object by the repair process, the higher the repair bandwidth efficiency.

Access efficiency provides a measure of the amount of data that needs to be read from the storage system to retrieve a given portion of source data (e.g., f(A) is the amount of read data from the storage nodes to access A bytes of source data, wherein when f(A) is greater than A the data access is inefficient). It should be appreciated that the amount of time to access source data is related to the access efficiency. Accordingly, when the amount of data read from the storage nodes to access a particular portion of source data is larger than that portion of source data, not only is more bandwidth than minimally necessary used to access the data but the amount of time it takes to access the source data can be longer than minimally necessary. Accordingly, embodiments herein are adapted to provide implementations wherein very nearly f(A)=A.

Permanent failure of the nodes is often modeled by a Poisson process parameterized by $\lambda$, which denotes the failure rate of each node according to an exponential distribution. There are also intermittent failures of nodes (e.g., a node that is not available for some small interval of time but which comes back online and is fully available again). As previously mentioned, such intermittent node failures are far more typical than permanent node failures. Accordingly, a repair policy is not needed to recover the data temporarily unavailable on these nodes as eventually this data will become available again when the node comes back online and thus when nodes fail there is some period of time, as may be denoted by an intermittent failure threshold, T, until it is determined whether the failure is intermittent or permanent. Nodes can be added to the storage system to replace nodes that have failed permanently. When replacement nodes are available for permanently failed nodes, the repair policy can repair an object that has lost fragments on failed nodes by reading fragments for the object from other nodes, erasure decode the object from the read fragments, erasure encode additional fragments from the object, and store these additional fragments on replacement nodes.

The repair bandwidth metric, R, utilized according to some embodiments of the present disclosure is an amount of bandwidth provisioned to be used by the repair policy to ensure a provided MTTDL, whereby the repair policy may use this amount of repair bandwidth at each point in time, or more generally the repair policy may use this amount of repair bandwidth when averaged over a longer window of time. The repair bandwidth provisioned to the repair process may be respected on an instantaneous basis (i.e., the repair process may use repair bandwidth at a steady rate that is at or below the provisioned repair bandwidth). Alternatively, the repair bandwidth provisioned to the repair process may be considered as an average over a long window of time that is sufficient for the repair process to achieve a provisioned MTTDL, and thus the repair process may decide to use the repair bandwidth in, for example, a scheduled manner independent of the timing of storage node failures. For example, the repair process may be scheduled to run periodically for an hour or two each day, for a few hours each week, or for a few hours each month or couple of months, such that the average repair bandwidth used by the repair process over these windows of times averages to the provisioned repair bandwidth.

The repair policy may use such a provisioned repair bandwidth in a way that avoids interference with other processes sharing the same bandwidth resources, such as an access process that is accessing data stored on the storage nodes, or a storage process that is storing data to the storage nodes. For example, the repair policy may detect that another process needs to use a significant part of the shared bandwidth for some period of time, and the repair process may suspend or significantly slow down its usage of repair bandwidth during this period of time and then use more repair bandwidth again after the other processes bandwidth needs have reduced. In this example, the repair policy is essentially running as a background process with respect to bandwidth consumption (e.g., the repair policy backs off on its usage of bandwidth in response to other processes increased bandwidth usage). As another example, the repair policy may have scheduled times when it uses repair bandwidth, and refrain from using repair bandwidth at other times, wherein the scheduled times of repair bandwidth usage are for example times when other processes that share the bandwidth resources are typically quiescent (e.g., the repair process uses repair bandwidth from 1 A.M. to 3 A.M. each morning when there is very little access or storage activity within the storage system). In these cases, the usage of repair bandwidth by the repair server is largely independent of the timing of data loss within the storage system (e.g., the timing of permanent or intermittent storage node failures).

The access efficiency metric may be considered with respect to a plurality of situations. For example, the access efficiency metric may be considered with respect to the case where there are no node failures (intermittent or permanent) amongst the storage nodes that are used to store the source data, and the case where there are node failures (intermittent or permanent) amongst the storage nodes that are used to store the source data. The amount of data read from storage nodes in order to access a chunk of source data is an important component of access efficiency because this largely determines the speed at which a chunk can be accessed. Ideally, the amount of data read to access a chunk should be equal to the size of the chunk.

Previous solutions for storing and accessing source data within a storage system have primarily focused on using a reactive repair policy with respect to data determined to be unavailable. In operation according to such reactive repair policies, data is scheduled for repair as soon as any data is lost on a permanently failed node, and as much bandwidth as necessary is used to perform the repair in a burst. A Markov chain analysis is typically applied to individual objects in the storage system for the reliability analysis of a reactive repair policy. The analysis assumes that the number of objects that need repair is always nearly zero, which is justified if the repair policy can always work quickly enough.

With a reactive repair policy, the overall amount of repair traffic generated is proportional to at least k+1 times the amount of data lost on permanently failed nodes, where k is the number of source symbols used by the erasure code. This is because each time a fragment of an object is lost on a permanently failed node, at least k fragments for that object are read by the repair policy to generate at least one repair fragment that is stored on replacement nodes.

Large erasure code solutions in combination with a lazy repair policy achieve better trade-offs in storage efficiency, repair bandwidth efficiency, and reliability than is possible for any small erasure code solution. In particular, the use of a large erasure code according to embodiments provides a number of advantages, such as advantages associated with spreading the data for a particular object over many nodes and providing improved repair and access properties. Such large erasure codes that are not inherently MDS cannot, however, guarantee code performance. That is, although large erasure codes provide very high data recovery reliability of a source object from k fragments (e.g., in the range of 99%), recovery is nevertheless not guaranteed. The use of some additional number of fragments, x, increases recovery reliability (e.g., source object data recovery using k+x fragments, where x=1 provides data recovery in the range of 99.99% and where x=2 provides data recovery in the range of 99.9999%). However, no amount, x, of additional fragments is provably sufficient to guarantee recovery of the source data. Nevertheless, embodiments utilizing large erasure codes provide smoothness and efficiency of repair bandwidth, wherein efficiency may arise from an overhead operating point implemented and diminishing efficiency returns may be realized from operating near k available fragments. Additionally, embodiments realize improved accessibility through operating with a minimum redundancy, Y, (e.g., a minimum number of available redundancy fragments) providing network and device multiplexing gains on latency, wherein accessibility is benefited from a larger number of available redundancy fragments. Moreover, the large erasure codes utilized according to embodiments provides good, albeit probabilistic, data recovery performance along with superior encoding and decoding performance (as compared to small erasure codes).

Figure 2A:
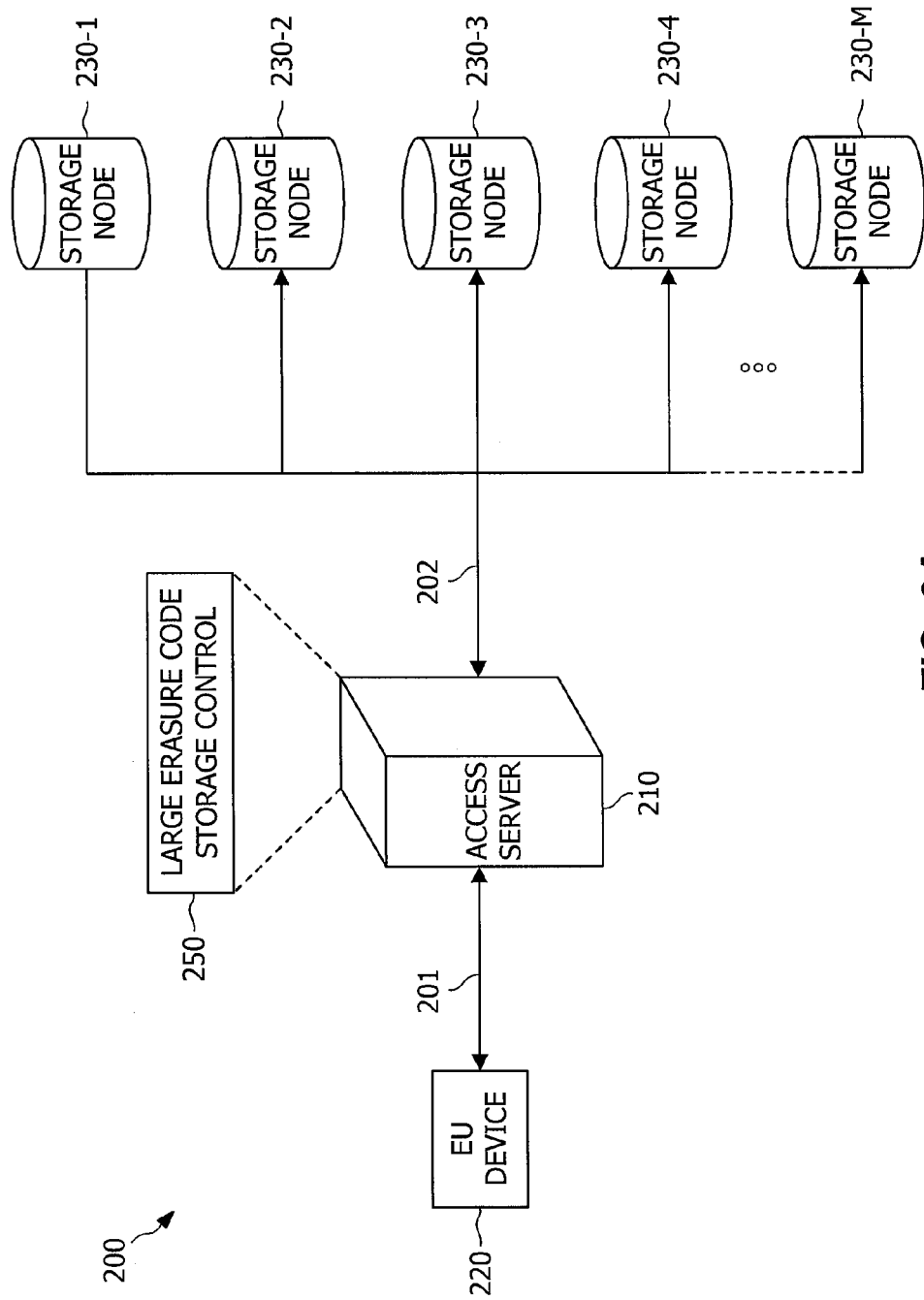
FIGS. 2A and 2B show detail with respect to exemplary implementations of storage systems adapted to provide fragment pre-storage techniques according to embodiments of the present disclosure.
Figure 2B:
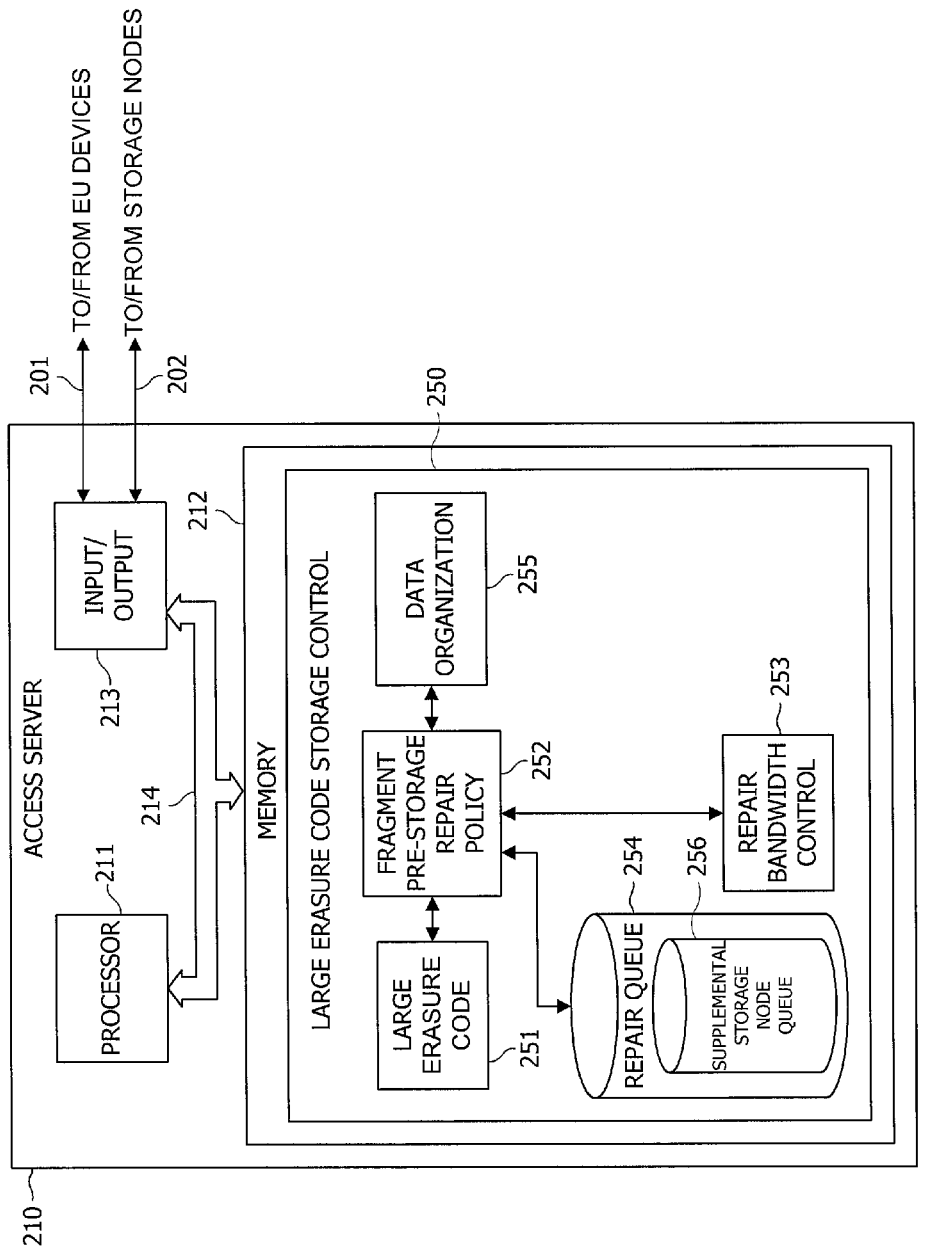

FIGS. 2A and 2B show storage system 200 adapted to provide large erasure code storage control according the concepts disclosed herein. Large erasure control according to embodiments provides pre-generation and pre-storage of fragments in storage system 200. For example, embodiments of a fragment pre-storage technique herein operates to generate a number of fragments for a particular source object that is greater than the number of storage nodes used to store the fragments (e.g., greater than the number of storage nodes in the storage system for certain large erasure codes). The fragments generated which do not have a corresponding assigned storage node for their storage at the time of their generation are thus "pre-generated" and "pre-stored" (e.g., in unused space then being utilized as "supplemental" storage) for later moving to an assigned storage node (e.g., a storage node subsequently added to the storage system). Such pre-generated and pre-stored fragments are thus referred to as transient fragments (until the time they are moved to an assigned storage node, at which point they are referred to as fragments). Although transient fragments may be available for use in data recovery, the transient fragments of embodiments are not used for data access (e.g., at least until moved from supplemental storage to an assigned storage node). Implementation of fragment pre-storage techniques, providing for the pre-generation and pre-storage of transient fragments, provides for reduced storage overhead, operation emulating larger storage overhead than is actually provided, improved repair rates, and/or reduced repair bandwidth according to embodiments herein.

In facilitating the foregoing, the exemplary embodiment of FIG. 2A comprises access server 210, having large erasure code storage control logic 250 according to the concepts herein, in communication with EU device 220 to provide storage services with respect thereto. Source data for which storage services are provided by storage systems of embodiments herein may comprise various configurations of data including blocks of data (e.g., source blocks of any size) and/or streams of data (e.g., source streams of any size). The source objects corresponding to such source data as stored by storage systems of embodiments, may comprise individual files, collections of files, data volumes, data aggregations, etc., as well as portions thereof, as may be provided for storage processing (e.g., encoding, writing, reading, decoding, etc.) as blocks of data, streams of data, and combinations thereof. Thus, source objects herein may comprise application layer objects (e.g., with metadata), a plurality of application layer objects, some portion of an application layer object, etc. Such source objects may thus be quite small (e.g., on the order of hundreds or thousands of bytes), quite large (e.g., on the order of megabytes, gigabytes, terabytes, etc.), or any portion of data that may be separated into fragments or portions of fragments as described herein.

Access server 210 may comprise one or more servers operable under control of an instruction set to receive data from devices such as EU device 220, and to control storage of the data and to retrieve data in response to requests from devices such as EU device 220, wherein the HTTP 1.1 protocol using the GET and PUT and POST command and byte range requests is an example of how an EU device can communicate with an access server 210. Accordingly, access server 210 is further in communication with a plurality, M, of storage nodes (shown here as storage nodes 230-1 through 230-M), wherein the HTTP 1.1 protocol using the GET and PUT and POST command and byte range requests is an example of how an access server 210 can communicate with storage nodes 230-1 through 230-M. The number of storage nodes, M, is typically very large, such as on the order of hundreds, thousands, and even tens of thousands in some embodiments. Storage nodes 230-1 through 230-M may comprise a homogeneous or heterogeneous collection or array (e.g., RAID array) of storage media (e.g., hard disk drives, optical disk drives, solid state drives, RAM, flash memory, high end commercial servers, low cost commodity servers, personal computers, tablets, Internet appliances, web servers, SAN servers, NAS servers, IAN storage servers, etc.) providing persistent memory in which the electronic data is stored by and accessible through access server 210. EU device 220 may comprise any configuration of device (e.g., personal computer, tablet device, smart phone, personal digital assistant (PDA), camera, Internet appliance, etc.) which operates to generate, manage, and/or access electronic data. It should be appreciated that although only a single such device is shown, storage system 200 may operate to serve a plurality of devices, some or all of which may comprise devices in addition to or in the alternative to devices characterized as "end user" devices. Any or all of the foregoing various components of storage system 200 may comprise traditional (e.g., physical) and/or virtualized instances of such components, such as may include virtualized servers, virtualized networking, virtualized storage nodes, virtualized storage devices, virtualized devices, etc.

FIG. 2B shows additional detail with respect to access server 210 of embodiments. Access server 210 of the illustrated embodiment comprises a plurality of functional blocks, shown here as including processor 211, memory 212, and input/output (I/O) element 213. Although not shown in the representation in FIG. 2B for simplicity, access server 210 may comprise additional functional blocks, such as a user interface, a radio frequency (RF) module, a display, etc., some or all of which may be utilized by operation in accordance with the concepts herein. The foregoing functional blocks may be operatively connected over one or more buses, such as bus 214. Bus 214 may comprises the logical and physical connections to allow the connected elements, modules, and components to communicate and interoperate.

Processor 211 of embodiments can be any general purpose or special purpose processor capable of executing instructions to control the operation and functionality of access server 210 as described herein. Although shown as a single element, processor 211 may comprise multiple processors, or a distributed processing architecture.

I/O element 213 can include and/or be coupled to various input/output components. For example, I/O element 213 may include and/or be coupled to a display, a speaker, a microphone, a keypad, a pointing device, a touch-sensitive screen, user interface control elements, and any other devices or systems that allow a user to provide input commands and receive outputs from access server 210. Additionally or alternatively, I/O element 213 may include and/or be coupled to a disk controller, a network interface card (NIC), a radio frequency (RF) transceiver, and any other devices or systems that facilitate input and/or output functionality of client device 210. I/O element 213 of the illustrated embodiment provides interfaces (e.g., using one or more of the aforementioned disk controller, NIC, and/or RF transceiver) for connections 201 and 202 providing data communication with respect to EU device 220 and storage nodes 230-1 through 230-M, respectively. It should be appreciated that connections 201 and 202 may comprise various forms of connections suitable for data communication herein, such as provided by wireline links, wireless links, local area network (LAN) links, wide area network (WAN) links, SAN links, Internet links, cellular communication system links, cable transmission system links, fiber optic links, etc., including combinations thereof.

Memory 212 can be any type of volatile or non-volatile memory, and in an embodiment, can include flash memory. Memory 212 can be permanently installed in access server 210, or can be a removable memory element, such as a removable memory card. Although shown as a single element, memory 212 may comprise multiple discrete memories and/or memory types. Memory 212 of embodiments may store or otherwise include various computer readable code segments, such as may form applications, operating systems, files, electronic documents, content, etc.

Access server 210 is operable to provide reliable storage of data within storage system 200 using large erasure code storage control, such as may be configured to provide liquid distributed storage control. Accordingly, memory 212 of the illustrated embodiments comprises computer readable code segments defining large erasure code storage control logic 250, which when executed by a processor (e.g., processor 211) provide logic circuits operable as described herein. In particular, large erasure code storage control logic 250 of access server 210 is shown in FIG. 2B as including a plurality of functional blocks as may be utilized alone or in combination to provide various aspects of storage control (e.g., liquid distributed storage control operation) for reliably storing data within storage system 200. Further detail regarding the implementation and operation of liquid distributed storage control by a storage system is provided in U.S. patent application Ser. Nos. 14/567,203, 14/567,249, and 14/567,303 each entitled "SYSTEMS AND METHODS FOR RELIABLY STORING DATA USING LIQUID DISTRIBUTED STORAGE," and each filed Dec. 11, 2014, the disclosures of which are hereby incorporated herein by reference.

Large erasure code storage control logic 250 of the illustrated embodiment includes large erasure code logic 251, fragment pre-storage repair policy 252, repair bandwidth control logic 253, and data organization logic 255. It should be appreciated that embodiments may include a subset of the functional blocks shown and/or functional blocks in addition to those shown.

The code segments stored by memory 212 may provide applications in addition to the aforementioned large erasure code storage control logic 250. For example, memory 212 may store applications such as a storage server, useful in arbitrating management, storage, and retrieval of electronic data between EU device 210 and storage nodes 230-1 through 230-M according to embodiments herein. Such a storage server can be a web server, a NAS storage server, a SAN storage server, an IAN storage server, and/or the like.

In addition to the aforementioned code segments forming applications, operating systems, files, electronic documents, content, etc., memory 212 may include or otherwise provide various registers, buffers, caches, queues, and storage cells used by functional blocks of access server 210. For example, memory 212 may comprise one or more system maps that are maintained to keep track of which fragments are stored on which nodes for each source object. Additionally or alternatively, memory 212 may comprise various registers storing operational parameters, such as erasure code parameters, utilized according to embodiments. Likewise, memory 212 may comprise one or more repair queues, such as repair queue 254, providing a hierarchy of source object instances (which represent source objects) for repair processing.

In operation according to embodiments, the source blocks of electronic data are stored in storage system 200 as objects. The source objects utilized herein may, for example, be approximately equal-sized. Source blocks, and thus the corresponding objects stored by the storage system, may comprise individual files, collections of files, data volumes, data aggregations, etc. and may be quite large (e.g., on the order of megabytes, gigabytes, terabytes, etc.). Access server 210 may operate to partition arriving source data into source objects and to maintain mapping of the source data to the source objects (e.g., Map:App-Obj comprising an application or source object map providing mapping of source data to objects). Access server 210 may further operate to erasure encode the source objects, divide the source objects into fragments, store each fragment of a source object at a different storage node, and maintain a source object to fragment map (e.g., Map:Obj-Frag comprising an object fragment map providing mapping of objects to fragments). Accordingly, the objects are partitioned by logic of access server 210 into fragments for storage in the storage system. For example, an object may be partitioned into k fragments for storage in storage system 200. Each of the k fragments may be of equal size according to embodiments. In operation according to embodiments herein the aforementioned fragments may comprise a plurality of symbols.

In implementing such partitioned storage of source data according to embodiments there can be a unique encoded symbol ID (ESI) associated with each of the M storage nodes, and all fragments stored on the storage node are generated using the ESI associated with that node. Thus a mapping may be maintained for each storage node indicating the associated ESI and a mapping may be maintained for each source object indicating which fragments are stored on which storage nodes (e.g., a Map:Obj-Frag map indicating the encoded symbol ID (ESI) and the storage node ID for each fragment of each source object). Alternatively, mapping of ESIs to storage nodes may be maintained individually for each object, or for a group of objects and thus a storage node may have a fragment associated with a first ESI for a first object and a fragment associated with a second ESI for a second object. In some embodiments, multiple ESIs may be mapped to the same storage node for an object.

The particular storage nodes upon which the n fragments for any source object are stored may be selected by assigning the source object to a data storage pattern (also referred to as a placement group), wherein each data storage pattern is a set of n preselected storage nodes (e.g., as may be identified by a storage node identifier). That is, a data storage pattern is a set of n storage nodes on which the fragments of a source object are placed. In a typical storage system where n is much smaller than M, the number of patterns t may be approximately a constant multiple of the number of storage nodes M. The number of data storage patterns can vary over time, such as due to storage node failures rendering data storage patterns incident thereon obsolete.

Embodiments herein may for different sets of objects operate to assign ESIs in a different order (e.g., permutation of the ESIs) to the same set of storage nodes of a large/liquid storage system. Furthermore, different sets of ESIs may be assigned to the same set of storage nodes for different sets of objects. In implementing such an ESI pattern for a set of objects (i.e., an ESI pattern is a mapping of a set of ESIs to a set of storage nodes for a given set of objects) technique according to embodiments, a set of ESI patterns is specified to the same set of storage nodes (e.g., the available storage nodes), wherein the ESIs assigned to the same storage node is different across the different ESI patterns. As an example, 100 ESI patterns may be specified that map a given set of 3000 ESIs to the same set of 3000 storage nodes (e.g., where k=2000 and n=3000), wherein the mapping of the ESIs to the storage nodes for each ESI pattern may be specified by choosing independently a random permutation of the ESIs and mapping the permutation to the storage nodes in a fixed order. As source objects are stored in the storage system, they may be assigned to one of the 100 ESI patterns (e.g., in round-robin fashion), whereby the ESI pattern assignments determine which fragments (identified by their ESI) are stored at which storage node for the source object. It should be appreciated that implementation of such ESI pattern embodiments greatly ameliorates the concern that the underlying erasure code, such as RAPTORQ, is not a MDS code, and greatly reduces the risk of having to perform emergency repair at a very high overall peak repair rate.

Irrespective of the particular ESI assignment scheme utilized, the aforementioned mapping information may be updated for source objects indicating which fragments are available when a storage node permanently fails. Access server 210 may operate to determine which source object particular source data (e.g., source data requested by EU device 220) is contained within (e.g., using a Map:App-Obj map) and to read the data from the storage nodes storing the appropriate fragments by determining which of the fragments contain relevant source or repair data (e.g., using a Map:Obj-Frag map).

In providing resilient and reliable storage of the data, access server 210 of embodiments utilizes one or more erasure codes with respect to the source objects, wherein repair fragments are generated to provide redundant data useful in recovering data of the source object. For example, embodiments of large erasure code storage control logic implement erasure codes parameterized as (n; k; r), where k is the number of source symbols in a source block, n is the total number of encoded symbols, and r=n−k is the number of repair symbols.

An (n; k; r) erasure code solution, wherein (n; k; r) are small constants, is said to be a small erasure code solution if n<<M or if n is small independently of M (e.g. n<30, or n<20). In utilizing such a small erasure code, a source object is typically partitioned into k source fragments that are erasure encoded to generate n encoded fragments, wherein r of the n fragments are repair fragments. Of the M storage nodes in the storage system, n storage nodes may then be chosen (e.g., storage nodes chosen randomly, storage nodes having independent failures chosen, etc.) and the n fragments stored to the n chose storage nodes, one fragment per storage node. Maximum Distance Separable (MDS) erasure codes are an example of such small erasure. The repair strategy traditionally implemented with respect to such small erasure codes is a reactive, rapid repair policy.

An (n; k; r) erasure code solution is a large erasure code solution if n=M (i.e., for each source object there are fragments stored at all the storage nodes), if n is a significant fraction of M (e.g., n≥½·M), or if n is large although perhaps chosen independently of M (e.g., n≥50, or n≥30). An exemplary large erasure code such as may be utilized according to embodiments herein include RAPTORQ as specified in IETF RFC 6330, available from Qualcomm Incorporated. Further examples of large erasure codes as may be utilized herein include RAPTOR as specified in IETF RFC 5053, LDPC codes specified in IETF RFC 5170, tornado codes, and Luby transform (LT) codes.

A property of maximum distance separable (MDS) erasure codes is that all k source symbols can be recovered from any k of the n encoded symbols. Particular erasure codes that are not inherently MDS, such as the exemplary large erasure codes herein (e.g., RAPTORQ), provide a high (e.g., 99%) probability that the k source symbols can be recovered from any k of the n encoded symbols and a higher (e.g., 99.99%, 99.9999%, etc.) probability that the k source symbols can be recovered from any k+x (e.g., x=1, 2, etc.) of the n encoded symbols.

In operation, each fragment (i.e., the source fragments and repair fragments) of a source object is stored at a different storage node than the other fragments of the source object (although multiple fragments are stored at the same storage node in some embodiments). The storage overhead is the ratio of the total target amount of repair data for all objects divided by the total target amount of source and repair data for all objects in the storage system when using a systematic erasure code for storage. Thus, the storage overhead is the target fraction of the used storage that is not for source data.

In some cases, source data is not directly stored in the storage system, only repair data. In this case, there are n repair fragments stored in the storage system for each object, where generally any k (for some erasure codes slightly more than k is sometimes utilized) of the n fragments can be used to recover the original object, and thus there is still a redundant storage of r=n−k repair fragments in the storage system beyond the k needed to recover the object. An alternative type of storage overhead is the ratio of the total target amount of redundant data (r=n−k) divided by the total amount of source data (k), i.e., the storage overhead is r/k for this type. Generally herein r/n is used as the storage overhead, and one skilled in the art can see that there is a conversion from one type of storage overhead to the other type of storage overhead.

In operation according to a reactive, rapid repair policy, the repair of missing fragments is implemented at a high bandwidth when a storage node fails. That is, the repair policy causes repair server functionality of an access server to attempt to repair fragments lost on a storage node as soon as possible in order to repair a failed storage node before another storage node fails and in order to avoid source objects having more than one missing fragment (as is generally necessary in order to meet reliability targets in light of the small number of repair fragments, or redundant data, available using a small erasure code). Such reactive, rapid repair policies use a large amount of burst repair traffic at times that are dictated by when nodes fail and not at scheduled times. Thus, the burst repair traffic might occur at times when other processes that share the bandwidth are active, such as access processes retrieving data from the storage system or storage processes storing data to the storage system. Thus, if one of these other processes happens to be actively using bandwidth in a period of time that overlaps with the burst repair traffic triggered by a storage node failure, the performance of these other processes can be negatively impacted (e.g., degraded, by the burst repair traffic).

Although small erasure codes, such as those described above (e.g., n<<M), may be utilized in some embodiments, the illustrated embodiment of access server 210 implements (e.g., using large erasure code logic 251) a large erasure code (e.g., n≥½·M) solution to provide storing and accessing source data in a reliable and efficient manner within a storage system of unreliable nodes. In utilizing such a large erasure code according to embodiments, a source object may be partitioned into k source fragments that are erasure encoded to generate n encoded fragments, wherein in some embodiments r of the n fragments are repair fragments. The n fragments may then be stored to the M storage nodes, one fragment per storage node.

Large erasure code storage control logic 250 of embodiments implements a repair policy in order to provide recovery of lost fragments and thereby facilitate resilient and reliable storage of the source data. For example, a repair policy of large erasure code storage control logic 250 may run in the background (e.g., as a background task to a storage server application) to monitor storage nodes to determine which storage nodes have failed and provide operation to replace fragments stored on the failed storage node. In operation according to embodiments, an object to fragment mapping (e.g., the aforementioned Map:Obj-Frag map) may be utilized to keep track of where fragments are located such that when a storage node is determined to have permanently failed the loss of the fragments stored thereby are identified (e.g., the fragments which are no longer available due to failure of the storage node are determined). These fragments, or some portion thereof, may be tracked in a repair queue for repair operations in accordance with the repair policy.

Although it may be beneficial to use a reactive, rapid repair policy (i.e., when a fragment of an object is lost due to a permanent node failure, the repair policy replaces the lost fragment with another fragment as quickly as possible) for a small erasure code solution, embodiments utilize a lazy repair policy (i.e., objects are allowed to accumulate whereby they may be repaired at a steady repair rate, R), such as through operation of fragment pre-storage repair policy 252. It should be appreciated, however, that embodiments may implement a repair policy other than a lazy repair policy, such as a reactive repair policy.

In implementing a lazy repair policy according to embodiments, the repair rate, R, is designed to ensure a large mean time to loss of any source data (MTTDL). The repair rate may be expressed as the number of bits of source objects repaired per second (i.e., the rate in bits per second that source objects are processed from a state of missing fragments to a state of having all fragments available). This form of expressing the repair rate is convenient since generally it also corresponds to the rate at which data is read from storage nodes by the repair process. However, there are many other forms of expressing the repair rate. For example, the repair rate may be expressed as the amount of time it takes to repair each source object (e.g., in the case when all source objects are the same size), or the amount of time per byte of source object repair. As one skilled in the art will recognize, any of these forms of expressing the repair rate can be easily converted to another form. Additionally or alternatively, repair bandwidth usage may be scheduled to occur at times that are largely independent of the specific timing of node failures. For example, repair bandwidth may be scheduled to be used for a couple of hours each night when other bandwidth activity, such as access or storage of data, is quiescent. Thus, the repair process may use most or all of the available bandwidth for a short period of time on a regular basis, to avoid interrupting or disrupting other bandwidth intensive activities such as access or storage of data. As another example, the repair process may be scheduled to occur only occasionally when the storage system is powered up, and at other times the storage system is powered down to save on energy consumption and costs. The scheduling of the repair process to use repair bandwidth may also be on an irregular basis (i.e., scheduled when other processes such as reading or writing data to storage are relatively inactive). In every case, the repair bandwidth usage can be crafted to avoid interrupting other processes that send or receive data over some or parts of the same networking paths as used by the repair process, and the repair bandwidth usage can be so crafted independently of the timing of data loss events such as storage node failures.

The amount of repair done during these periods may be determined by a repair policy that dictates the desired average rate of repair over longer time periods. Thus, on a longer time scale the repair process is fluid and may be modulated to respond to changing conditions such as node failure rates while on a short time scale the repair may be scheduled for system convenience such as described in the preceding examples.

In operation, logic of the repair policy may, based on the aforementioned system maps, determine which fragments are available and which are missing for each source object. Repair processing is performed according to embodiments with respect to those fragments that are determined to be permanently lost, such as due to permanent failure of the storage node upon which the fragment is stored. Permanent failure of the storage nodes is often modeled by a Poisson process parameterized by X, which denotes the failure rate of each node according to an exponential distribution. A time varying rate parameter $\lambda$ may be a more suitable model to capture changes in conditions, quality of components, etc.

The repair policy of embodiments maintains a repair queue of object instances (e.g., repair queue 254), which represent source objects, wherein a source object instance is added to the repair queue for a source object when it is possible to generate and store additional fragments for that source object (e.g., when storage nodes that store fragments for that source object have failed, when new or replacement storage nodes have been added to the storage system, etc.). Embodiments implementing a large erasure code solution using a lazy repair policy may operate to add a source object instance to the repair queue when a pre-specified minimum number (e.g., minQ>1, minQ=1, etc.) of fragments for that source object are lost due to node storage failures, such as to limit the overall amount of repair traffic. Equivalently, all objects may be in the queue but repair is suspended when no object has more than minQ erased fragments.

Whenever there is at least one source object instance in the repair queue that has a sufficient number of missing fragments the repair policy of embodiments works to repair the source objects corresponding to source object instances in the repair queue. For example, logic implementing the repair policy may linearly cycle through the object instances in the repair queue, read in at least k fragments to recover a source object in need of repair, and generate and store additional fragments for the source object on one or more replacement storage nodes.

In operation of a lazy repair policy, or other repair policy in which repair of source objects is deferred, the repair policy repairs the source data of storage nodes that have failed by writing to them at a relatively slow rate. This results in the storage nodes having available storage space for some significant time. Embodiments herein utilize such available storage space (e.g., as the aforementioned supplemental storage) and/or implement less physical storage space in the storage system (e.g., providing reduced storage overhead) through operation of fragment pre-storage techniques in accordance with the concepts herein. Such fragment pre-storage utilization of the aforementioned available storage space may provide operation emulating larger storage overhead than is actually provided in the storage system, facilitate improved repair rates, and/or facilitate reduced repair bandwidth in the storage system according to embodiments.

Referring again to FIG. 2B, large erasure code storage control logic 250 maintains repair queue 254 that contains a queue of source objects for repair. For example, repair queue 254 may comprise representations of source objects (e.g., all source objects stored by storage system 200) ordered according to their respective missing fragments, whereby source objects at the head of the repair queue (e.g., source objects having the most missing fragments/least available fragments) are taken up for repair by the repair policy. When a source object is repaired by the repair policy, fragments are produced to replace those that have been erased (e.g., due to permanent failure of one or more storage nodes) or otherwise lost. In operation of a fragment pre-storage technique herein (e.g., as implemented by fragment pre-storage repair policy 252), additional fragments (e.g., the aforementioned transient fragments) are produced that can be saved in the storage nodes being repaired while those storage nodes have available space (e.g., the aforementioned supplemental storage). In accordance with embodiments, when a new node is added to replace a storage node that fails, the new node may store different fragments than those stored at the failed node, corresponding to a different ESI than the ESI of the fragments that were lost on the failed node.

The fragment pre-storage repair policy of embodiments may maintain a supplemental queue (e.g., supplemental storage node queue 256, shown as part of repair queue 254) of supplemental storage nodes (e.g., storing code symbols, transient fragments, associated ESIs to be assigned in the supplemental storage node references) indexed by ESIs that will be assigned to storage nodes in the future, wherein the indexing ESIs are hereafter referred to as transient ESIs (i.e., ESIs that are not currently assigned to a storage node). In operation according to embodiments, when a storage node fails the ESI assigned to that storage node enters the tail of the aforementioned supplemental queue (i.e., the ESI is no longer assigned and becomes a transient ESI that will be assigned to a storage node in the future) and transient fragments and code symbols and the like associated with the transient ESI will be generated and stored in transient storage until the time that the transient ESI is assigned to a storage node in the future. Similarly, the transient ESI at the head of the supplemental queue (the transient ESI that has been in the supplemental queue that the longest) is assigned to a new storage node when a new storage node is added to the system. Since the transient ESI assigned to a new storage node at the head of the queue is known prior to its being assigned to the new storage node (at which point that transient ESI becomes a permanent ESI) according to embodiments, transient fragments can be generated (e.g., by generating additional fragments when repair of a source object is being performed, during times when the resources of the storage system are not otherwise being used or are underutilized, etc.) for this transient ESI before it is assigned permanently to a storage node.

The pre-generated transient fragments are stored in the supplemental storage according to embodiments herein, prior to the transient ESI's assignment to a storage node in the future. This pre-generation and pre-storage of fragments may apply to all transient ESIs in the supplemental queue of embodiments. The pre-generated transient fragments for a transient ESI may thus be moved from the supplemental storage to a new storage node added to the storage system when the transient ESI is assigned to the new storage node and becomes the permanent ESI of the new storage node (at which point the transient fragments are permanent fragments associated with the permanent ESI assigned to the new storage node) wherein it is sometimes the case that a new storage node is added to the system to replace a recently failed storage node. It should be appreciated that this process of moving pre-generated transient fragments from supplemental storage to a storage node utilizes less bandwidth than the repair bandwidth utilized by the repair policy in repairing the source object (e.g., reading the appropriate number of fragments, decoding the source data, encoding source and/or repair fragments, and writing fragments to the appropriate storage nodes).

Graphical representations of a repair queue for data storage within the storage nodes of a storage system, such as storage system 200, are helpful in understanding the foregoing operation according to embodiments. Accordingly, reference is made to FIGS. 3A-3E which illustrate a repair queue organization of fragments (e.g., including pre-generated and pre-stored transient fragments) stored within the storage system storage nodes (e.g., including supplemental storage, wherein such supplemental storage provides, temporary storage of unassigned pre-generated transient fragments on storage nodes until the pre-generated transient fragments are moved to storage nodes to which they are assigned, at which point they are permanent fragments associated with the permanent ESI assigned to the storage node) according to the concepts herein. It should be appreciated that there are many variants of these methods, including not immediately reusing ESIs assigned to failing storage nodes as transient ESIs, and including determining the timing of when transient ESIs are added to the supplemental storage node queue largely independently of storage node failures, and including determining which values of ESIs are used as transient ESIs largely independently of storage node failures.

Figure 3A:
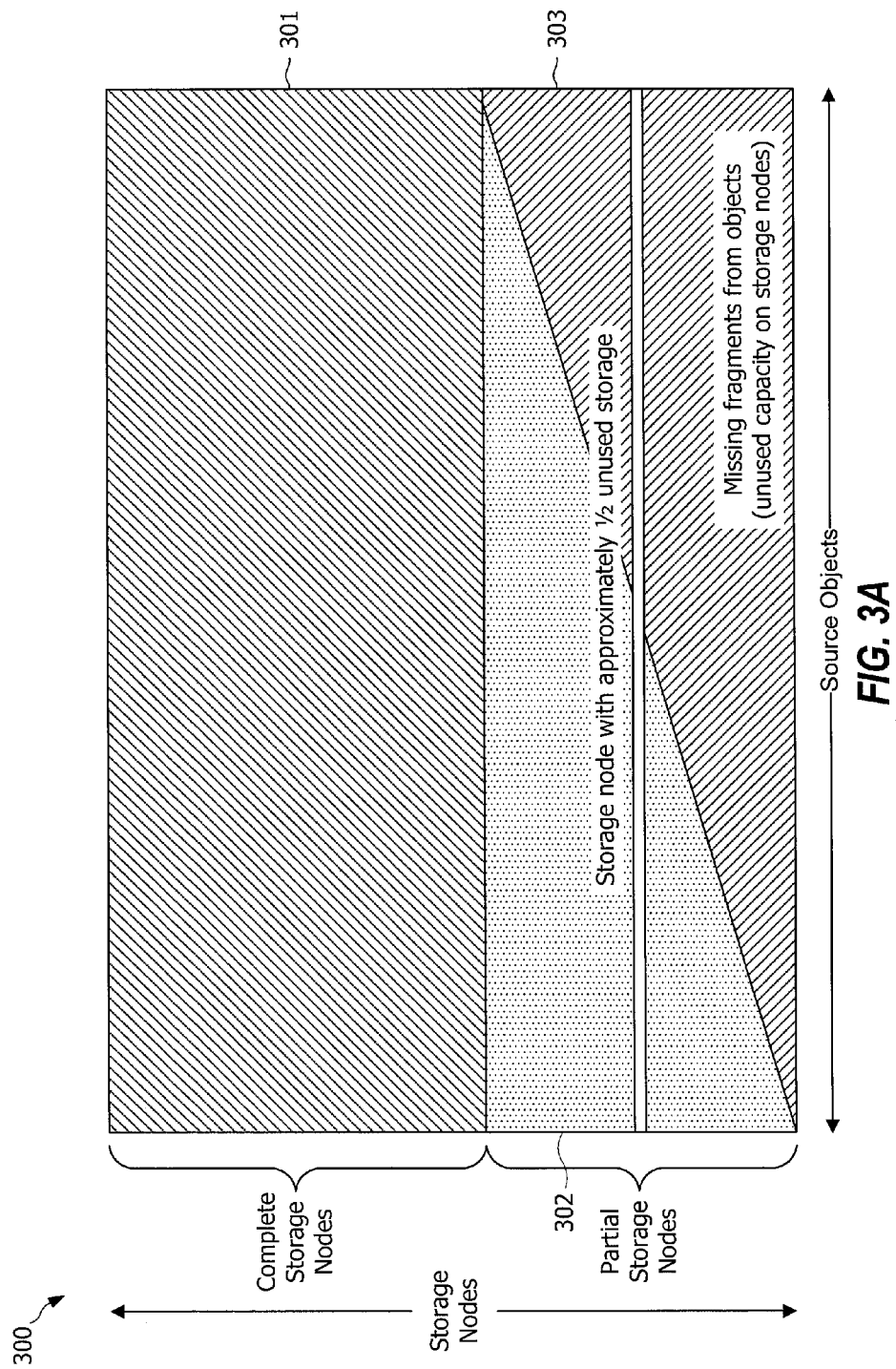

FIG. 3A shows graphical representation (shown as graph 300) of the state of a repair queue with respect to operation of a storage system implementing a lazy repair policy. The storage objects stored by the storage system are represented in the horizontal axis of graph 300 (e.g., each "column" represents a source object) while the storage nodes of the storage system are represented in the vertical axis of graph 300 (e.g. each "row" represents a storage node). Graph 300 of the illustrated embodiment includes area 301 corresponding to storage nodes having permanent fragments associated with their permanent ESIs for all source objects (referred to herein as complete storage nodes). Graph 300 also includes area 302 (permanent fragments written recently by operation of the repair policy) and area 303 (missing fragments/unused storage space) corresponding to storage nodes having fragments associated with their permanent ESIs for less than all source objects (referred to herein as partial storage nodes). Accordingly, the source objects towards the right of graph 300 are the source objects for which the most fragments are missing, and thus are the source objects most in need of repair. It should be appreciated that the areas of graph 300 may not represent the actual scale of storage within a storage system. For example, where a storage system comprises thousands of storage nodes and the storage overhead of the system is a small fraction, area 301 may be significantly larger in proportion to areas 302 and 303.

A lazy repair policy using a large erasure code may, for example, store fragments for each source object on each storage node of the storage system (i.e., the number of fragments per source object is equal to the number of storage nodes, or n=M). In such a configuration, a storage node may be said to be complete if it has a fragment from every source object (i.e., a permanent ESI is assigned to each storage node and a complete storage node stores a permanent fragment for every source object associated with its permanent ESI). Accordingly, if such a complete storage node fails, every source object loses one fragment. However, it is possible that some storage nodes that fail are not complete (e.g., a storage node recently added to the storage system may fail prior to the repair process repairing all source objects, and thus prior to fragments for each source object having been stored to the storage node). Such storage nodes may be referred to as partial storage nodes. The failure of a partial storage node results in one or more source objects losing a fragment and/or one or more source objects not losing a fragment (e.g., source objects losing a fragment may change positions in the repair queue with respect to source objects not losing a fragment).

Irrespective of whether it is a complete or partial storage node which fails, when a failed storage node is replaced a repair policy may operate to repair the source objects for which fragments were lost in the failure of the storage node and to store those fragments on a replacement storage node (i.e., regenerate and store permanent fragments on the replacement storage node with the same permanent ESI as the ESI assigned to the failed storage node). Thus, a repair policy may read fragments corresponding to area 301 (and possibly area 302) of graph 300 and write fragments generated therefrom into storage node portions corresponding to area 303, whereby the associated source object logically moves from the right of graph 300 to the left of graph 300. In regulating the repair process (i.e., controlling the rate at which objects are repaired), a system may make use of the repair queue as shown in FIG. 3A (details with respect to providing repair process regulation as may be utilized according to embodiments is provided in U.S. provisional application No. 62/211,303 entitled "SYSTEMS AND METHODS FOR REPAIR RATE CONTROL FOR LARGE ERASURE CODED DATA STORAGE", filed Aug. 28, 2015, the disclosure of which is hereby incorporated herein by reference). In embodiments herein the repair queue is rearranged and repacked for greater storage efficiency. Embodiments described herein nevertheless preserve the properties of a regulated repair process that are used to regulate repair bandwidth, such as the regulated repair processes of the above referenced co-pending patent application. It should be understood that such repair regulation can therefore be used in conjunction with embodiments described herein.

Where the repair policy is a lazy repair policy, or other policy operable to defer repair of source objects, an appreciable amount of the storage capacity of many of the storage nodes remains unused for a period of time, awaiting repair of source objects by the repair policy. This unused storage is represented by area 303 of graph 300, wherein fragments are to be added (e.g., the recently written fragments of area 302) to the partial storage nodes of FIG. 3A over time. As can be seen in graph 300, half of the storage capacity on average of the partial storage nodes is unused. These partial storage nodes constitute a $\beta$ fraction of the storage nodes in the system (e.g., if the storage system storage overhead or storage redundancy, $\beta$, is 0.33, then approximately 17% (e.g., approximately $\beta/2$) of the overall storage capacity is unused).

Operation of a fragment pre-storage repair policy according to embodiments herein utilizes at least a portion of this otherwise unused storage space as supplemental storage for transient fragments which are pre-generated for use in replacement of fragments to be lost in subsequent storage node failures (or as may otherwise become unavailable or be erased), or more generally transient fragments are pre-generated and eventually moved and assigned permanently to storage nodes added to the system in the future of their generation. Application of the concepts of supplemental storage to implementations of pre-generation and pre-storage of transient fragments not only facilitates reduction in repair rates and/or increased data reliability, embodiments may utilize the supplemental storage to reduce the amount of resources in the storage system (e.g., eliminate some portion of the storage nodes represented in FIG. 3A to thereby reduce the storage overhead).

The implementation of pre-generation and pre-storage of transient fragments according to embodiments facilitates the use of less total storage capacity (e.g., fewer storage nodes in the storage system), while maintaining the performance of a storage system having additional storage. FIGS. 3B-3E illustrate the use of aforementioned supplemental storage to provide operation of a large erasure code, or other deferred repair policy, storage system which uses fewer storage nodes to achieve operation as if a larger number of storage nodes were present in the storage system (i.e., providing supplementation of storage nodes using supplemental storage herein). That is, at least in some embodiments, some portion of the partial storage nodes having relatively few source objects with permanent fragments associated with their permanent ESI stored thereon (e.g., the storage nodes towards the bottom of graph 300) may be supplemented by operation of a fragment pre-storage technique of embodiments. It should be appreciated, however, that the concepts described regarding the pre-generation and pre-storage of transient fragments may be applied without the supplementing of storage nodes, if desired. In other embodiments, as described in more detail below, most or all of the storage nodes have a portion of their total available storage space dedicated to supplemental storage and the remaining portion (usually the larger portion) of their total available storage space dedicated to permanent storage of fragments, i.e., storage of permanent fragments associated with the permanent ESI (or ESIs) assigned to the storage node.

Figure 3B:
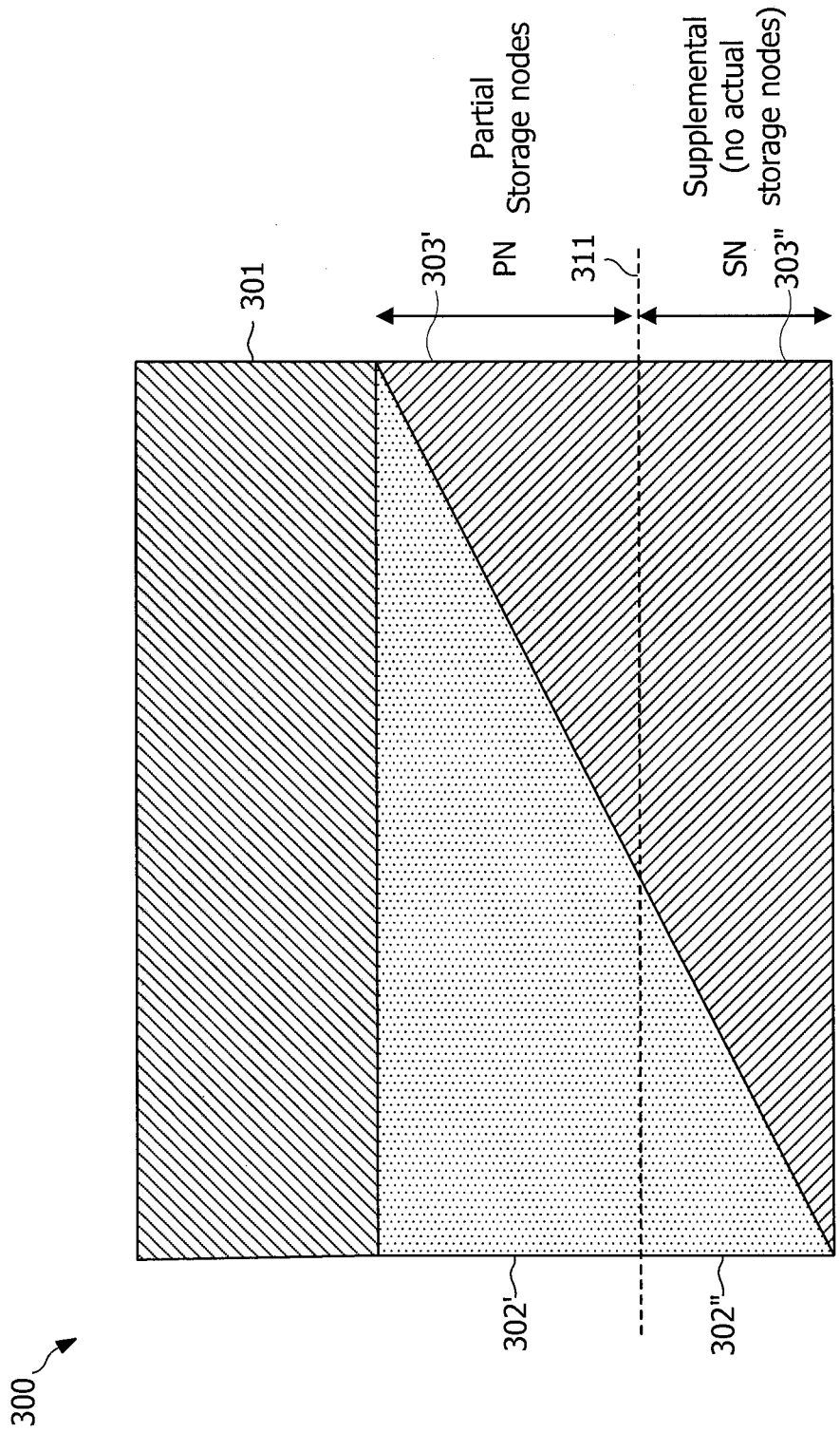

Directing attention to FIG. 3B, line 311 illustrates the portion of the storage nodes that is supplemented according to embodiments herein. The storage nodes represented by the area below line 311 may, for example, be physically absent (e.g., removed or eliminated, or storage nodes that will be added to the system in the future) from the storage system, although operation of the storage system may perform as if those storage nodes were present in the system using a fragment pre-storage technique according to the concepts herein. Alternatively, the storage nodes represented by the area below line 311 may represent additional storage nodes for the storage system (i.e., supplemental storage nodes added to an otherwise full complement of storage nodes, also referred to herein as supplemental storage nodes), such as to provide operation of the storage system as if the storage system has more storage nodes than are physically present, or otherwise having improved performance in one or more aspects. The transient fragments to be stored for the supplemental storage nodes are temporarily stored on existing storage nodes in the system. In selecting the number of supplemental storage nodes for configuring a fragment pre-storage implementation according to embodiments, given a target number of partial nodes (PN), the number of additional supplemental nodes (SN) may be selected such that SN<PN (e.g., the number of supplemental nodes, SN, may be selected such that PN+SN facilitates effective repair meeting one or more performance attributes, such as repair bandwidth, data reliability, repair efficiency, etc.). As one skilled in the art will recognize, there are many variants of these embodiments. For example, as explained in more detail below, in other embodiments the values of PN and SN are largely independent, and in particular SN can be much larger than PN.

As can be appreciated from the discussion of FIG. 3A above, the only portion of the area below line 311 in FIG. 3B for which fragments have been pre-generated and temporarily stored for supplemental storage nodes is represented by the small triangular portion of area 302 below line 311 (designated as area 302" in FIG. 3B). In operation according to embodiments, the fragments corresponding to area 302" will thus be stored in supplemental storage (e.g., some portion of the unused storage of the partial storage nodes above line 311 which are physically present in the storage system, such as a portion of area 303' remaining from area 303) as transient fragments according to the concepts herein. In storing such fragments to supplemental storage of embodiments, the transient fragments may be repacked so as to facilitate their pre-storage (i.e., storage prior to their permanently assigned storage node is added to the storage system) and later moving to an assigned storage node for "permanent" storage thereon (it being understood that "permanent" as used in this context distinguishes over the temporary storage of a transient fragment, and may in fact be erased, altered, modified, deleted, etc. as is common with respect to source data stored in a storage system). For example, the area that is available for supplemental storage according to embodiments is dynamically changing (e.g., as storage nodes fail or fragments are otherwise lost and as storage nodes are added to the storage system, such as to replace a failed storage node, graph 300 shifts up, and as objects are repaired and replacement fragments are generated, graph 300 shifts to the right (while the repaired object moves from the right hand side to the left). Accordingly, the transient fragments stored in supplemental storage according to embodiments are stored in the supplemental storage and oriented in the repair queue (e.g., within supplemental storage node queue 256) in such a way as to facilitate maintaining the proper fragment and storage node correspondence when moved to their permanent storage nodes. For example, the transient fragments may be stored in existing storage nodes in a different organization than is used to store permanent fragments on existing storage nodes. In operation according to embodiments, for each source object, all transient fragments for that source object are stored in the same existing storage node, whereas each permanent fragment of the source object is stored on a different existing storage node. As an example alternative embodiment, the fragments of a source object may be organized into batches, wherein each batch of permanent fragments of the source object may be stored on a different existing storage node.

Figure 3D:
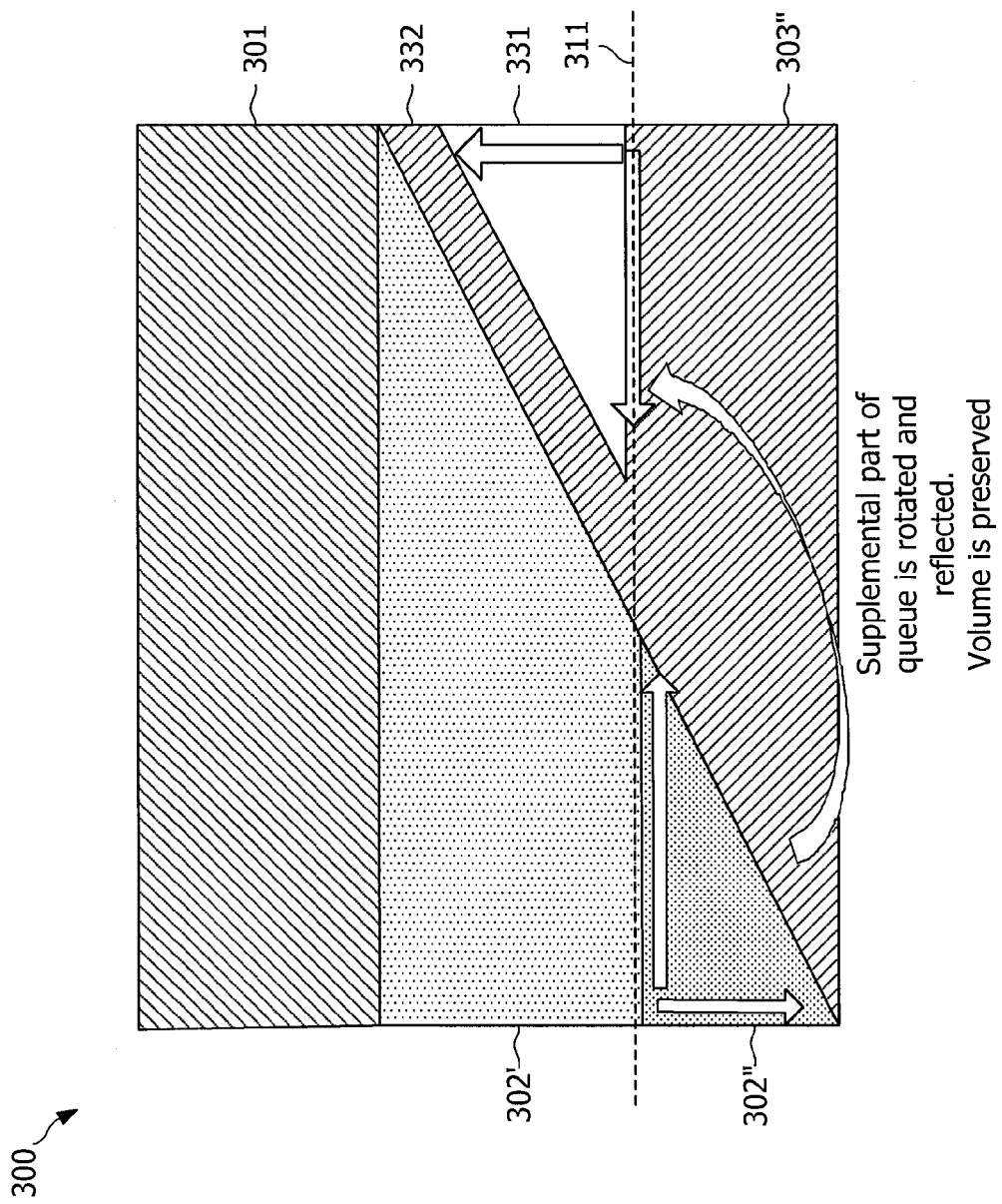

As shown in FIG. 3C, storage nodes being supplemented are oriented horizontally in graph 300 (i.e., each "row" corresponds to a storage node), whereas the source objects are oriented vertically (i.e., each "column" corresponds to a source object). However, when the storage area represented by area 302" of FIG. 3C is supplemented, the foregoing orientation may be rotated and reflected to facilitate maintaining the proper fragment and storage node correspondence when the transient fragments are moved to their permanent storage nodes, as shown in FIG. 3D. That is, the supplemental storage nodes are oriented vertically in the supplemental storage portion of the repair queue (represented as area 331 in FIG. 3D), whereas the transient fragments for source objects are oriented horizontally in the supplemental storage portion of the repair queue. Since in most embodiments the number of stored objects O is much larger than the number of storage nodes M, this reorientation of transient fragments will employ the storage of more than one transient fragment per ESI to be stored in supplemental storage per physical storage node i.e., there will be multiple transient fragments, associated with the same transient ESI but for different objects, stored in supplemental storage on a single physical storage node. In some embodiments the number of objects for which transient fragments associated with the same transient ESI are stored per physical storage node will be at most a value g that depends on the parameters of the storage system.

It should be appreciated that, despite the foregoing remapping of the storage nodes/source objects, the volume of the storage area used for storing transient fragments indicated below line 311 is maintained within the supplemental storage provided in the unused storage area above line 311 according to embodiments (e.g., the volume of area 332 is greater or equal to the volume of area 302"). However, some portion of area of unused storage space above line 311 (shown as gap 332 in FIG. 3D) may not be utilized as supplemental storage. For example, a gap between the volume of 332 and 331 may be left in embodiments for efficiency reasons. As objects are repaired the volume in region 302' increases. In the absence of a gap the additional permanent fragments produced would either not be written or would overwrite transient fragments. Since either action represents a loss in efficiency through the loss of the previously produced fragments, it may be desirable to maintain a gap (e.g., to avoid overwriting or dropping fragments). When new storage nodes are added storage volume is added at line 311. Transient fragments would then be moved from region 331 to the now expanded region 302', i.e., transient fragments associated with the transient ESIs assigned permanently to the newly added storage nodes (thus becoming permanent ESIs) would be moved to the newly added storage nodes (thus becoming permanent fragments on these nodes). This process in effect causes the region 331 to shift to the right. If nodes do not fail for an extended period then it is possible that all nodes could be completed by the repair process. In that case, overwriting of the transient fragments would occur. In some embodiments it may be preferable to suspend the repair process when the gap between 332 and 331 is too small to accommodate the fragments produced by an object repair.

In pre-generating transient fragments according to embodiments, wherein the transient fragments are generated for association with, and storage by storage nodes which have not yet been added to the storage system, ESIs (or other information for indicating which fragments are stored on which storage nodes) are utilized which otherwise are not currently in used in the storage system. For example, a permanent ESI (P-ESI) nomenclature may be utilized with respect to ESIs which identify a fragment stream assigned to a particular storage node existing in the storage system (e.g., a fragment stream stored on a storage node when the storage node is fully repaired, such as a fragment stream stored to the complete storage nodes of area 301, or a fragment stream stored on a partial storage node in accordance with the repair policy, such as a fragment stream stored to area 302' of the partial storage nodes), whereas a pre-generated or transient ESI (T-ESI) nomenclature may be utilized with respect to ESIs which identify a fragment stream that is temporarily stored on a particular storage node (e.g., pre-generated and pre-stored transient fragments stored to supplemental storage, such as a fragment stream stored to area 331 of the partial storage nodes) during repair but which are eventually moved to a storage node which replaces a failing storage node in the future to provide that storage node with source object fragments. Accordingly, a number of utilized ESIs, i.e., ESIs utilized either as a P-ESI or T-ESI at any point in time, may be greater than the number of storage nodes in the storage system according to embodiments herein. The number of additional ESIs utilized may, for example, correspond to half the storage overhead ($\beta/2$), e.g., the number of ESIs utilized over time may be $M \cdot (1+\beta/2)$, where M in this case is the maximum number of available storage nodes at any point in time. It should be appreciated that the permanent ESIs assigned to failed storage nodes may be ultimately recycled by the system in order to avoid the set of ESIs utilized over the life of a storage system from becoming unmanageably large.

A repair process in which each repair operation generates SN transient fragments is considered as an exemplary embodiment. For simplicity of description, assume that nodes are replaced as soon as they fall. Thus, the total set of ESI's used may be considered invariant. When a node fails its P-ESI appears at the bottom of the supplemental queue, now as a T-ESI, and the replacement node is assigned the T-ESI associated to the uppermost supplemental node in FIG. 3D (i.e., the node located line 311) according to embodiments. The T-ESI that is assigned to the replacement node thereby is promoted to a P-ESI. In this exemplary embodiment it is assumed that all SN transient fragments produced for a given object are stored on a single storage node. This guarantees that when partial storage nodes fail and transient fragments are lost the supplemental queue preserves the nested erased fragment property. This property states that when comparing any two objects in the queue their sets of erased fragments are ordered (i.e., one is a subset of the other). Generally the repair queue of embodiments is ordered so that objects with larger sets of missing fragments are closer to the head of the queue, which in FIG. 3 corresponds to the right hand side. The loss of transient fragments due to the failure of a partial storage node may necessitate a reordering of the queue, but the nested erased fragment property will be preserved in operation according to embodiments. The total number of transient fragments that can be written to a single storage node maybe limited according to embodiments (e.g., an integer g may be introduced which is applied to limit the total number of transient fragments for different objects with the same transient ESI that can be written to a single storage node). In the exemplary embodiment, storage nodes are written with transient fragments in the order in which the nodes are added to the storage system. Accordingly, SN transient fragments continue to be written to a storage node until such time as the node contains g transient fragments with a common ESI which comprises g different objects, or there is insufficient space to write SN fragments without overwriting permanent fragments according to embodiments. Typically g objects will store transient fragments on a single node. Thus, in an efficient use of the transient storage space g will be close to the average number of objects repaired per node failure. The derivation of an effective choice of g will be based on the assumed approximately triangular shape of the (supplemental) repair queue which is a typical steady state shape, but that shape is tied to the ratio of repair rate to the node failure rate. Note that according to the stated policy at most $g \cdot SN$ transient fragments will be stored on any storage node. If there are no storage nodes that can accommodate SN transient fragments according to this rule, then the production of transient fragments is temporarily suspended in operation according to embodiments until such time that there is a storage node that can accommodate SN transient fragments. In the above described embodiment, an assumption of a fixed g is made. Other embodiments may allow g to vary. The variation may be deterministic, e.g. periodic, to achieve an effective fractional g, or it may depend on system conditions such as the supplemental queue. The policy by which at most g fragments from a given ESI are allowed per node may also be relaxed in some aspects of the present disclosure. If, for example, the total number of transient fragments stored on a given node is much less than g·SN but an ESI has g fragments, then alternative embodiments may allow more transient fragments to be written to that node, exceeding g fragments for the otherwise saturated ESI. The embodiment described herein uses a fixed integer g, but it should be appreciated that there are many variations and relaxations of this rule that still achieve on average an appropriate number of transient fragments per storage node.

As can be appreciated from the foregoing, available storage slots (a slot is the space used to store a fragment) of a storage node added to the storage system of embodiments are filled by repairs and storage of pre-generated transient fragments. For example, the next x object repairs may generate x·SN transient fragments, whereby embodiments attempt to store these transient fragments on the partial storage nodes in the order they were added to the system, available space permitting. It should be appreciated, however, that multiple successive object repairs may result in the generated permanent fragments overtaking the residual storage area intended for or occupied by the transient fragments. Embodiments may overwrite transient fragments in this case or, alternatively, embodiments may suspend repair until a storage node fails and a new node is added. In an example detailed below, an embodiment that continues to perform repair is assumed. This may necessitate overwriting transient fragments, and thus a method for performing this overwriting while preserving the nested erasure property is also described below.

As previously mentioned, the parameter g may be applied to limit the total number of transient fragments that can be stored on a single storage node. The choice of the parameter g according to embodiments will now be described. The approximate volume (e.g., fragment count) of supplemental storage (e.g., area 331) of embodiments under conditions as shown in FIG. 3, may be give as ½·O·SN·(SN/(PN+SN)), wherein O is the total number of source objects, as can be calculated using similar triangles. Accordingly, the base storage node of the supplemental storage nodes (e.g., the base (top) of the triangle of area 302") has (O·SN)/(PN+SN) transient fragments. In repacking according to embodiments, these fragments are spread across PN storage nodes in the supplemental storage (e.g., area 332). On average (O/PN)·SN/(PN+SN) of these transient fragments are stored per node. Thus, in the example embodiment, this number of fragments should be close to g·SN. Since an efficient embodiment may target SN PN, for high efficiency, an observation is made that g·SN should be close to O·SN/(PN+SN). Thus, embodiments may choose g as the largest integer such that O/(PN+SN) exceeds g. This gives a typical number of stored transient fragments, of ½g·SN·PN<½SN·PN·O/(PN+SN) which is the same as the above calculated transient fragment volume when PN=SN. If the embodiment sought to operate a smaller ratio of SN to PN then a correspondingly smaller g could be selected. Doing so will on average leave a larger gap between area 332 and area 331. This has the advantage of requiring fewer overwrites of transient fragments or fewer suspensions of the repair process while having the disadvantage of lower average utilization of the available storage space. With the stated choice of g then under typical operation as depicted in FIG. 3 with SN=PN the efficiency of the available storage will be high (near 1) while avoiding excessive wasteful overwriting transient fragments. In this analysis, an assumption is made that O is many times larger than (PN+SN), so the rounding of O/(PN+SN) to an integer has small effect.

Figure 3E:
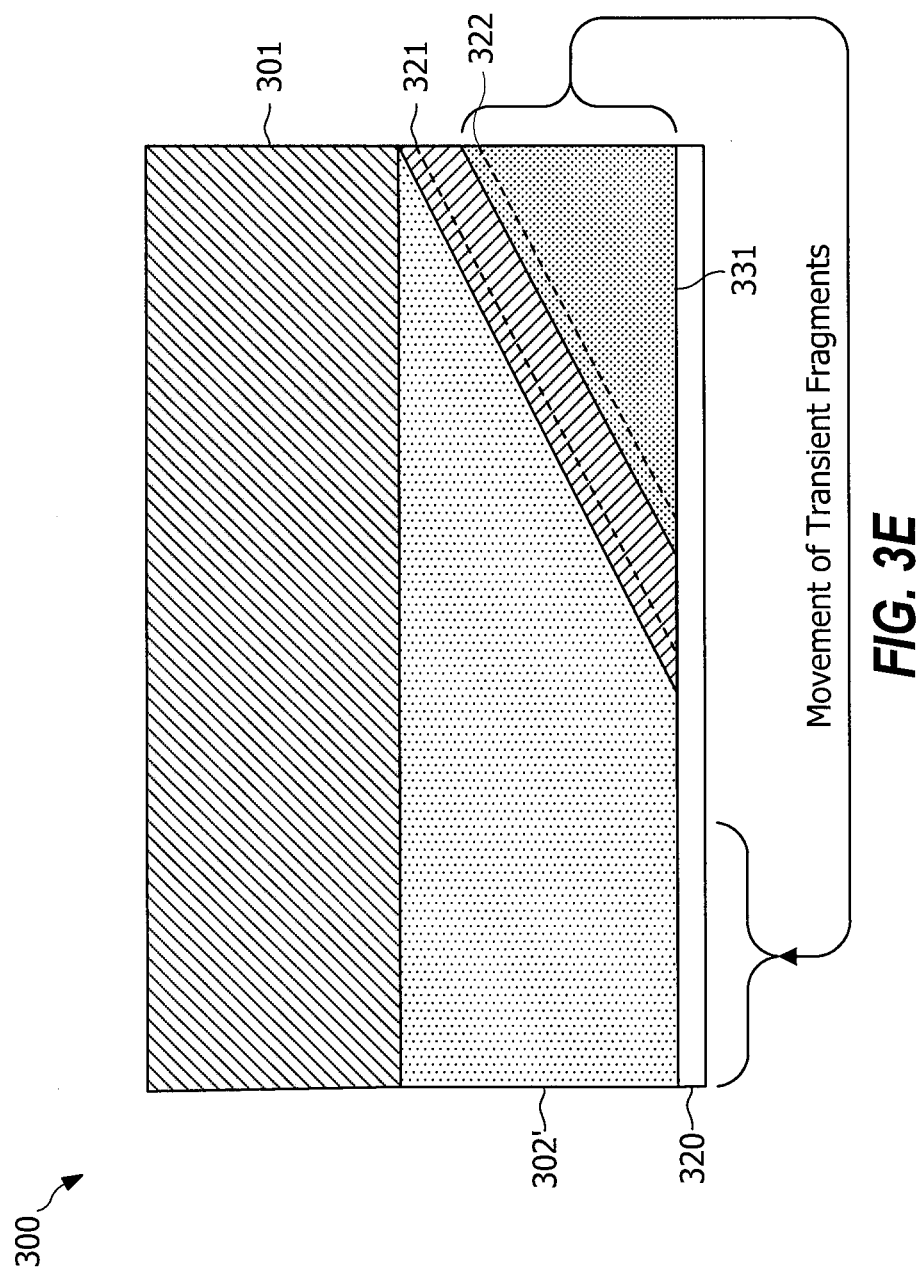

The basic dynamics of storage of transient fragments in supplemental storage according to embodiments herein is represented in FIG. 3E, wherein areas 302" and 303" associated with the supplemental storage nodes have been omitted from the illustration of graph 300. In operation according to embodiments, upon source object repair, area 302" representing the recently written permanent fragments shifts right, as represented by line 321 due to the addition of repair fragments, and transient fragments pre-generated in the repair are written to supplemental storage (represented by area 331) if space is available. Subsequent to a new storage node being added to the storage system (e.g., as represented by row 320 added to the bottom of graph 300 in FIG. 3E), area 331 (supplemental storage) shifts right due to transient fragments being moved to the new node, as permanent fragments, i.e., the transient fragments being assigned to this newly added storage node are moved from the right edge ("column") of area 331 (supplemental storage) to their permanently assigned storage node (e.g., left side of row 320) according to embodiments.

Figure 4A:
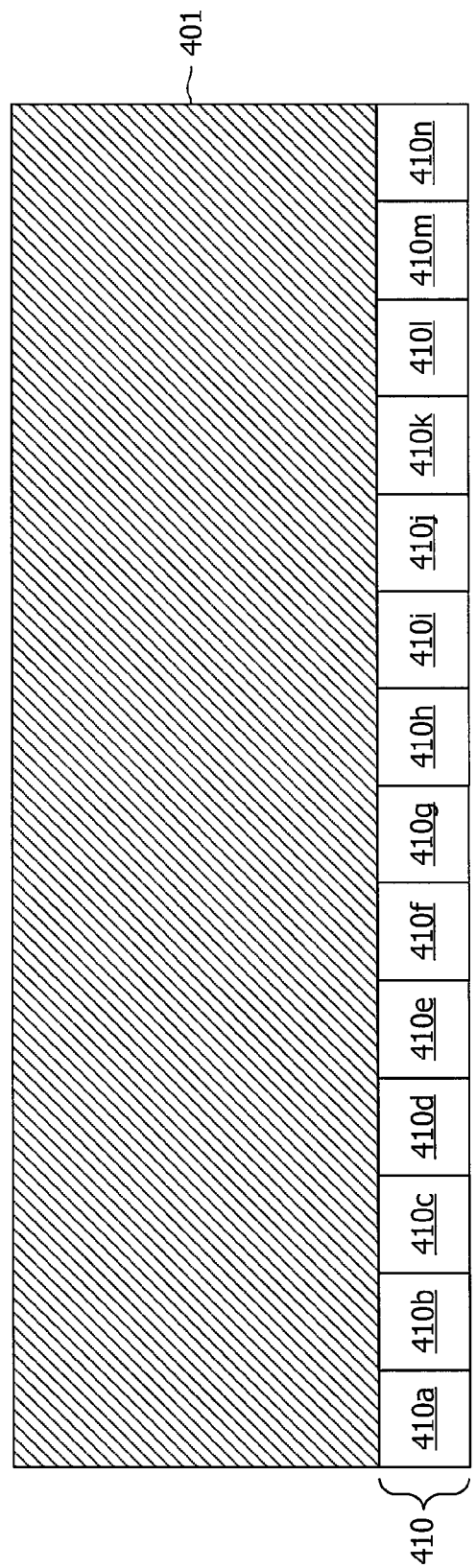
FIGS. 4A-4O show pre-generation and pre-storage of fragments according to embodiments of the present disclosure.

To better aid in understanding operation of a fragment pre-storage technique in accordance with the foregoing, reference is made to FIGS. 4A-4O that illustrate pre-generation and pre-storage of fragments according to an exemplary embodiment. As previously described, the example embodiment will use overwriting of transient fragments by permanent fragments whereas alternative embodiments may choose to suspend repair. In providing the example of overwriting of transient fragments, a technique to preserve the nested erased fragments property according to embodiments is illustrated. In the example illustrated in FIGS. 4A-4O, the total number of source objects is 14 (O=14), the target number of partial nodes is 4 (PN=4), the number of additional supplemental nodes is 3 (SN=3), and the transient fragment group size is 2 (g=2). It should be appreciated that in accordance with the transient fragment group size of 2, at most 2 successive fragments with the same ESI from a supplemental storage node are stored per actual node in the supplemental storage area, according to embodiments. For simplicity, the existing storage nodes in the storage system in the example described with reference to FIGS. 4A-4O are assumed to be complete (e.g., area 401 includes all complete storage nodes). It will be readily apparent, however, from the discussion that follows (particularly in light of the discussion of the addition of further new storage nodes below) how the concepts apply to scenarios that include failure of partial storage nodes (e.g., partial storage nodes as discussed above).

FIG. 4A illustrates the addition of a storage node (e.g., replacement storage node for a failed storage node) to the storage system of the example. In particular, the newly added storage node is represented by row 410. As the number of source objects in this example is 14, row 410 includes 14 slots (e.g., corresponding to 14 source object "columns") for storing fragments, shown as slots 410a-410n.

Figure 4B:
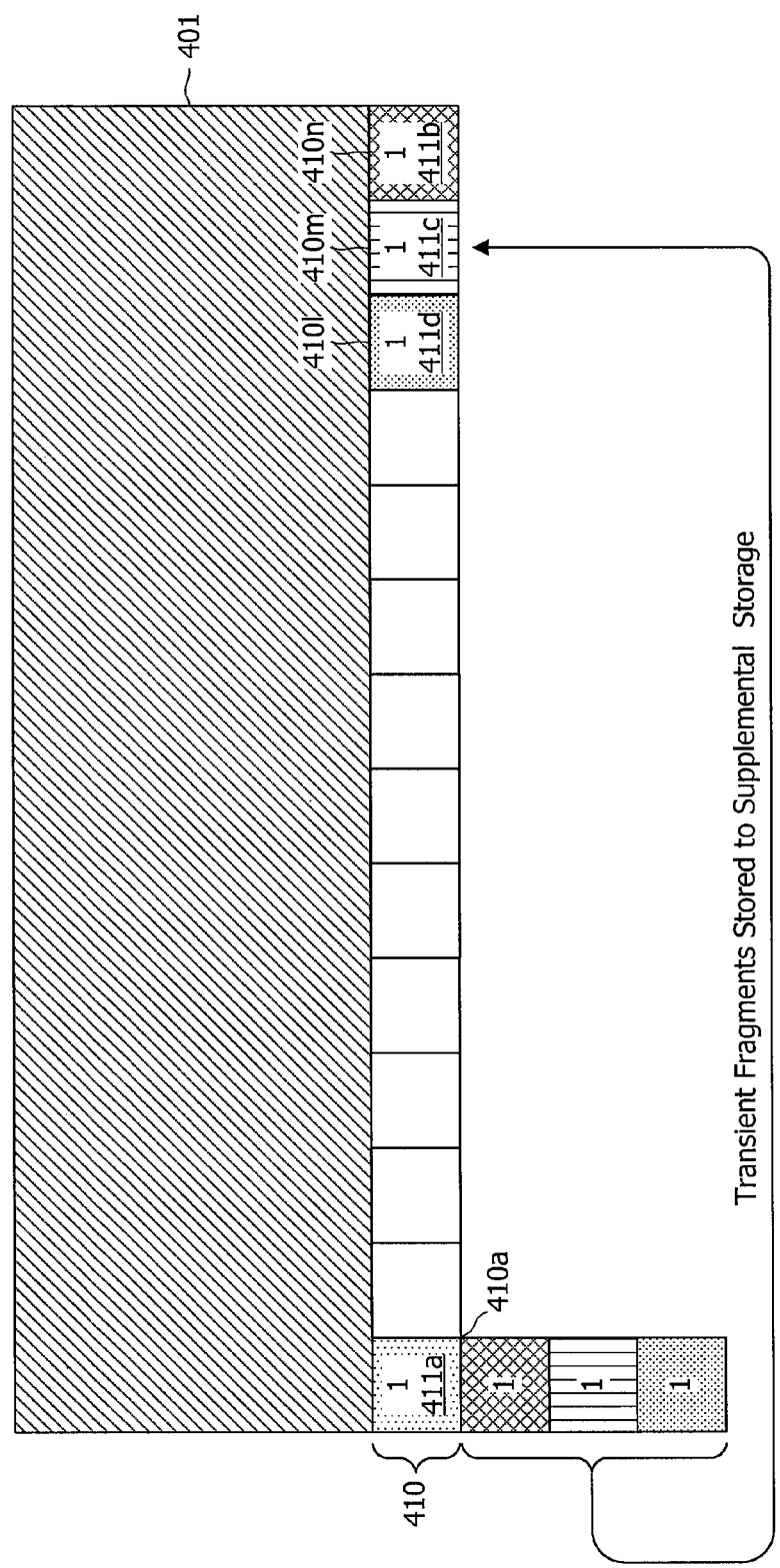

As illustrated in FIG. 4A, the fragment pre-storage repair policy (e.g., fragment pre-storage repair policy 252) of embodiments operates to repair a next source object (e.g., designated source object "1") in the repair queue (e.g., repair queue 254). However, because the fragment pre-storage repair policy is operable to pre-generate and pre-store fragments, a total number of fragments in excess of the existing storage nodes are provided (e.g., pre-generated fragments for the number of supplemental nodes, SN=3). That is, as shown in the illustration of FIG. 4B, the number of fragments generated (e.g., 4 in the illustrated example) is greater than the number of physical storage nodes missing fragments for that object (e.g., 1 in the illustrated example). For example, the 3 additional fragments pre-generated in the example of FIG. 4B may correspond to up to 3 supplemental storage nodes and/or up to 3 storage nodes of the storage system that will be added to the system upon failure of existing storage nodes. In the embodiment illustrated in FIG. 4B, fragment 411a generated for source object 1 is assigned to the newly added storage node of row 410 and is thus "permanently" stored thereon (e.g., as represented by the fragment at slot 410a). Thus, the 'a' in 411a is associated to the P-ESI associated to this node. However, fragments 411b-411d pre-generated for source object 1 are stored as transient fragments on the newly added storage node of row 410 (e.g., as represented by the fragments at slots 4101-410n of the supplemental storage).

Figure 4C:
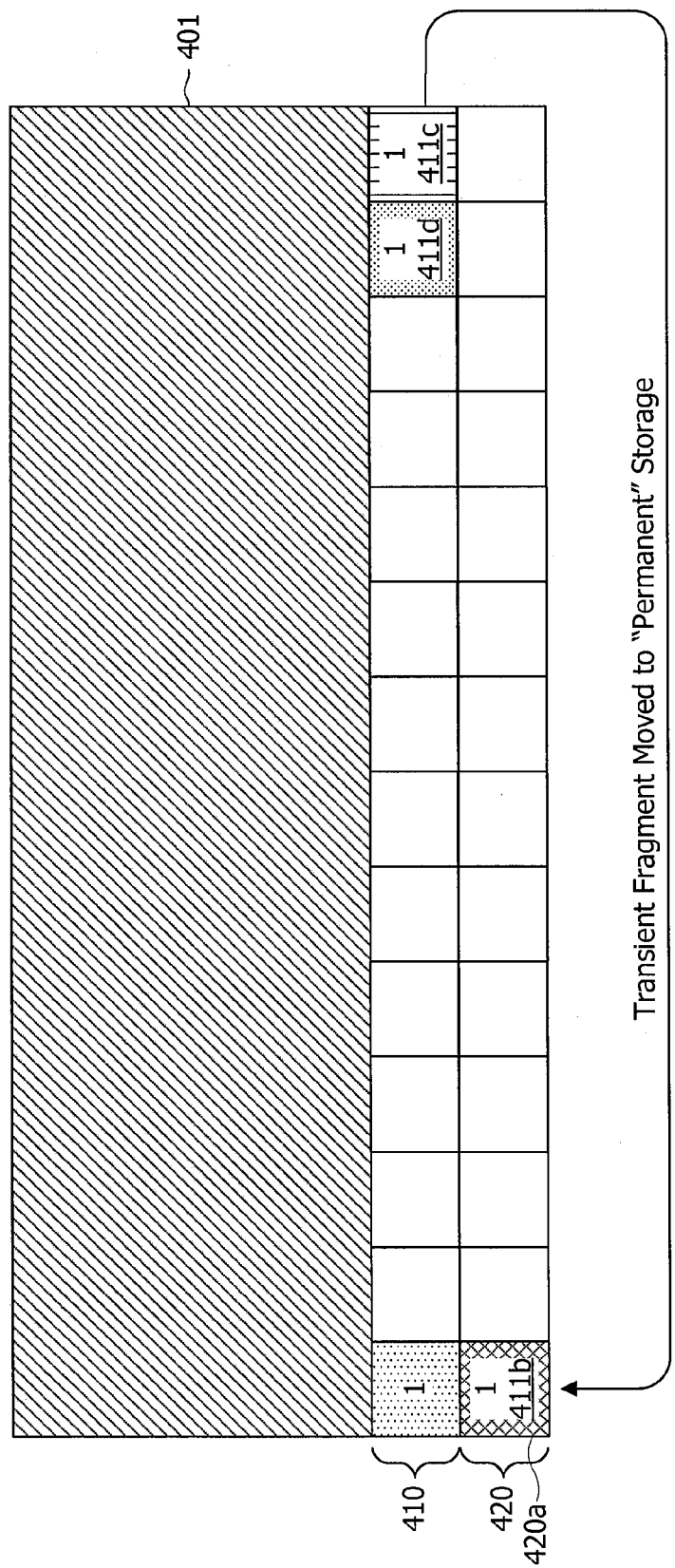

FIG. 4C illustrates the addition of another storage node (e.g., a replacement for another failed storage node) to the storage system of the example. In particular, this added storage node is represented by row 420. It should be appreciated that in operation of the exemplary fragment pre-storage technique, fragments have been pre-generated and pre-stored for later association with and storage to such added storage nodes. Accordingly, in the embodiment illustrated in FIG. 4C, one of the transient fragments (e.g., fragment 411b) is moved to prefill slot 420a of the storage node of row 420 with a fragment for source object 1. Correspondingly, the new storage node has a P-ESI corresponding to the 'b' in 411b. It should be appreciated that moving of this transient fragment to permanent storage causes the supplemental queue (e.g., supplemental storage node queue 256) to shift to the right in the illustrated example. It should be appreciated that this movement is for illustration of the concept only and no physical movement of the data corresponding to these fragments takes place. It should also be appreciated that, although the "permanently" stored fragments for the source objects are not individually designated in area 401, all the fragments in a column of the repair queue for a source object are shifted or otherwise moved in accordance with the shifting or moving of respective "permanently" stored fragments described in the example of FIGS. 4A-4O.

Figure 4D:
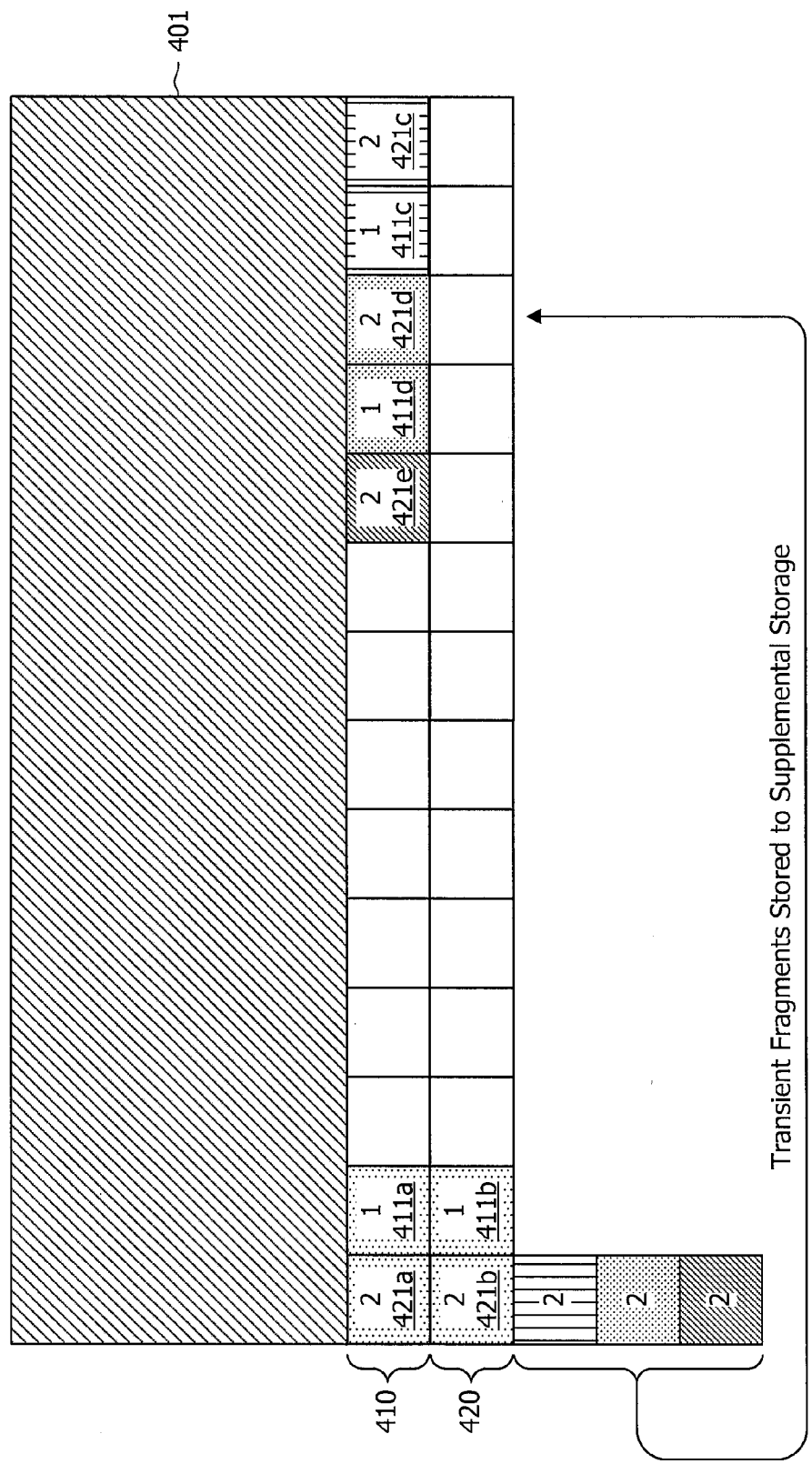

As shown in FIG. 4D, the fragment pre-storage repair policy (e.g., fragment pre-storage repair policy logic 252) of embodiments operates to repair a next source object (e.g., designated source object "2") in the repair queue (e.g., repair queue 254). However, because the fragment pre-storage repair policy is operable to pre-generate and pre-store fragments, a total number of fragments in excess of the existing storage nodes are again provided as shown in FIG. 4D. For example, 3 additional fragments, corresponding to the number of additional supplemental nodes is 3 (SN=3) in this example, are shown as having been pre-generated in FIG. 4D. In the embodiment illustrated in FIG. 4D, fragments 421a and 421b are generated for source object 2 and are assigned to the newly added storage nodes (e.g., represented by rows 410 and 420) added since any previous repair of source object 2 and are thus "permanently" stored thereon (e.g., as represented by fragments in the left most slots in the repair queue corresponding to their having been the most recently written fragments). However, fragments 421c-421e are pre-generated for source object 2 and are stored as transient fragments on the newly added storage node of row 410 (e.g., in slots at the left of the row corresponding to supplemental storage). Row 410 is chosen because the group limit g, which is 2 in this example, has not been reached for any ESI (or supplemental node).

It should be appreciated that pre-generated fragments 411c and 421c, although being for different source objects (i.e., source object 1 and source object 2, respectively), correspond to a same supplemental storage node (e.g., these fragments may have a same T-ESI). Similarly, pre-generated fragments 411d and 421d, although being for different source objects, correspond to a same supplemental storage node, wherein this supplemental storage node is a different supplemental storage node than corresponds to pre-generated fragments 411c and 421c (e.g., fragments 411d and 421d may have a same T-ESI, and that T-ESI may be different than a T-ESI for fragments 411c and 421c). It should also be appreciated that the transient fragment group (i.e., group size g=2 in this example) has been achieved for the supplemental storage node corresponding to fragments 411c and 421c as well as for the supplemental storage node corresponding to fragments 411d and 421d. However, the transient fragment group for the supplemental storage node corresponding to fragment 421e has not been achieved. In FIG. 4D transient fragments corresponding to the same T-ESI for different objects have been depicted as adjacent. The T-ESIs are ordered from right to left in the order in which the T-ESI's will be promoted to P-ESIs. Thus, the next new node will be assigned the P-ESI associated to the 'c' in 411c and 421c. This is only for illustration purposes, no rearranging of fragments is actually performed. This ordering corresponds to the intuitive picture that upon the introduction of a new storage node the set of transient fragments (331 in FIG. 3D) shifts right when the appropriate transient fragments are moved to the new storage node.

Figure 4E:
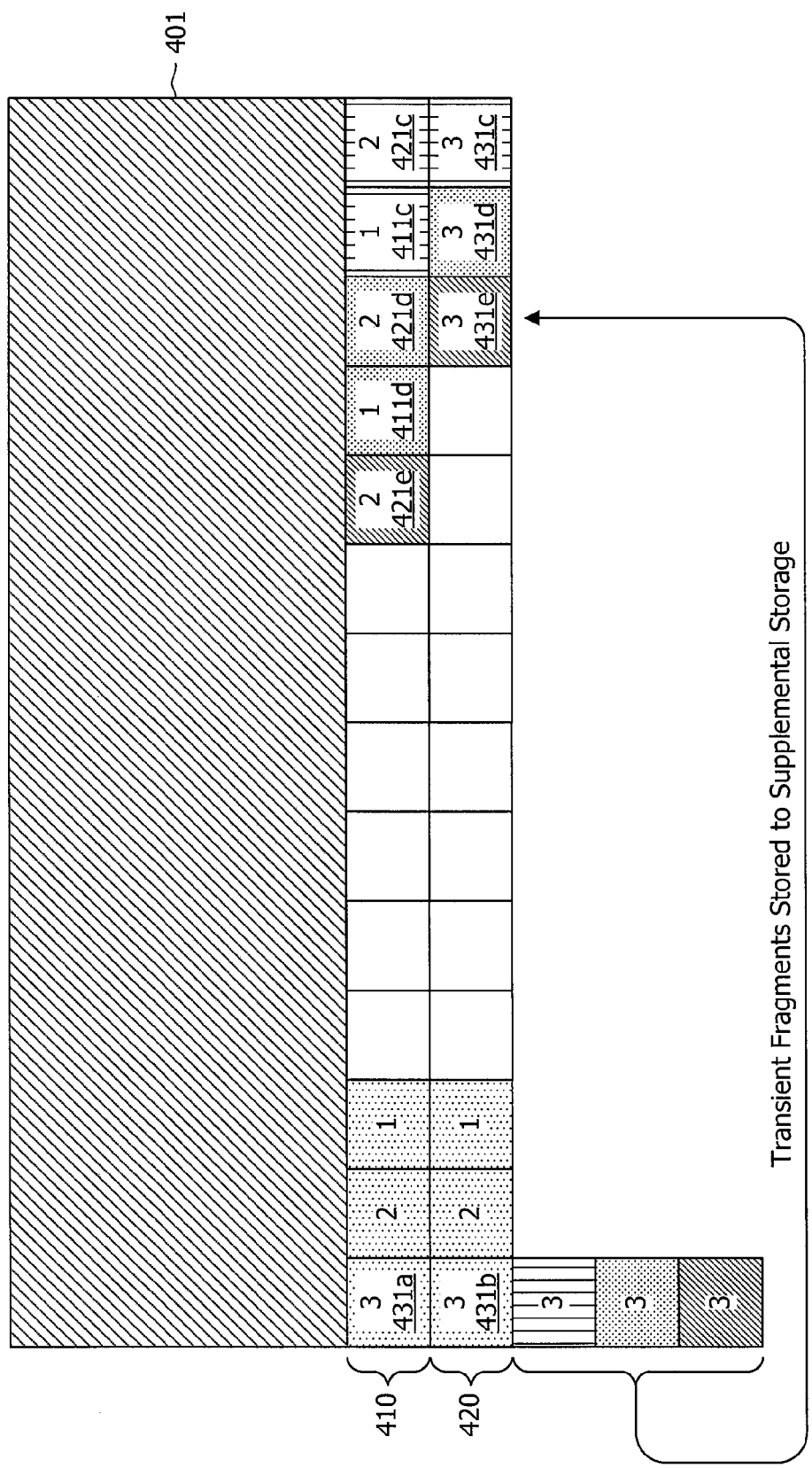

As shown in FIG. 4E, the fragment pre-storage repair policy (e.g., fragment pre-storage repair policy logic 252) of embodiments operates to repair a next source object (e.g., designated source object "3") in the repair queue (e.g., repair queue 254). However, because the fragment pre-storage repair policy is operable to pre-generate and pre-store fragments, a total number of fragments in excess of the existing storage nodes are again provided as shown in FIG. 4E. For example, 3 additional fragments, corresponding to the number of additional supplemental nodes is 3 (SN=3) in this example, are shown as having been pre-generated in FIG. 4E. In the embodiment illustrated in FIG. 4E, fragments 431a and 431b are generated for source object 3 and are assigned to the newly added storage nodes (e.g., represented by rows 410 and 420) added since any previous repair of source object 3 and are thus "permanently" stored thereon (e.g., as represented by fragments in the right most slots in the repair queue corresponding to their having been the most recently written fragments). However, fragments 431c-431e are pre-generated for source object 3 and are stored as transient fragments on the newly added storage node of row 420 (e.g., in slots at the right of the row corresponding to supplemental storage).

It should be appreciated that in the example of FIG. 4E, fragments 431c-431e are stored in slots of storage node 420 that form part of the supplemental storage of the illustrated embodiment. This is because a threshold for the fill of transient fragments in the newly added storage node corresponding to row 410 has been met. Accordingly, fragments 431c-431e are shown as stored in slots of the newly added storage node corresponding to row 420. Here, according to embodiments, the policy that no more than g=2 fragments corresponding to a single transient ESI may be stored on a partial node necessitates that fragments indicated by 431b and 431c be stored on the second partial storage node, 420.

Fragment 431e could be stored on partial storage node 410 without violating this policy but in this example the additional constraint that all transient fragments associated to a given object should be written to a single partial storage node is imposed. This constraint simplifies the organization of the transient fragments according to embodiments. In particular upon failure of a partial storage node the transient fragments lost comprise the bottom most set of transient fragments for the associated objects. These, objects may then need to be moved closer to the head in the queue, but it is clear that the nested erased fragment property is preserved. Another advantage of this constraint is that storage node 420 may coincide with the processor being used to perform the repair of object 3 and that having all transient fragments written to that node reduces usage of network bandwidth.

Figure 4F:
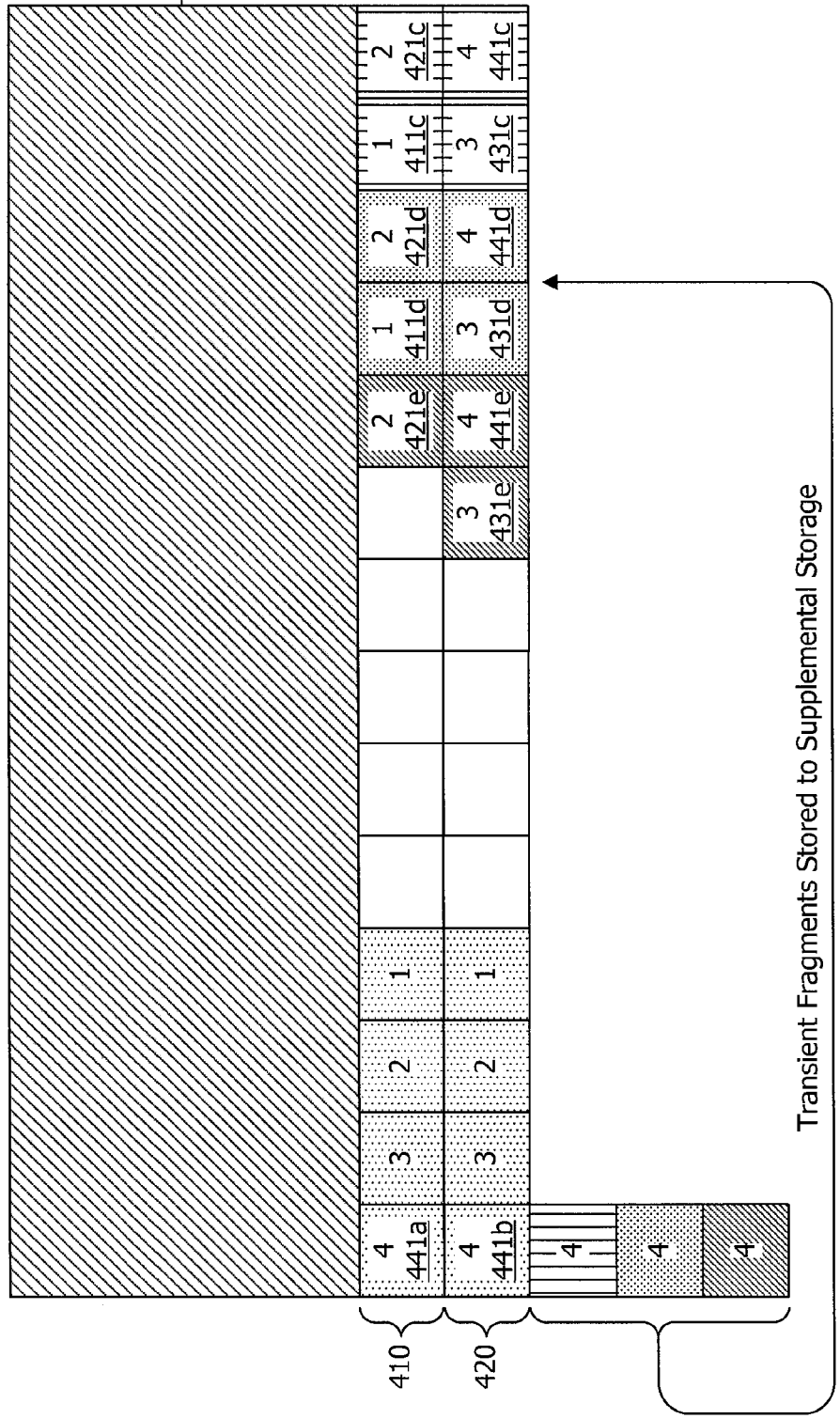

As shown in FIG. 4F, the fragment pre-storage repair policy (e.g., fragment pre-storage repair policy logic 252) of embodiments operates to repair a next source object (e.g., designated source object "4") in the repair queue (e.g., repair queue 254). However, because the fragment pre-storage repair policy is operable to pre-generate and pre-store fragments, a total number of fragments in excess of the existing storage nodes are again provided as shown in FIG. 4F. For example, 3 additional fragments, corresponding to the number of additional supplemental nodes is 3 (SN=3) in this example, are shown as having been pre-generated in FIG. 4F. In the embodiment illustrated in FIG. 4F, fragments 441a and 441b are generated for source object 4 and are assigned to the newly added storage nodes (e.g., represented by rows 410 and 420) added since any previous repair of source object 4 and are thus "permanently" stored thereon (e.g., as represented by fragments in the right most slots in the repair queue corresponding to their having been the most recently written fragments). However, fragments 441c-441e are pre-generated for source object 4 and are stored as transient fragments on the newly added storage node of row 420 (e.g., in slots at the right of the row corresponding to supplemental storage).

Figure 4G:
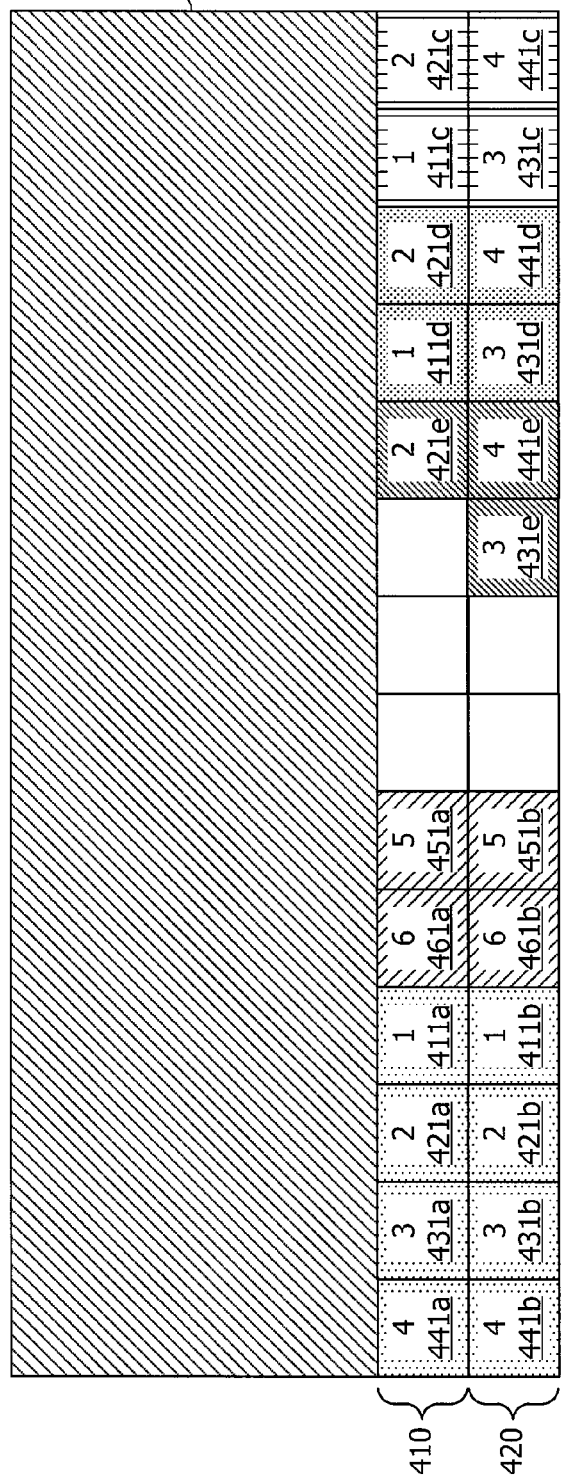

Operation according to embodiments wherein the supplemental storage is essentially filled with pre-generated, pre-stored transient fragments (e.g., fragments 411c, 411d, 421c-421e, 431c-431e, and 441c-441e) is shown in FIG. 4G. In the example, the maximum group size g has been reached for T-ESI c, d, and e in storage node 420. It has also been reached in storage node 410, with the exception for T-ESI e discussed previously. The reason for these constraints is to avoid in the inefficiency of overwriting transient fragments in typical operation. In such a situation, when transient storage is saturated, embodiments may suspend repair until another node fails and a replacement node is added, or proceed with repair potentially overwriting transient fragments. In the example of FIG. 4G the system proceeds with repair. In accordance with this embodiment, when the fragment pre-storage repair policy (e.g., fragment pre-storage repair policy 252) operates to repair the next source object(s) (e.g., designated source objects "5" and "6" in the example of FIG. 4G) in the repair queue (e.g., repair queue 254) and the storage node space utilized for supplemental storage is filled, embodiments of the fragment pre-storage repair policy do not pre-generate and pre-store fragments for these source objects. Thus, fragments 451a and 451b may be generated for source object 5 and assigned to the newly added storage nodes (e.g., represented by rows 410 and 420) added since any previous repair of source object 5, and thus "permanently" stored thereon, without the pre-generation and pre-storage of additional fragments described with respect to the source object repair operations above. Similarly, fragments 461a and 461b may be generated for source object 6 and assigned to the newly added storage nodes (e.g., represented by rows 410 and 420) added since any previous repair of source object 6 and are thus "permanently" stored thereon, without pre-generation and pre-storage of additional fragments.

It should be appreciated that source objects 5 and 6, having been repaired without additional pre-generated and pre-stored fragments, have fewer fragments available than other recently repaired source objects (e.g., source objects 1-4). Thus, source objects 5 and 6 of the embodiment illustrated in FIG. 4G are moved more towards the head of the repair queue (e.g., rather than fragments 451a and 451b for source object 5 and fragments 461a and 461b for source object 6 being represented in the left most slots in the repair queue, these fragments are represented in the repair queue more towards the right than fragments 411a and 411b of source object 1, fragments 421a and 421b of source object 2, fragments 431a and 431b of source object 3, and fragments 441a and 441b of source object 4 in the illustrated embodiment).

Figure 4H:
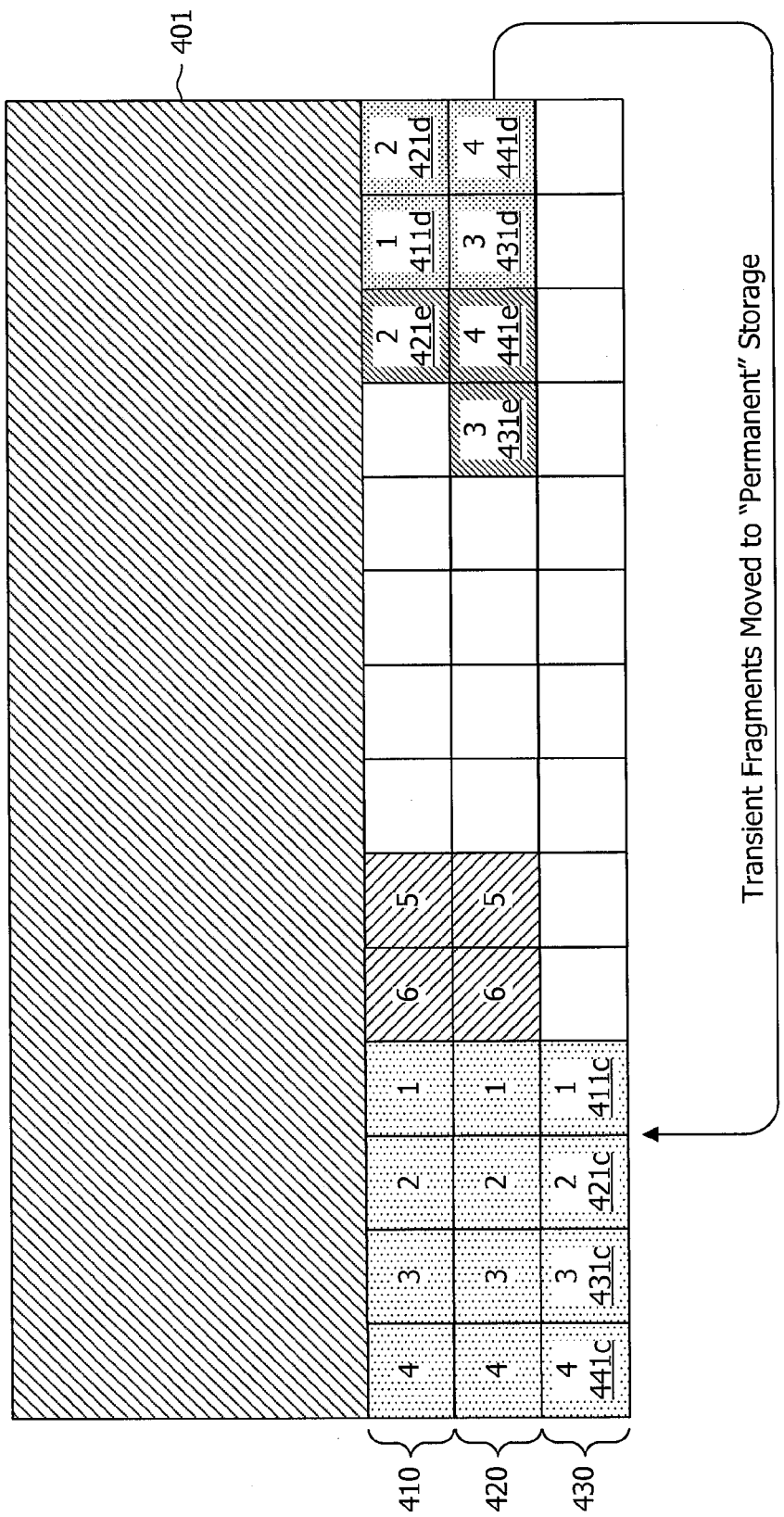

FIG. 4H illustrates the addition of another storage node (e.g., a replacement for another failed storage node) to the storage system of the example. In particular, this added storage node is represented by row 430. It should be appreciated that in operation of the exemplary fragment pre-storage technique, fragments have been pre-generated and pre-stored for later association with and storage to such added storage nodes. Accordingly, in the embodiment illustrated in FIG. 4H, four of the transient fragments (e.g., fragments 411c, 421c, 431c, and 441c) corresponding to T-ESI 'c' that is now a P-ESI, are moved to prefill slots of the storage node of row 420 with fragments for source objects 1-4. It should be appreciated that moving of these transient fragments to permanent storage causes the supplemental queue (e.g., supplemental storage node queue 256) to shift to the right in the illustrated example.

Figure 4I:
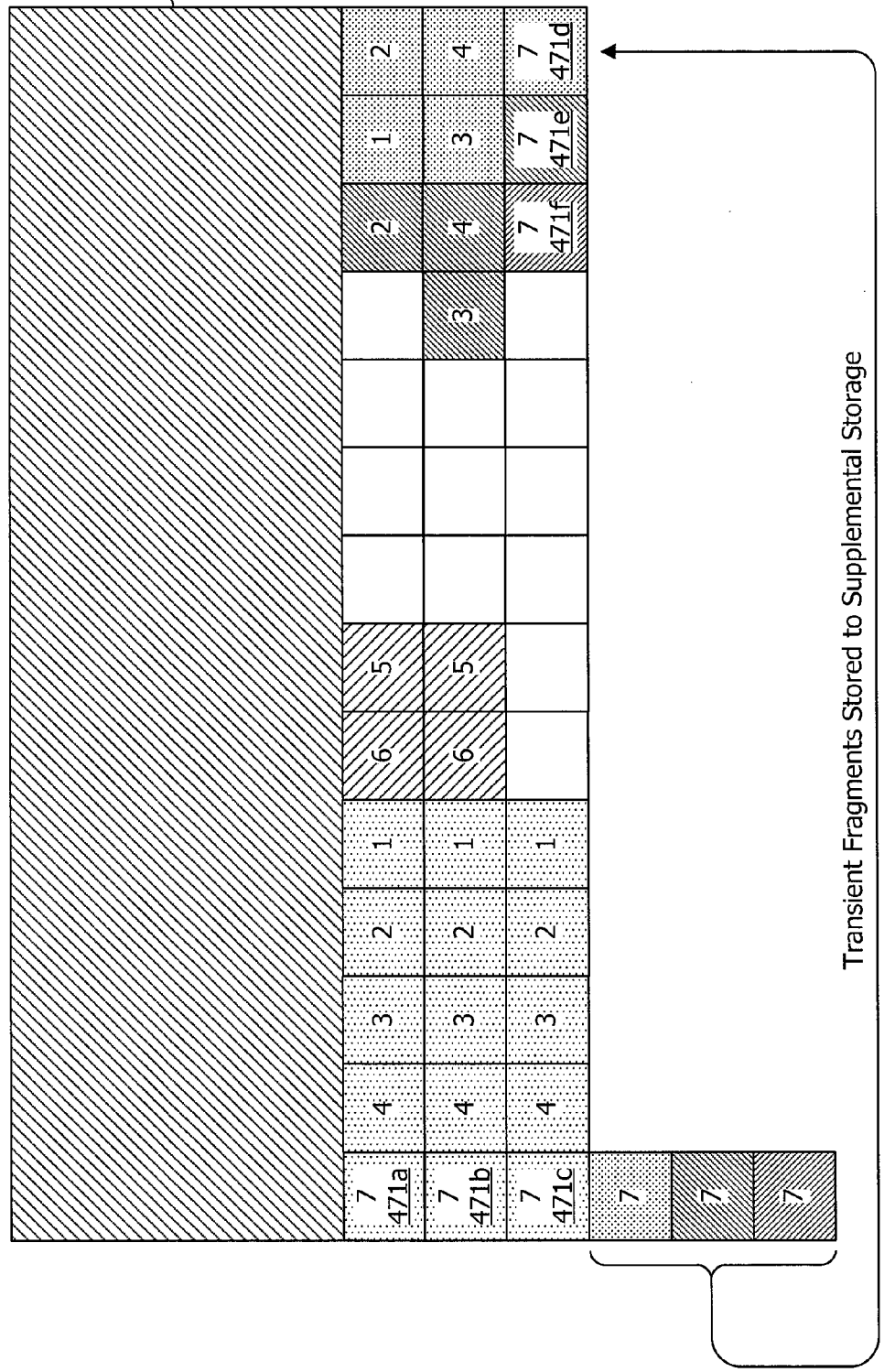

As shown in FIG. 4I, the fragment pre-storage repair policy (e.g., fragment pre-storage repair policy 252) of embodiments operates to repair a next source object (e.g., designated source object "7") in the repair queue (e.g., repair queue 254). However, because the fragment pre-storage repair policy is operable to pre-generate and pre-store fragments, a total number of fragments in excess of the existing storage nodes are again provided as shown in FIG. 4I. For example, 3 additional fragments, corresponding to the number of additional supplemental nodes is 3 (SN=3) in this example, are shown as having been pre-generated in FIG. 4I. In the embodiment illustrated in FIG. 4I, fragments 471a, 471b, and 471c are generated for source object 7 and are assigned to the newly added storage nodes (e.g., represented by rows 410, 420, and 430) added since any previous repair of source object 7 and are thus "permanently" stored thereon (e.g., as represented by fragments in the right most slots in the repair queue corresponding to their having been the most recently written fragments). However, fragments 471d-471f are pre-generated for source object 7 and are stored as transient fragments on the newly added storage node of row 430 (e.g., in slots at the right of the row corresponding to supplemental storage). Note that row 420 was considered saturated with transient fragments because it contained g=2 fragments for the same T-ESI, in fact it contains 2 fragments for both T-ESI 'd' and T-ESI 'e'.

Figure 4J:
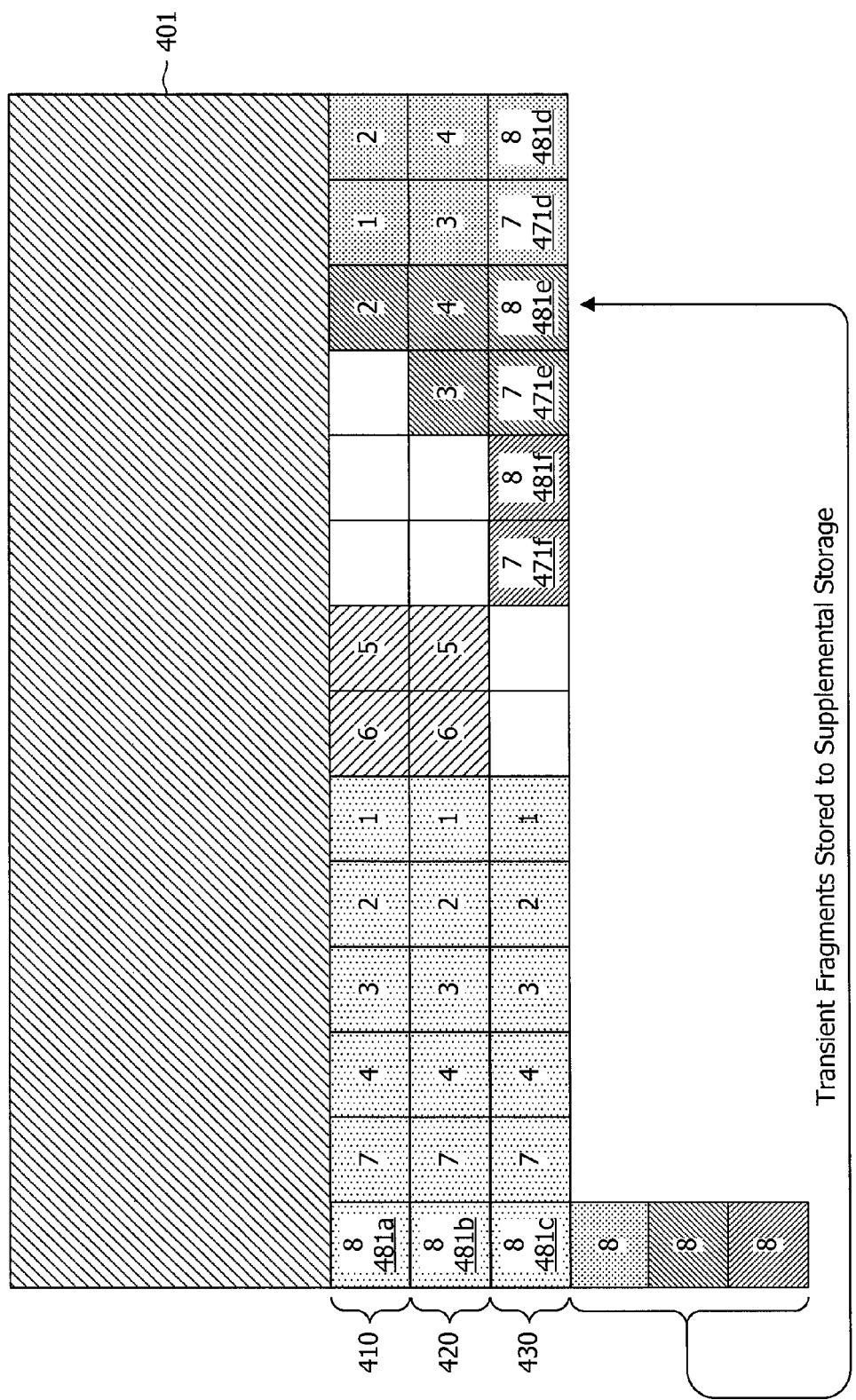

As shown in FIG. 4J, the fragment pre-storage repair policy (e.g., fragment pre-storage repair policy 252) of embodiments operates to repair a next source object (e.g., designated source object "8") in the repair queue (e.g., repair queue 254). However, because the fragment pre-storage repair policy is operable to pre-generate and pre-store fragments, a total number of fragments in excess of the existing storage nodes are again provided as shown in FIG. 4J. For example, 3 additional fragments, corresponding to the number of additional supplemental nodes is 3 (SN=3) in this example, are shown as having been pre-generated in FIG. 4J. In the embodiment illustrated in FIG. 4J, fragments 481a, 481b, and 481c are generated for source object 8 and are assigned to the newly added storage nodes (e.g., represented by rows 410, 420, and 430) added since any previous repair of source object 8 and are thus "permanently" stored thereon (e.g., as represented by fragments in the left most slots in the repair queue corresponding to their having been the most recently written fragments). However, fragments 481d-431f are pre-generated for source object 8 and are stored as transient fragments on the newly added storage node of row 430 (e.g., in slots at the right of the row corresponding to supplemental storage). Note that row 430 is now deemed saturated with transient fragments.

Figure 4K:
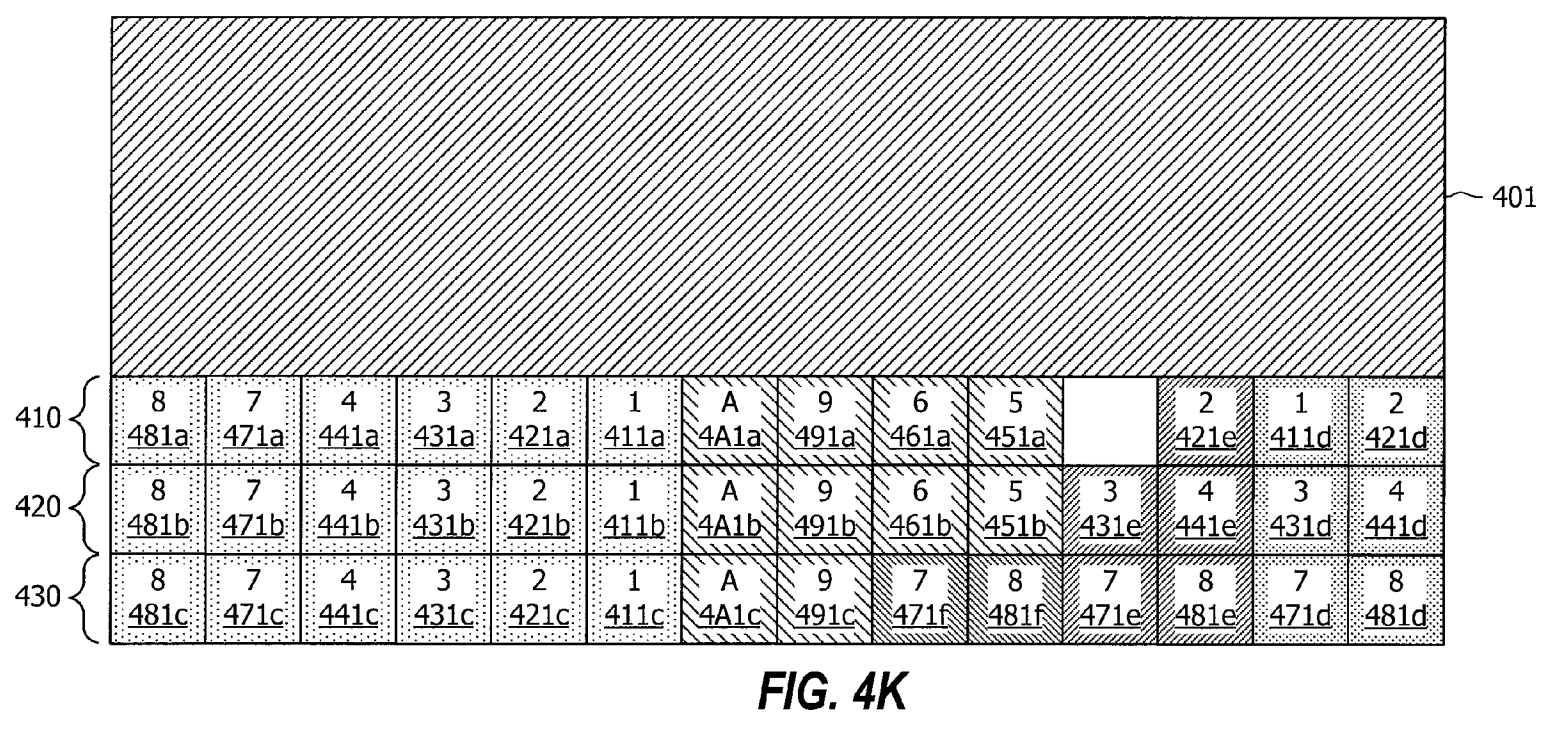

Operation according to embodiments wherein the supplemental storage is essentially filled with pre-generated, pre-stored transient fragments (e.g., fragments 411d, 421d-421e, 431d-431e, 441d-441e, 471d-471f, and 481d-481O is again shown in FIG. 4K. When the fragment pre-storage repair policy (e.g., fragment pre-storage repair policy 252) operates to repair the next source object(s) (e.g., designated source objects "9" and "A" in the example of FIG. 4K) in the repair queue (e.g., repair queue 254) and the storage node space utilized for supplemental storage is filled, embodiments of the fragment pre-storage repair policy do not pre-generate and pre-store fragments for these source objects. Thus, fragments 491a, 491b, and 491c may be generated for source object 9 and assigned to the newly added storage nodes (e.g., represented by rows 410, 420, and 430) added since any previous repair of source object 9, and thus "permanently" stored thereon, without pre-generation and pre-storage of additional fragments. Similarly, fragments 4A1a, 4A1b, and 4A1c may be generated for source object A and assigned to the newly added storage nodes (e.g., represented by rows 410, 420, and 430) added since any previous repair of source object A and are thus "permanently" stored thereon, without pre-generation and pre-storage of additional fragments.

It should be appreciated that, after the repair of source objects 9 and A in the foregoing example, the storage space of the newly added storage nodes (e.g., the storage nodes represented by rows 410-430) is essentially filled (e.g., with "permanently" stored fragments 411a-411c, 421a-421c, 431a-431c, 441a-441c, 451a, 451b, 461a, 461b, 471a-471c, 481a-481c, 491a-491c, and 4A1a-4A1c and "supplementally" stored fragments 411d, 421d, 421e, 431d, 431e, 441d, 441e, 471d-471f, and 481d-481O. As discussed previously, in the example embodiment, repair continues even though space for transient fragments is saturated. Other embodiments may choose to suspend repair until another node failure occurs. Accordingly, in the example embodiment, without the addition of more storage space (e.g., adding another storage node to the storage system), further repair of source objects according to embodiments is presented with a challenge with respect to storage of the fragments generated by the repair policy. For example, the supplemental storage space in the example of FIG. 4K has been filled and thus embodiments may omit the pre-generation and pre-storage of transient fragments with respect to repair of a next source object (e.g., as described above with reference to FIGS. 4G and 4K). Moreover, in this case the storage space not used for "permanently" storing fragments is essentially filled with storing pre-generated transient fragments.

Accordingly, embodiments of a fragment pre-storage repair policy may operate to cease, or temporarily cease, further source object repair until additional storage space becomes available, such as to avoid overwriting of pre-stored transient fragments stored in supplemental storage. For example, a fragment pre-storage repair policy may, during times where the storage space is filled or nearly filled with permanently stored fragments and transient fragments, operate to monitor the available fragments for source objects (particularly the source objects most at risk of data loss, such as the source objects having the fewest available fragments), and defer further repair of source objects where fragments sufficient for a high probability of data recovery remain available. Embodiments may operate to verify decodability of one or more source objects, whereby a determination is made that the available fragments can be used to decode of all source objects in a set of source objects. Where the risk of data loss is determined to be imminent or otherwise unacceptable, embodiments may nevertheless proceed to repair one or more source objects (e.g., overwriting transient fragments stored in supplemental storage with "permanently" stored fragments for these repaired source objects, such as described below). Such embodiments may be implemented to avoid loss of the pre-generated fragments while maintaining the reliability of the source data.

Figure 4L:
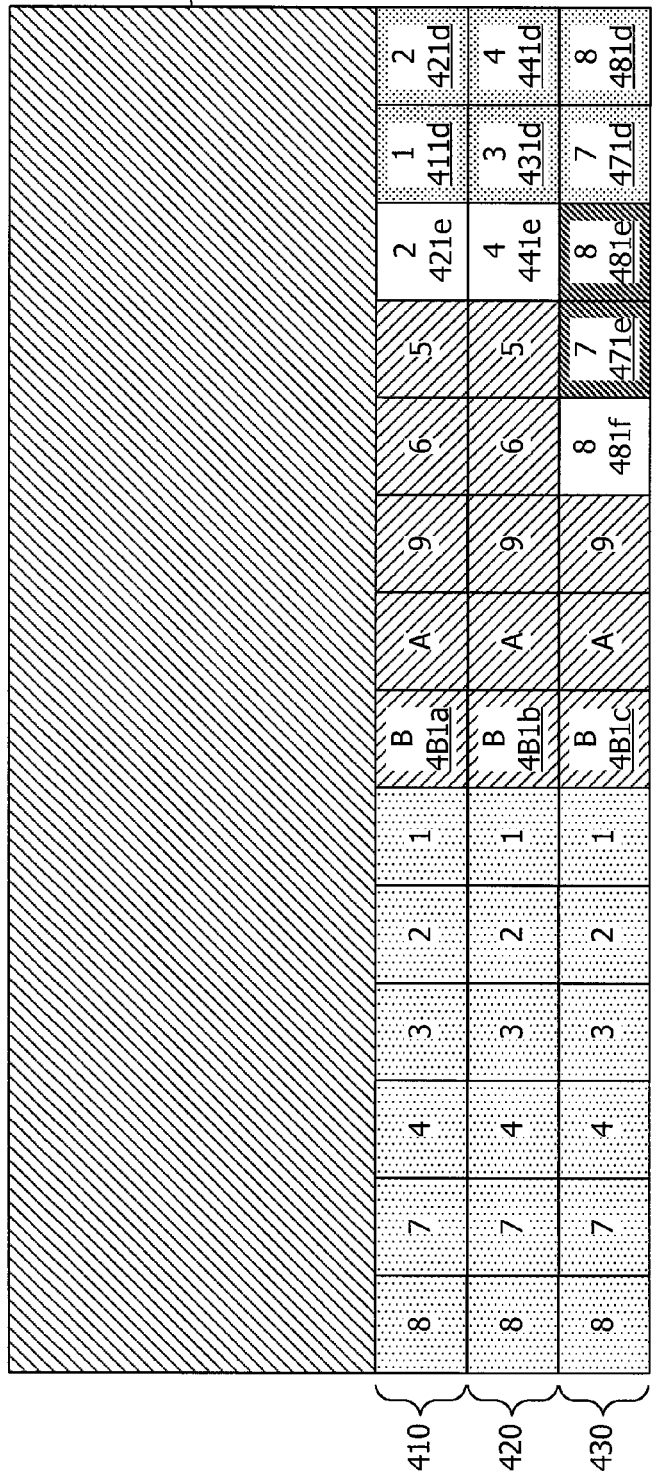

Embodiments of a fragment pre-storage repair policy may, however, operate to provide further repair of source objects even where the storage space is filled or nearly filled with permanently stored fragments and transient fragments. For example, as shown in FIG. 4L, when the fragment pre-storage repair policy (e.g., fragment pre-storage repair policy 252) operates to repair the next source object (e.g., designated source object "B" in the example of FIG. 4L) in the repair queue (e.g., repair queue 254) and the storage node space utilized for both permanent storage and supplemental storage is filled. Accordingly, embodiments of the fragment pre-storage repair policy do not pre-generate and pre-store fragments for this source object. Fragments 4B1a, 4B1b, and 4B1c are, however, generated for source object B and assigned to the newly added storage nodes (e.g., represented by rows 410, 420, and 430) added since any previous repair of source object B, and thus "permanently" stored thereon. However, because the storage space was being used for supplemental storage according to embodiments herein, some pre-stored transient fragments (e.g., no fragments from row 410 since there is a free fragment slot, and fragment 431e from row 420 and fragment 471f from row 430 shown in FIG. 4K are disposed at the left most edge of the supplemental storage in the repair queue) have been erased and/or overwritten. The foregoing source object repair operation may be provided with respect to source object repairs deferred until it is determined that source object repair is desired to avoid risk of data loss (as described above), in accordance with embodiments which the repair policy proceeds with repairs irrespective of the filling of the storage space with permanently stored and supplementally stored fragments, etc.

In operation according to embodiments, if any transient fragment for an object stored in a row (a particular storage node) is overwritten, then the transient fragments for that object should be overwritten in order of newest T-ESI to oldest T-ESI. In the example shown in FIG. 4K, T-ESI f is newer than T-ESI e, and thus transient fragments for objects associated with T-ESI f will be overwritten before transient fragments for objects associated with T-ESI e. This overwriting rule, combined with the rule that all transient fragments for an object are to be stored in the same row (on the same particular storage node), are used in the example embodiment to preserve the nested erased fragment property. From the supplemental queue perspective it can be seen that the removal (or overwriting) of transient fragments in accordance with this rule corresponds to the removal of the right-most portion of the corresponding fragments in the supplemental repair queue. In general, the nested erased fragment property holds if there is an ordering of the ESIs such that the fragments available for an object are associated with a consecutive prefix of the ESIs for every object, and these two rules described above ensure that this property holds for the ordering of the ESIs from oldest to newest. Thus, the nested erased fragment property is preserved when transient fragments are overwritten. Generally, if multiple transient fragments stored in a row (particular storage node) are to be overwritten then generally the transient fragments for objects in the row corresponding to the newest T-ESI should be overwritten, then the transient fragments for objects in the row corresponding to the second newest T-ESI, etc.

Figure 4M:
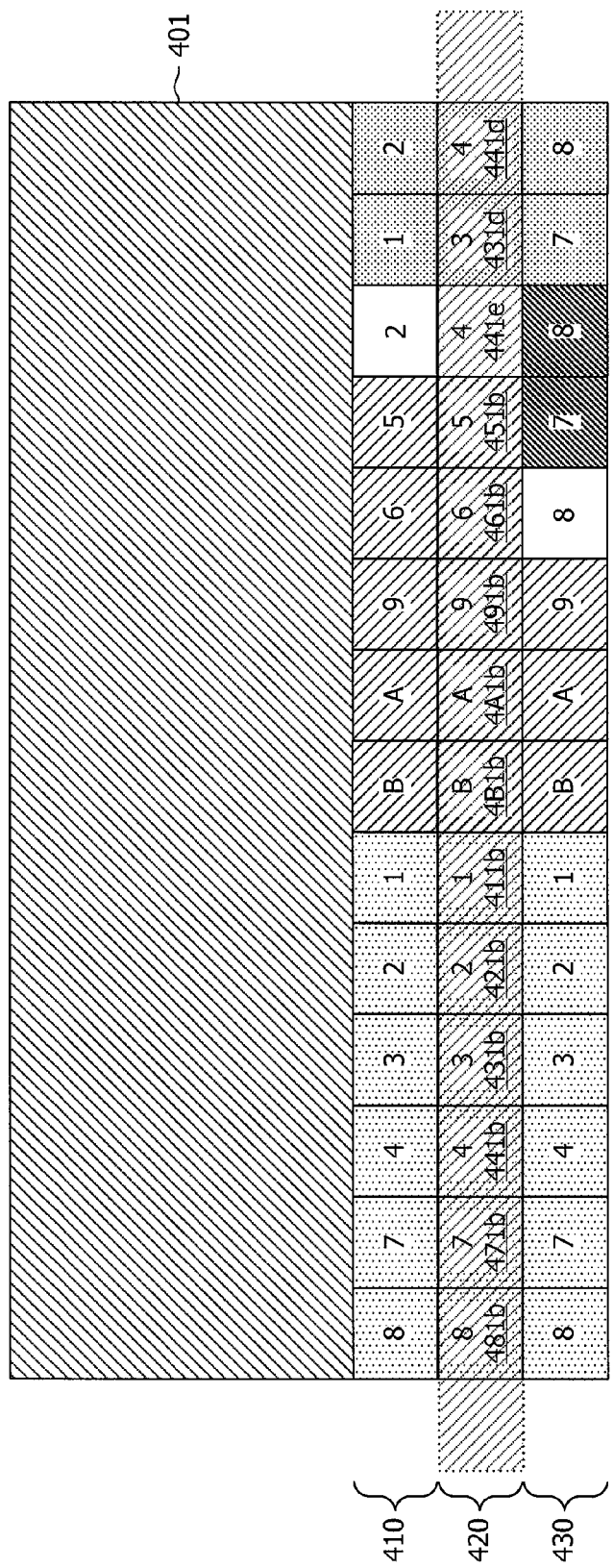
Figure 4N:
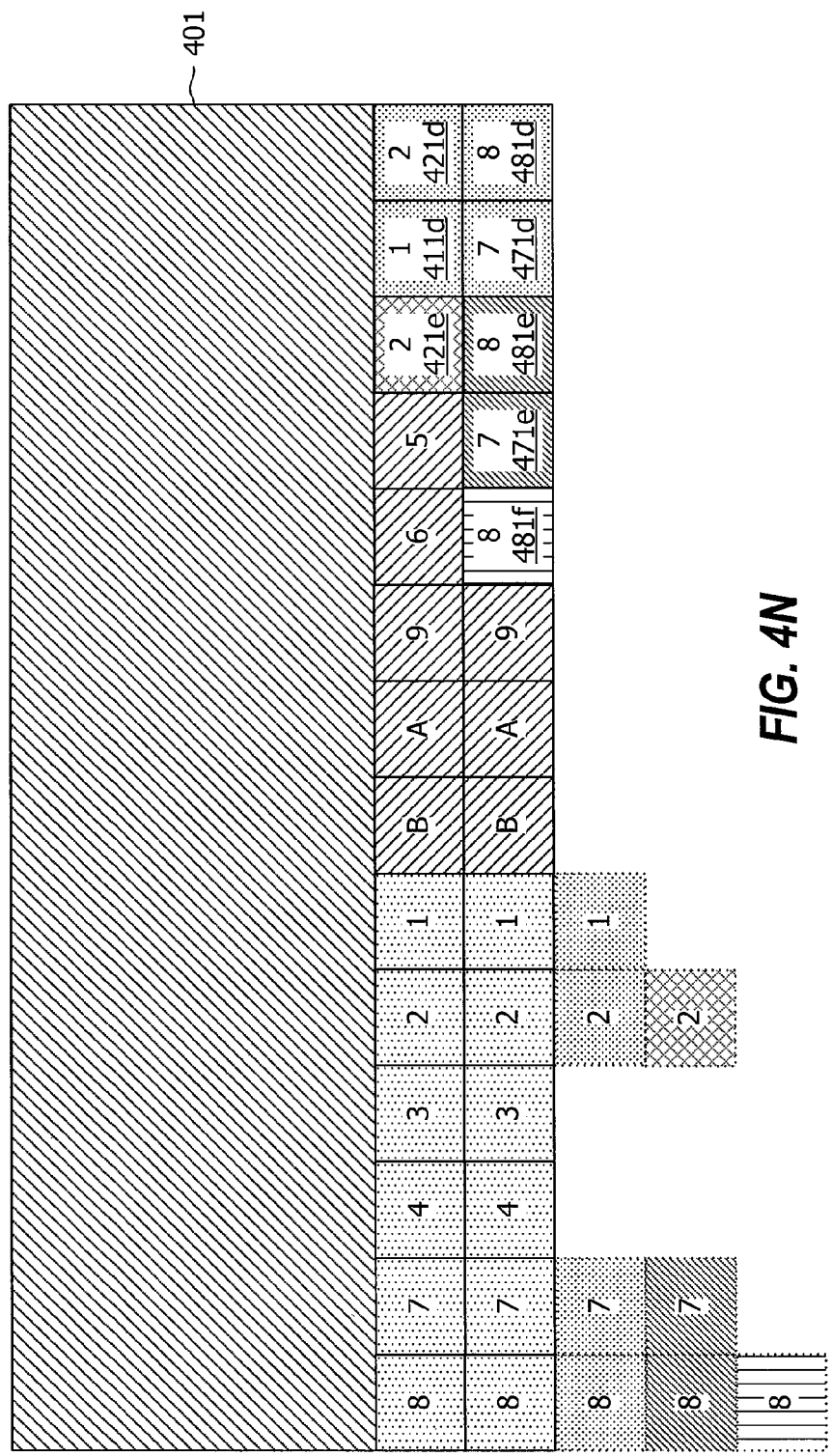
Figure 40:
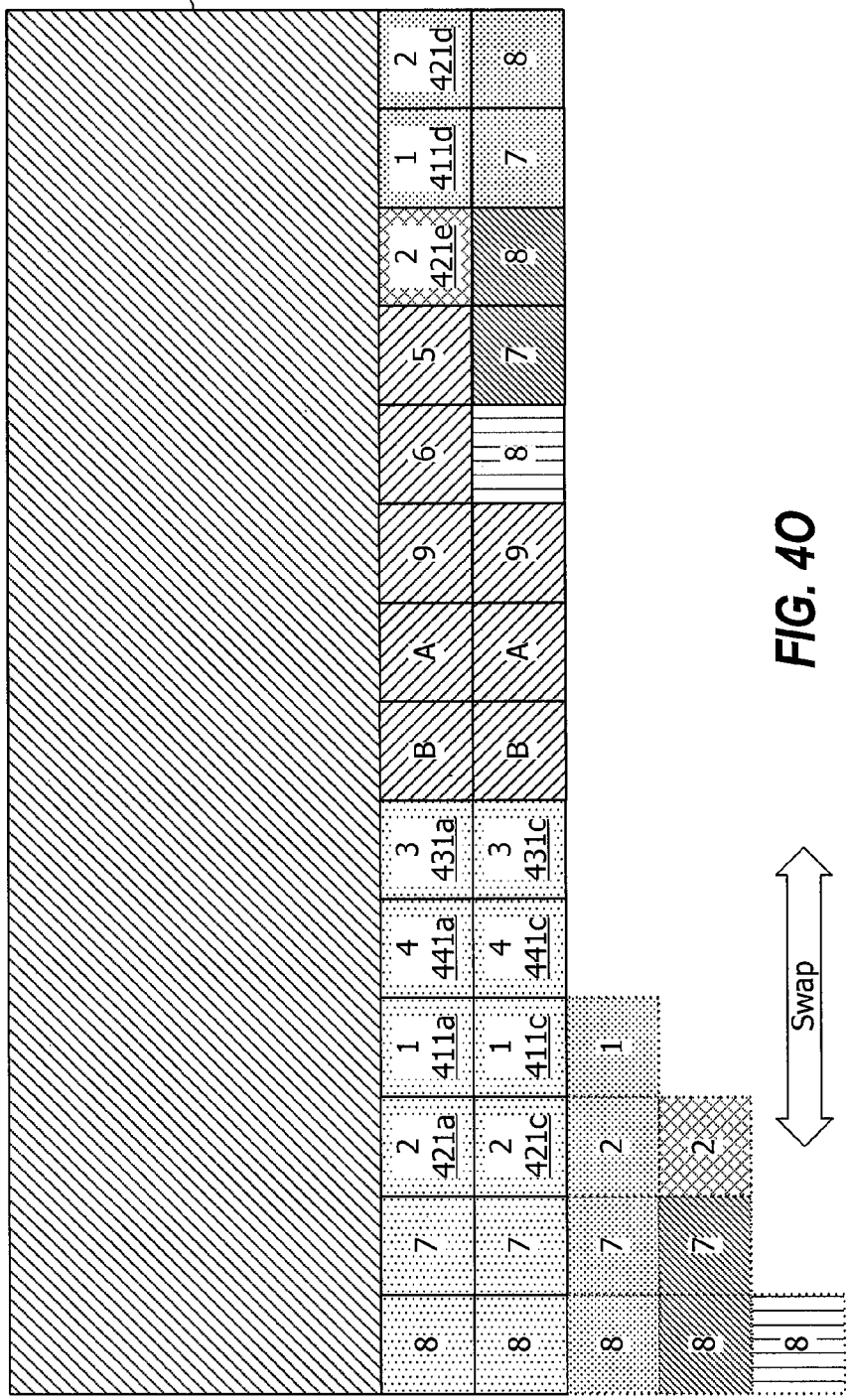

FIG. 4M illustrates the failure of the storage node associated with row 420 of the repair queue. It should be appreciated that row 420 of the example includes both fragments permanently stored to the storage node (e.g., fragments 411*b*-4B 1*b*) and transient fragments pre-stored to the storage node (e.g., fragments 431*d*, 441*d* and 441*e*). The result of the loss of this storage node is illustrated in FIG. 4N, wherein the pre-stored transient fragments of the example (i.e., fragments 411*d*, 421*d*, 421*e*, 471*d*, 471*e*, 481*d*, 481*e* and 481*f*) are also shown in dotted lines to correspond with their respective source objects. As can readily be seen from FIG. 4N, source objects 3 and 4 have fewer available fragments than do source objects 1 and 2 due to the loss of the storage node, despite source objects 1 and 2 being disposed in the repair queue more towards the right (toward the head of the repair queue) than source objects 3 and 4. In operation according to embodiments, the source objects in the repair queue are ordered according to their respective missing fragments, whereby source objects at the head of the repair queue (e.g., source objects having the most missing fragments/least available fragments) are taken up for repair by the repair policy. Accordingly, operation of a fragment pre-storage repair policy of embodiments provides for the reorganization of repair queue to provide for reordering source objects according to their respective missing fragments after the source node loss. Note that this is possible in this case because of the constraints on the writing of transient fragments. In particular, the constraint that all transient fragments from an object should be written to a single node implies that when such a storage node is lost only transient fragments corresponding to that object that are at the bottom of the supplemental queue are lost. Thus the nested erased fragment property is preserved, even though some reordering of the queue may be needed. Recording of the example repair queue is shown in FIG. 4O, wherein the fragments associated with source objects 1 and 2 (e.g., fragments 411*a*, 411*c*, 421*a*, and 421*c*) have essentially swapped positions with the fragments associated with source objects 3 and 4 (e.g., fragments 431*a*, 431*c*, 441*a*, and 441*c*). Accordingly, the source objects are again ordered in the repair queue according to their respective missing fragments according to the illustrated embodiment. It should be understood that such reordering does not involve any actual moving of the fragments but is only a movement of the representation of the fragments in the repair queue that is used to help administer the repair policy.

As shown in the foregoing exemplary operation, a fragment pre-storage repair policy of embodiments provides additional fragments with respect to the repair of source objects wherein those additional fragments may temporarily be stored (e.g., as transient fragments) in otherwise unused storage space (e.g., storage space utilized as supplemental storage space in accordance with the concepts herein). In particular, a fragment pre-storage repair policy of embodiments generates fragments in addition to the number of storage nodes in the storage system, whereby the additional fragments are for supplemental storage nodes (e.g., storage nodes which will be added to the storage system at some point in the future after some portion of their respective fragments have been generated). The pre-generation of these additional fragments facilitates greater repair efficiency and higher data redundancy than would typically be present with respect to a storage system implementing a same number of storage nodes as a storage system adapted according to embodiments herein. For example, the repair process generally consumes appreciable bandwidth in reading the requisite number of available fragments for generating additional fragments, whereas moving transient fragments to permanent storage consumes far less bandwidth. Moreover, the generation of a larger number of fragments during the repair process (e.g., the additional pre-generated fragments of embodiments in addition to the fragments generated for existing storage nodes) provides for higher repair efficiency. Although the additional pre-generated and pre-stored fragments provide redundancy with respect to the data of their respective source objects, such fragments (e.g., fragments stored as transient fragments) are not utilized for typical data access due to their supplemental storage organization in the storage nodes. However, as storage nodes are added to the storage system, these transient fragments are moved from supplemental storage to the later added storage node for "permanent" storage in accordance with the erasure code source object fragment storage organization protocol, to thereby provide the fragments for use in data access and data recovery operation of the storage system.

As can be appreciated from the foregoing exemplary operation of a fragment pre-storage repair policy of embodiments, particularly with reference to FIGS. 3C and 3D above, the storage system may operate as if the storage system had a larger storage overhead ($\beta$) than is physically implemented (e.g., by almost a factor of 2). A lazy repair policy, or other repair policy implementing deferred repair of source objects, may implement source object repairs more slowly in a storage system having larger storage overhead because the number of nodes that can fail before a source object repair is needed to ensure source data recovery is increased. Embodiments may utilize the effectively larger storage overhead to provide improved data reliability without the expense of some portion of the storage nodes typically needed for the level of data redundancy implemented. Additionally or alternatively, embodiments may utilize the effectively larger storage overhead to implement a repair bandwidth (R) providing higher the repair efficiency.

Although the foregoing exemplary operation has been described with respect to situations in which the storage space designated as supplemental storage space is filled and thus the additional fragments (e.g., a number of additional fragments corresponding to the number of additional supplemental nodes, such as SN=3 in the above example) were not pre-generated, embodiments may operate to provide for pre-generation of a partial number of additional fragments (e.g., <3 additional fragments in the above example). For example, where storage space remains available in the supplemental storage designated according to embodiments, some partial portion of the additional fragments that can be accommodated by this available supplemental storage may be pre-generated and pre-stored as transient fragments herein.

Flow 500 provides an example of operation of a simple fragment pre-storage repair policy for one of the M storage nodes of the system, hereinafter referred to as the current storage node. Flow 500 may, for example, be implemented by fragment pre-storage repair policy 252 in accordance with embodiments herein.

At block 501 of the illustrated embodiment of flow 500 a determination is made as to whether a storage node is added to the storage system. For example, a storage node may be added in response to a storage node that has been determined to fail. It is assumed in the illustrated example that a storage node contains no data when it is added. If no storage node is added then processing according to the illustrated embodiment returns to block 501. However, if a storage node is added to the storage system then processing, according to the illustrated embodiment proceeds to block 502.

At block 502, let/be an ESI assigned to the added storage node. In operation according to the illustrated embodiment, all transient fragments associated with ESI/in supplemental storage of the current storage node are moved to permanent storage of the added storage node. The processing according to block 502 of embodiments frees up an amount of space that is approximately the size of all transient fragments stored in the supplemental storage of the current storage node associated with ESIs assigned to the added storage node.

At block 503 of the illustrated embodiment, a list of transient ESIs and a set of objects for which to generate transient fragments are determined.

Correspondingly, at block 504, transient fragments associated with the list of transient ESIs and the set of objects, determined at block 503, are pre-generated and stored in supplemental storage of the current storage node in operation according to embodiments.

At block 505 of the illustrated embodiment, a set of objects for which to generate fragments associated with the ESI (or ESIs) assigned to the current storage node are determined. In operation according to embodiments, the fragments for the determined set of objects are generated and stored in permanent storage at the current storage node.

Figure 5:
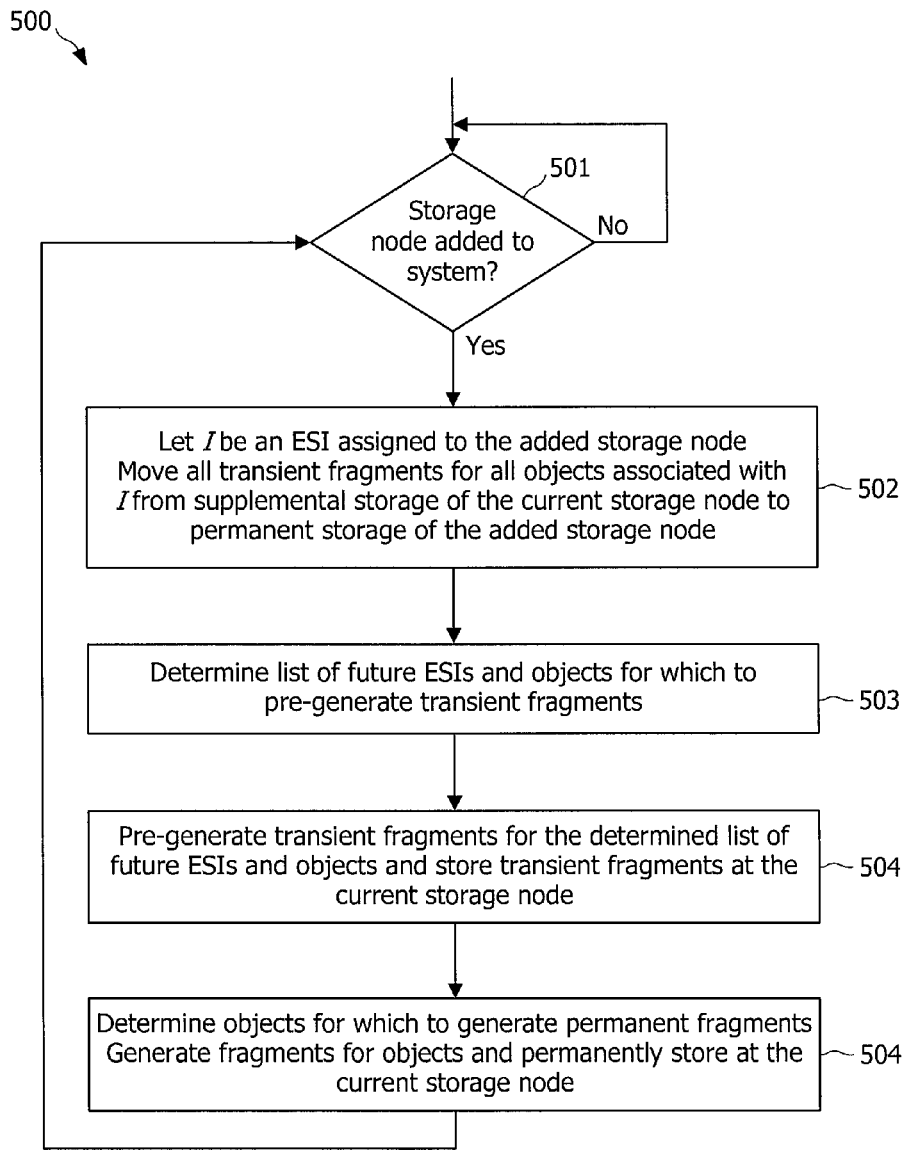
FIG. 5 shows a high level flow diagram of operation according to a fragment pre-storage repair technique of embodiments of the present disclosure.

An advantage of the exemplary embodiment described above with reference to FIG. 5 is that when transient fragments are pre-generated at a current storage node and stored on the current storage node in supplemental storage (block 504), the only repair traffic that travels over the network (from one node to the other) is the traffic to read fragments for an object to pre-generate transient fragments. The transient fragments so pre-generated do not travel over the network at this point but instead are stored locally at the current storage node. Eventually (in block 502), the transient fragments so pre-generated are transferred over the network to a permanent storage node. Thus, overall, each fragment read by the pre-storage repair policy and each transient fragment pre-generated by the pre-storage repair policy is moved over the network at most once.

There are many variants of the fragment pre-storage repair policy described above that provide additional benefits. For example, instead of triggering repair of objects (block 504) based on adding a storage node to the system (block 501), the repair traffic can be smoothed out. An embodiment adapted to provide such smoothed repair traffic may, for example, use a leaky bucket implementation wherein an added storage node count c is maintained to indicate the amount of repair work that has been triggered by added storage nodes that has not yet been executed. Thus, when a storage node is added, the added storage node count c is incremented by one to indicate a storage node has been added but the corresponding repair has not been performed. Then, repair can proceed at a regular rate, and as repair occurs the added storage node count c can be decremented (including fractional decrements), wherein the decrement is by an amount of one when an aggregate of O/SN objects have been repaired. Then, the repair rate can be smoothly moderated by basing the repair rate on the value of c so that c maintains a value between zero and a predetermined upper bound B while at the same time maintaining a relative smooth rate of decrease of c (where the rate of decrease of c is determined by the repair rate). As another variant, there may be a target value for c, i.e., a positive value T, wherein the current read rate R of the pre-storage repair policy is set to $e^{\Psi(c-T)} \cdot L \cdot O/SN$, where $\Psi$ is a fixed positive value, and L is a current average rate at which fragment data is lost from the system due to failing nodes. A potential cost of providing smoothness in the repair rate is slightly additional space for transient fragments in supplemental storage, wherein the additional space depends on B. An advantage is that the peak read repair rate can be smoothed to essentially equal the average read repair rate, wherein the smoothness depends on B.

As another variant, the transient fragments in supplemental storage on the current storage node can be moved at a smoother rate to permanent storage on the added storage node assigned their associated ESI (block 502), using methods similar to those described above for smoothing the read repair rate of the pre-storage repair policy. For example, instead of immediately moving the transient fragments to permanent storage on the added storage node, the movement of transient fragments can be performed at a smooth rate. A potential cost of providing smoothness is that slightly more storage overhead may be required, in order to ensure that there are enough complete storage nodes at all points in time, as an added storage node is not complete until all fragments for all objects have been received. An advantage is that the peak repair bandwidth used for moving transient fragments to permanent storage on added storage nodes can be much lower, approaching the average repair bandwidth for this movement.

As another variant, the fragments associated with the ESI (or ESIs) assigned to the current storage node can be generated at a smoother rate (block 505), using methods similar to those described above for smoothing the read repair rate of the pre-storage repair policy. For example, instead of immediately generating the fragments and storing them in permanent storage on the current storage node, the generation of fragments can be performed at a smooth rate. A potential cost of providing smoothness is that slightly more storage overhead may be required, in order to ensure that there are enough complete storage nodes at all points in time, as the current storage node is not complete until all fragments for all objects have been received. An advantage is that the peak read repair bandwidth used for generating fragments and storing them to permanent storage on the current storage node can be much lower, approaching the average read repair bandwidth for this generation.

As another variant, when a current storage node fails, all of the transient fragments stored in supplemental storage are lost (as well as the fragments stored in permanent storage associated with the ESI assigned to the current storage node). Thus, when a current storage node fails, the pre-generation of the transient fragments lost due to the failure can be reassigned to other current storage nodes according to this variant. As still another variant, as the pre-storage repair policy is being executed on a current storage node, the transient fragments assigned to be pre-generated by that current storage node may be re-assigned to other storage nodes. For example, a current storage node that is currently responsible for pre-generation of a larger than average number of transient fragments may re-assign a fraction of these transient fragments to other nodes as the transient fragments become ready for pre-generation.

As other variants, there are many different alternatives for deciding which transient ESIs, and how many transient ESIs, to add to the future repair queue. For example, one alternative is to have an ordered pool of potential ESIs P, where the number of ESIs in P is at least the maximum of the number of transient ESIs and permanent ESIs at any point in time for the system. Each time a transient ESI is to be added to the future repair queue, the smallest ESI in the pool P that is not either a transient ESI or a permanent ESI is used. As another variant, the pool of potential ESIs P may exclude any ESI that corresponds to a source fragment. As another variant, the next ESI added to the list of transient ESIs may be selected to be a source ESI whenever there is a source ESI that is not currently in the list of transient ESIs and not a permanent ESI. Which ESIs to add to the list of transient ESIs may also be determined, at least in part, based on the set of currently permanent ESIs and current list of transient ESIs and which combinations of additional ESIs would most improve the reliability of decoding, for example when using an FEC code that is not a priori known to be MDS, such as the RaptorQ code.

As another variant, the set of current storage nodes that are responsible for executing the pre-storage repair policy may not be the set of all currently active storage nodes, but instead may be restricted to a subset. For example, such current storage nodes may be restricted to those storage nodes that are partial storage nodes, i.e., storage nodes that are not complete.

It should be appreciated that the concepts herein are not limited to application with respect to implementing supplemental storage with respect to storage space remaining unused awaiting fragment generation by a repair policy implementing deferred source object repair. Accordingly, embodiments may establish some portion of storage space as supplemental storage overhead that is reserved for the pre-storage of pre-generated fragments (referred to herein as a reserved supplemental storage implementation). For example, in a reserved supplemental storage implementation of embodiments, some portion of storage capacity may be reserved on each storage node as supplemental storage overhead (A) for repair functionality. In accordance with embodiments, there may thus be two types of reserved repair capacity including the per storage node supplemental storage overhead, wherein an A fraction (e.g., A≈0.2 of the storage capacity according to embodiments) of capacity per storage node is reserved for repair, and the additional storage node overhead, wherein a $\beta$ (e.g., $\beta$≈0.1 of the storage capacity according to embodiments) fraction of the storage nodes are redundant (e.g., a fragment for each object is stored on each of M storage nodes, wherein any $k=M\cdot(1-\beta)$ fragments of an object are sufficient to recover the object).

The amount of storage that is set aside for supplemental storage according to embodiments of reserved supplemental storage implementations may be fixed or dynamically changed. For example, a storage system implementing reserved supplemental storage according to concepts herein may comprise an amount of reserved storage capacity that can be changed dynamically as the system progresses over time. As an example of such dynamically changed reserved storage capacity, less dedicated supplemental storage space may be needed if the amount of used repair bandwidth is substantially less than the available bandwidth, and thus a reserved supplemental storage implementation may operate to dynamically reduce the amount of space dedicated to supplemental storage to the point where the repair bandwidth increases but is still below the available bandwidth. The amount of storage dedicated to supplemental storage can be implemented according to embodiments by dynamically altering the value of SN (i.e., the number of supplemental storage nodes), wherein SN is reduced at some point and thus transient fragments generated for object from the point of reduction on will have less transient fragments generated and stored.

In operation according to embodiments of a reserved supplemental storage implementation, the fragment pre-storage repair policy may operate such that each of the M storage nodes pre-generates repair for a 1/M fraction of the source objects, wherein the A fraction of capacity per storage node is used to store this pre-generated repair. Thus, the fragment pre-storage repair policy is distributed smoothly among the M storage nodes. For example, the fragment pre-storage repair policy of a reserved supplemental storage implementation may pre-generate, for each storage node, $SN \approx 2 \cdot A \cdot M$ (for small A, for larger A a more precise estimate is $SN \approx 2 \cdot A \cdot M/(1-A)$) fragments associated with transient ESIs that will be assigned to storage nodes added to the system in the future (e.g., added in response to storage nodes that fail in the future), wherein the repair process operates similar to a lazy repair with $2 \cdot A$ redundancy. Thus, embodiments may make redundant (e.g., a fragment for each object is stored on each of M storage nodes, wherein any $k=M\cdot(1-\beta)$ fragments of an object are sufficient to recover the object fragments available for all source objects.

In operation, each storage node of embodiments carries a fragment for each source object with an ESI assigned to that storage node. The number of fragments needed to recover a source object (k) may be defined as $k=M\cdot(1-\beta)$, where M is the number of storage nodes and $\beta$ is the fraction of additional storage nodes reserved for repair functionality and let $RN=M\cdot\beta$ be the number of storage nodes beyond k in the system. However, SN fragments are pre-generated for future storage nodes added to the system (often in response to storage nodes failing in the future), and stored in the A fraction of storage capacity designated for supplemental storage overhead (e.g., associated with SN, or approximately $2\cdot A \cdot M$, transient ESIs for supplemental storage nodes). When an additional storage node is added to the storage system, the next transient ESI may be assigned to the storage node (e.g., assigned as a permanent ESI) and the transient fragments with permanent ESI may be moved to the storage node. There are many ways to determine which storage nodes perform repair for which source objects. For example, the source objects may be round robin distributed to the storage nodes. As another example, there may be a higher-level process that dynamically assigns (and possibly re-assigns) source objects to storage nodes based on how the repair processes for each storage node are progressing globally. Furthermore, there are many ways to determine which set of transient ESIs are used by each of the storage nodes. For example, a pre-determined set of transient ESIs may be cycled through and used by the storage nodes, in which case the sets of transient ESIs used by each of the storage nodes for the source objects assigned to those storage nodes may be largely similar. As another example, each storage node may independently determine the set of transient ESIs for which to pre-generate transient fragments for the source objects assigned to that storage node.

Figure 6:
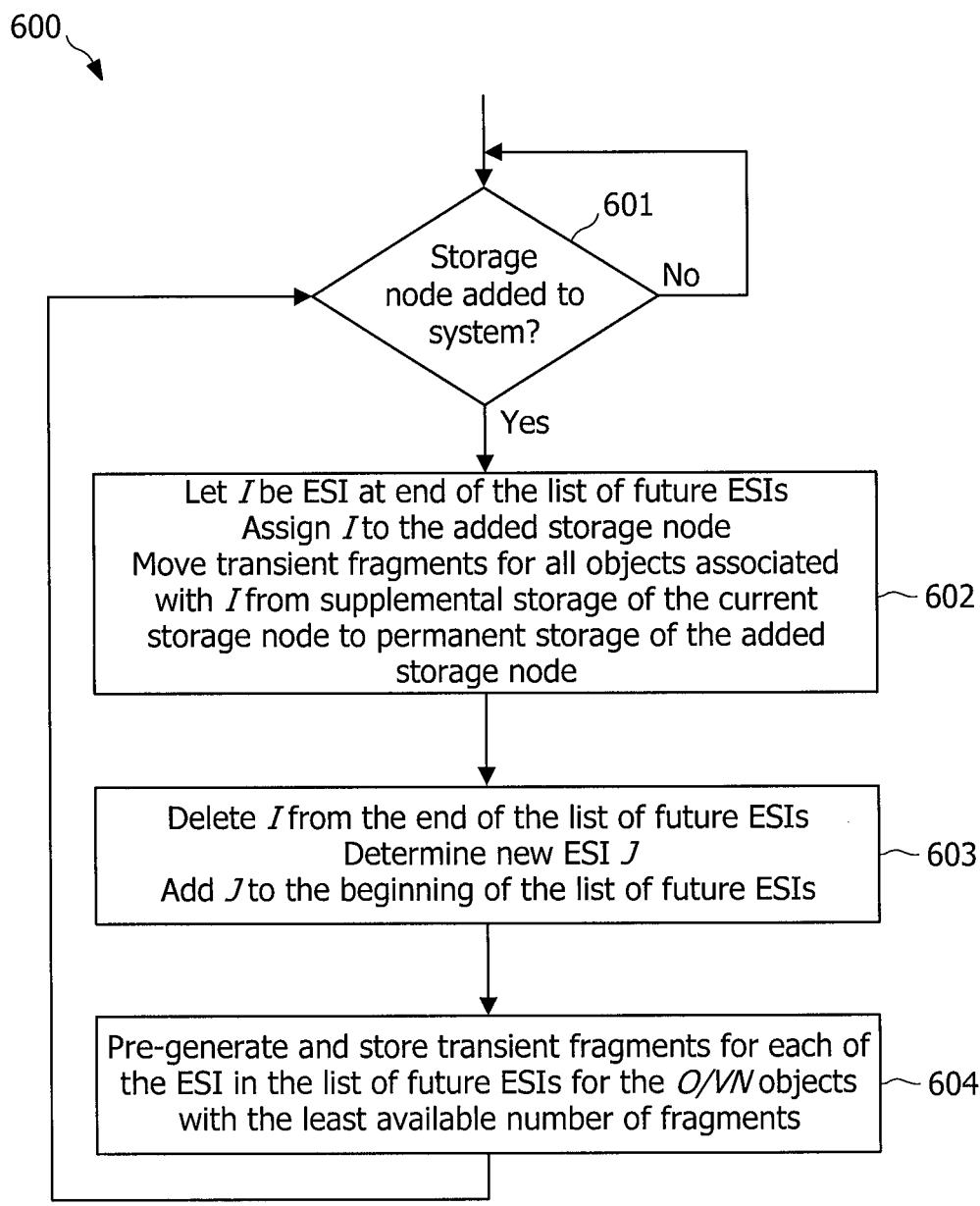
FIG. 6 shows a high level flow diagram of operation according to a reserved supplemental storage implementation of embodiments of the present disclosure.

Having described embodiments of a reserved supplemental storage implementation above, attention is directed to FIG. 6 wherein operation according to a reserved supplemental storage implementation of embodiments is shown as flow 600. Flow 600 may, for example, be implemented by fragment pre-storage repair policy 252 in accordance with embodiments herein.

Flow 600 provides an example of a simple fragment pre-storage repair policy for one of the M storage nodes of the system, hereinafter referred to as the current storage node. In operation according to embodiments of flow 600, an ordered list of the objects assigned to the current storage node is maintained, wherein the ordering of the objects are according to the number of available transient fragments for the object in supplemental storage at the current storage node. It is assumed for simplicity of description that a fixed number O of objects are assigned to the current storage node to repair, and that all objects are the same size, although these assumptions are not restrictions of embodiments as one skilled in the art will recognize. In understanding operation according to flow 600 of embodiments, assume that there are SN ESIs in the transient ESI list, and that there are no ESIs in common between the transient ESI list and the set of ESIs assigned to the M storage nodes.

At block 601 of the illustrated embodiment of flow 600 a determination is made as to whether a storage node is added to the storage system. For example, a storage node may be added in response to a storage node that has been determined to fail. It is assumed that a storage node contains no data when it is added. If no storage node is added then processing according to the illustrated embodiment returns to block 501. However, if a storage node is added to the storage system then processing, according to the illustrated embodiment proceeds to block 602.

At block 602, the ESI I at the end of the list of transient ESIs is assigned to the added storage node, and all transient fragments associated with ESI I in supplemental storage of the current storage node are moved to permanent storage of the added storage node. In general, the ESI at the end of the list of transient ESIs will be the ESI that has been on the list the longest, and thus is the ESI for which the maximal number of transient fragments for objects have been pre-generated and stored in supplemental storage of the current storage node. The processing according to block 602 of embodiments frees up an amount of space that is up to O fragments in size in the supplemental storage of the current storage node, i.e., up to one transient fragment for each of the O objects may be moved to permanent storage and thus the freed supplemental space on the current storage node is up to O fragments in size. Furthermore, if transient fragments associated with ESI I have been pre-generated and stored in supplemental storage of the current storage node for all objects assigned for repair to the current storage node, and if this is true for each possible current storage nodes to which objects are assigned for repair, then the added storage node will be complete after processing of block 602 finishes for all the possible current storage nodes to which objects are assigned for repair.

At block 603 of the illustrated embodiment, the ESI I is deleted from the end of the list of transient ESIs (since it is assigned to the added storage node). Further, at block 603 of the illustrated embodiment a new ESI J is added to the beginning of the list of transient ESIs, where preferably ESI J is different from all ESIs in the list of transient ESIs and all ESIs assigned to storage nodes.

At block 604, all missing transient fragments associated with all SN ESIs in the list of transient ESIs are pre-generated and stored in supplemental storage of the current storage node for the next O/SN objects in the ordered list of objects. The amount of space used by the transient fragments pre-generated and stored in supplemental storage in block 604 is at most O fragments in size, i.e., up to SN transient fragments for each of O/SN objects may be pre-generated and stored in the supplemental space of the current storage node.

The following highlights some advantages of the exemplary embodiment described above with reference to FIG. 6. In operation of flow 600, suppose at some point in time that the ith object in the ordered list of objects has ceiling (i·SN/O) transient fragments stored in supplemental storage of the current storage node, where ceiling(x) indicates the smallest integer greater than or equal to x. Then, it is straightforward to argue that at any later point in time: (1) there will be a transient fragment associated with ESI I for all O objects stored in supplemental storage of the current storage node at the start of execution of block 602; (2) the total amount of space used to store transient fragments in supplemental storage on the current storage node is approximately the size of SN·O/2 fragments; and (3) on average, the amount of read repair bandwidth used to pre-generate transient fragments is $\lambda \cdot O \cdot Osize/SN$, where $\lambda$ is the rate at which storage nodes are added to the system (which typically is the same rate at which nodes fail), and where Osize is the size of each object. Note that the amount of space used for storing transient fragments in supplemental storage is approximately one-half that of previously described liquid systems using the same amount of read repair bandwidth when RN is relatively small compared to M (in preferred embodiments, RN is relatively small compared to M).

Another advantage of the exemplary embodiment described above with reference to FIG. 6 is that when transient fragments are pre-generated at a current storage node and stored on the current storage node in supplemental storage (block 604), the only repair traffic that travels over the network (from one node to the other) is the traffic to read fragments for an object to pre-generate transient fragments, and the transient fragments so pre-generated transient fragments do not travel over the network at this point but instead are stored locally at the current storage node. Eventually (in block 602), the transient fragments so pre-generated are transferred over the network to a permanent storage node. Thus, overall, each fragment read by the pre-storage repair policy and each transient fragment pre-generated by the pre-storage repair policy is moved over the network at most once.

There are many variants of the fragment pre-storage repair policy described above that provide additional benefits. For example, instead of triggering repair of objects (block 604) based on adding a storage node to the system (block 601), the repair traffic can be smoothed out. An embodiment adapted to provide such smoothed repair traffic may, for example, use a leaky bucket implementation wherein an added storage node count c is maintained to indicate the amount of repair work that has been triggered by added storage nodes that has not yet been executed. Thus, when a storage node is added, the added storage node count c is incremented by one to indicate a storage node has been added but the corresponding repair has not been performed.

Then, repair can proceed at a regular rate, and as repair occurs the added storage node count c can be decremented (including fractional decrements), wherein the decrement is by an amount of one when an aggregate of O/SN objects have been repaired. Then, the repair rate can be smoothly moderated by basing the repair rate on the value of c so that c maintains a value between zero and a predetermined upper bound B while at the same time maintaining a relative smooth rate of decrease of c (where the rate of decrease of c is determined by the repair rate). As another variant, there may be a target value for c, i.e., a positive value T, wherein the current read rate R of the pre-storage repair policy is set to $e^{\Psi(c-T)} \cdot L \cdot O/SN$, where $\Psi$ is a fixed positive value, and L is a current average rate at which fragment data is lost from the system due to failing nodes. A potential cost of providing smoothness in the repair rate is slightly additional space for transient fragments in supplemental storage, wherein the additional space depends on B. An advantage is that the peak read repair rate can be smoothed to essentially equal the average read repair rate, wherein the smoothness depends on B.

As another variant, the transient fragments in supplemental storage on the current storage node can be moved at a smoother rate to permanent storage on the added storage node assigned their associated ESI (block 602), using methods similar to those described above for smoothing the read repair rate of the pre-storage repair policy. For example, instead of immediately moving the transient fragments to permanent storage on the added storage node, the movement of transient fragments can be performed at a smooth rate. A potential cost of providing smoothness is that the value of RN may be larger, in order to ensure that there are enough complete storage nodes at all points in time, as an added storage node for which all fragments have not been moved for all objects is not complete. An advantage is that the peak repair bandwidth used for moving transient fragments to permanent storage on added storage nodes can be much lower, approaching the average repair bandwidth for this movement.

As another variant, when a current storage node fails, all of the transient fragments stored in supplemental storage are lost (as well as the fragments stored in permanent storage associated with the ESI assigned to the current storage node). Thus, when a current storage node fails, all objects assigned for repair to the current storage node are reassigned to other current storage nodes for repair according to this variant. As still another variant, as the pre-storage repair policy is being executed on a current storage node, the objects assigned to that current storage node for repair may be re-assigned to other storage nodes for repair. For example, a current storage node that is currently responsible for a larger than average number of objects (or a larger than average amount of data of source objects if objects are not equal-sized) may re-assign a fraction of the objects to other nodes for repair as the objects arrive at the head of the repair queue.

As other variants, there are many different alternatives for deciding which transient ESIs, and how many transient ESIs, to add to the future repair queue. For example, one alternative is to have an ordered pool of potential ESIs P, where the number of ESIs in P is at least the maximum of the number of transient ESIs and permanent ESIs at any point in time for the system. Each time a transient ESI is to be added to the future repair queue, the smallest ESI in the pool P that is not either a transient ESI or a permanent ESI is used. As another variant, the pool of potential ESIs P may exclude any ESI that corresponds to a source fragment. As another variant, the next ESI added to the list of transient ESIs may be selected to be a source ESI whenever there is a source ESI that is not currently in the list of transient ESIs and not a permanent ESI. Which ESIs to add to the list of transient ESIs may also be determined, at least in part, based on the set of currently permanent ESIs and current list of transient ESIs and which combinations of additional ESIs would most improve the reliability of decoding, for example when using an FEC code that is not a priori known to be MDS, such as the RaptorQ code.

As another variant, the set of current storage nodes that are responsible for executing the pre-storage repair policy may not be the set of all currently active storage nodes, but instead may be restricted to a subset. For example, such current storage nodes may be restricted to those storage nodes that are partial storage nodes, i.e., storage nodes that are not complete.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, implemented by processor-based logic of a storage system storing source objects as a plurality of erasure coded fragments, for pre-storing transient fragments for one or more of the source objects, the method comprising:
   generating, by a repair process of the processor-based logic, fragments for a first source object represented in a repair queue, wherein the generated fragments include first one or more fragments generated for subsequent storage on one or more storage nodes that are not physically present in the storage system at a time of the generating the fragments for the first source object; and
   storing the first one or more fragments generated for subsequent storage on the one or more storage nodes that are not physically present as first one or more transient fragments temporarily stored for moving to an added storage node corresponding to the one or more storage nodes that are not physically present when the corresponding added storage node is physically present in the storage system.

2. The method of claim 1, further comprising:
   moving at least one transient fragment of the first one or more transient fragments to a storage node added to the storage system after the generating of the fragments for the first source object, wherein the added storage node comprises the added storage node corresponding to the one or more storage nodes not physically present for the at least one transient fragment, and wherein the moved at least one transient fragment becomes a fragment assigned to the added storage node and is no longer a temporarily stored transient fragment.

3. The method of claim 2, wherein a number of the first one or more fragments generated for subsequent storage on the one or more storage nodes that are not physically present is equal to a number of storage nodes supplemented by operation of the repair process.

4. The method of claim 1, further comprising:
generating, by the repair process of the processor-based logic, fragments for a second source object represented in the repair queue, wherein the generated fragments include second one or more fragments generated for subsequent storage on the one or more storage nodes which are not physically present in the storage system at a time of the generating the fragments for the second source object; and
storing the second one or more fragments generated for subsequent storage on the one or more storage nodes that are not physically present as second one or more transient fragments temporarily stored for moving to the added storage node when the corresponding added storage node is physically present in the storage system.

5. The method of claim 4, further comprising:
moving at least one transient fragment of the first one or more transient fragments and at least one transient fragment of the second one or more transient fragments to a storage node added to the storage system after the generating of the fragments for the first source object and the fragments for the second source object, wherein the added storage node comprises the corresponding added storage node corresponding to the one or more storage nodes not physically present for the moved at least one transient fragments, and wherein the moved at least one transient fragments become fragments assigned to the added storage node and are no longer temporarily stored transient fragments.

6. The method of claim 4, wherein a number of the first one or more fragments generated for subsequent storage on the one or more storage nodes that are not physically present and a number of the second one or more fragments generated for subsequent storage on the one or more storage nodes that are not physically present are equal.

7. The method of claim 1, further comprising:
generating, by the repair process of the processor-based logic, fragments for a second source object represented in the repair queue, wherein the generated fragments include fragments for the second source object which are assigned to existing storage nodes which are physically present in the storage system at a time of generating the fragments for the second source object without generating second one or more fragments generated for subsequent storage on the one or more storage nodes that are not physically present in the storage system at the time of the generating the fragments for the second source object.

8. The method of claim 7, further comprising:
storing the fragments for the second source object to corresponding one or more existing storage nodes of the one or more existing storage nodes, wherein the storing the fragments for the second source object overwrites at least one transient fragment of the first one or more transient fragments.

9. The method of claim 1, wherein the first one or more transient fragments are stored in a portion of storage space of one or more existing storage nodes not utilized by fragments assigned to the one or more existing storage nodes, wherein the one or more existing storage nodes comprise one or more storage nodes which are physically present in the storage system at the time of the generating the fragments for the first source object.

10. The method of claim 9, wherein the portion of storage space is available to the repair process for storing fragments assigned to the one or more existing storage nodes but is unused for storing fragments assigned to the one or more existing storage nodes at the time of generating the fragments for the first source object.

11. The method of claim 9, wherein the portion of storage space is designated as storage space for transient fragments and is unavailable to the repair process for storing fragments assigned to the one or more existing storage nodes.

12. The method of claim 9, wherein the first one or more transient fragments are stored in the portion of storage space of the one or more existing storage nodes in a different orientation than the fragments assigned to the one or more existing storage nodes are stored in the one or more existing storage nodes.

13. The method of claim 12, wherein the different orientation comprises an orientation that is rotated and reflected with respect to the orientation of the fragments assigned to the one or more existing storage nodes to facilitate maintaining a proper fragment and storage node correspondence when the transient fragments are moved to a corresponding added storage node when the corresponding added storage node is physically present in the storage system.

14. An apparatus for pre-storing transient fragments for one or more source objects stored by a storage system as a plurality of erasure coded fragments, the apparatus comprising:
one or more data processors; and
one or more non-transitory computer-readable storage media containing program code configured to cause the one or more data processors to perform operations including:
generating fragments for a first source object represented in a repair queue, wherein the generated fragments include first one or more fragments generated for subsequent storage on one or more storage nodes that are not physically present in the storage system at a time of the generating the fragments for the first source object; and
storing the first one or more fragments generated for subsequent storage on the one or more storage nodes that are not physically present as first one or more transient fragments temporarily stored for moving to an added storage node corresponding to the one or more storage nodes that are not physically present when the corresponding added storage node is physically present in the storage system.

15. The apparatus of claim 14, wherein the operations performed by the one or more data processors further includes:
moving at least one transient fragment of the first one or more transient fragments to a storage node added to the storage system after the generating of the fragments for the first source object, wherein the added storage node comprises the added storage node corresponding to the one or more storage nodes not physically present for the at least one transient fragment, and wherein the moved at least one transient fragment becomes a fragment assigned to the added storage node and is no longer a temporarily stored transient fragment.

16. The apparatus of claim 15, wherein the number of a first one or more fragments generated for subsequent storage on the one or more storage nodes that are not physically present is equal to a number of storage nodes supplemented by operation of a repair process.

17. The apparatus of claim 14, wherein the operations performed by the one or more data processors further includes:
generating fragments for a second source object represented in the repair queue, wherein the generated fragments include second one or more fragments generated for subsequent storage on the one or more storage nodes which are not physically present in the storage system at a time of the generating the fragments for the second source object; and
storing the second one or more fragments generated for subsequent storage on the one or more storage nodes that are not physically present as second one or more transient fragments temporarily stored for moving to the added storage node when the corresponding added storage node is physically present in the storage system.

18. The apparatus of claim 17, wherein the operations performed by the one or more data processors further includes:
moving at least one transient fragment of the first one or more transient fragments and at least one transient fragment of the second one or more transient fragments to a storage node added to the storage system after the generating of the fragments for the first source object and the fragments for the second source object, wherein the added storage node comprises the corresponding added storage node Corresponding to the one or more storage nodes not physically present for the moved at least one transient fragments, and wherein the moved at least one transient fragments become fragments assigned to the added storage node and are no longer temporarily stored transient fragments.

19. The apparatus of claim 17, wherein a number of the first one or more fragments generated for subsequent storage on the one or more storage nodes that are not physically present and a number of the second one or more fragments generated for subsequent storage on the one or more storage nodes that are not physically present are equal.

20. The apparatus of claim 14, wherein the operations performed by the one or more data processors further includes:
generating fragments for a second source object represented in the repair queue, wherein the generated fragments include fragments for the second source object which are assigned to existing storage nodes which are physically present in the storage system at a time of generating the fragments for the second source object without generating second one or more fragments generated for subsequent storage on the one or more storage nodes that are not physically present in the storage system at the time of the generating the fragments for the second source object.

21. The apparatus of claim 20, wherein the operations performed by the one or more data processors further includes:
storing the fragments for the second source object to corresponding one or more existing storage nodes of the one or more existing storage nodes, wherein the storing the fragments for the second source object overwrites at least one transient fragment of the first one or more transient fragments.

22. The apparatus of claim 14, wherein the first one or more transient fragments are stored in a portion of storage space of one or more existing storage nodes not utilized by fragments assigned to the one or more existing storage nodes, wherein the one or more existing storage nodes comprise one or more storage nodes which are physically present in the storage system at the time of the generating the fragments for the first source object.

23. The apparatus of claim 22, wherein the portion of storage space is available to a repair process for storing fragments assigned to the one or more existing storage nodes but is unused for storing fragments assigned to the one or more existing storage nodes at the time of generating the fragments for the first source object.

24. The apparatus of claim 22, wherein the portion of storage space is designated as storage space for transient fragments and is unavailable to a repair process for storing fragments assigned to the one or more existing storage nodes.

25. The apparatus of claim 22, wherein the first one or more transient fragments are stored in the portion of storage space of the one or more existing storage nodes in a different orientation than the fragments assigned to the one or more existing storage nodes are stored in the one or more existing storage nodes.

26. The apparatus of claim 25, wherein the different orientation comprises an orientation that is rotated and reflected with respect to the orientation of the fragments assigned to the one or more existing storage nodes to facilitate maintaining a proper fragment and storage node correspondence when the transient fragments are moved to a corresponding added storage node when the corresponding added storage node is physically present in the storage system.

27. An apparatus for pre-storing transient fragments for one or more source objects stored by a storage system as a plurality of erasure coded fragments, the apparatus comprising:
means for generating fragments for a first source object represented in a repair queue, wherein the generated fragments include first one or more fragments generated for subsequent storage on one or more storage nodes that are not physically present in the storage system at a time of the generating the fragments for the first source object; and
means for storing the first one or more fragments generated for subsequent storage on the one or more storage nodes that are not physically present as first one or more transient fragments temporarily stored for moving to an added storage node corresponding to the one or more storage nodes that are not physically present when the corresponding added storage node is physically present in the storage system.

28. The apparatus of claim 27, further comprising:
means for moving at least one transient fragment of the first one or more transient fragments to a storage node added to the storage system after the generating of the fragments for the first source object, wherein the added storage node comprises the added storage node corresponding to the one or more storage nodes not physically present for the at least one transient fragment, and wherein the moved at least one transient fragment becomes a fragment assigned to the added storage node and is no longer a temporarily stored transient fragment.

29. The apparatus of claim 28, wherein a number of the first one or more fragments generated for subsequent storage on the one or more storage nodes that are not physically present is equal to a number of storage nodes supplemented by operation of a repair process.

30. The apparatus of claim 27, further comprising:
means for generating fragments for a second source object represented in the repair queue, wherein the generated fragments include second one or more fragments generated for subsequent storage on the one or more storage nodes which are not physically present in the storage system at a time of the generating the fragments for the second source object; and means for storing the second one or more fragments generated for subsequent storage on the one or more storage nodes that are not physically present as second one or more transient fragments temporarily stored for moving to the added storage node when the corresponding added storage node is physically present in the storage system.

31. The apparatus of claim 30, further comprising:

means for moving at least one transient fragment of the first one or more transient fragments and at least one transient fragment of the second one or more transient fragments to a storage node added to the storage system after the generating of the fragments for the first source object and the fragments for the second source object, wherein the added storage node comprises the corresponding added storage node corresponding to the one or more storage nodes not physically present for the moved at least one transient fragments, and wherein the moved at least one transient fragments become fragments assigned to the added storage node and are no longer temporarily stored transient fragments.

32. The apparatus of claim 27, further comprising:

means for generating fragments for a second source object represented in the repair queue, wherein the generated fragments include fragments for the second source object which are assigned to existing storage nodes which are physically present in the storage system at a time of generating the fragments for the second source object without generating second one or more fragments generated for subsequent storage on the one or more storage nodes that are not physically present in the storage system at the time of the generating the fragments for the second source object.

33. The apparatus of claim 32, further comprising:

means for storing the fragments for the second source object to corresponding one or more existing storage nodes of the one or more existing storage nodes, wherein the storing the fragments for the second source object overwrites at least one transient fragment of the first one or more transient fragments.

34. A non-transitory computer-readable medium comprising codes for pre-storing transient fragments for one or more source objects stored by a storage system as a plurality of erasure coded fragments, the codes causing a computer to:

generate fragments for a first source object represented in a repair queue, wherein the generated fragments include first one or more fragments generated for subsequent storage on one or more storage nodes that are not physically present in the storage system at a time of generating the fragments for the first source object; and store the first one or more fragments generated for subsequent storage on the one or more storage nodes that are not physically present as first one or more transient fragments temporarily stored for moving to an added storage node corresponding to the one or more storage nodes that are not physically present when the corresponding added storage node is physically present in the storage system.

35. The non-transitory computer-readable medium of claim 34, the codes further cause the computer to:

move at least one transient fragment of the first one or more transient fragments to a storage node added to the storage system after generating the fragments for the first source object, wherein the added storage node comprises the added storage node corresponding to the one or more storage nodes not physically present for the at least one transient fragment, and wherein the moved at least one transient fragment becomes a fragment assigned to the added storage node and is no longer a temporarily stored transient fragment.

36. The non-transitory computer-readable medium of claim 34, the codes further cause the computer to:

generate fragments for a second source object represented in the repair queue, wherein the generated fragments include second one or more fragments generated for subsequent storage on the one or more storage nodes which are not physically present in the storage system at a time of generating the fragments for the second source object; and store the second one or more fragments generated for subsequent storage on the one or more storage nodes that are not physically present as second one or more transient fragments temporarily stored for moving to the added storage node when the corresponding added storage node is physically present in the storage system.

37. The non-transitory computer-readable medium of claim 36, the codes further cause the computer to:

move at least one transient fragment of the first one or more transient fragments and at least one transient fragment of the second one or more transient fragments to a storage node added to the storage system after generating the fragments for the first source object and the fragments for the second source object, wherein the added storage node comprises the corresponding added storage node corresponding to the one or more storage nodes not physically present for the moved at least one transient fragments, and wherein the moved at least one transient fragments become fragments assigned to the added storage node and are no longer temporarily stored transient fragments.

38. The non-transitory computer-readable medium of claim 34, the codes further cause the computer to:

generate fragments for a second source object represented in the repair queue, wherein the generated fragments include fragments for the second source object which are assigned to existing storage nodes which are physically present in the storage system at a time of generating the fragments for the second source object without generation of second one or more fragments generated for subsequent storage on the one or more storage nodes that are not physically present in the storage system at the time of generating the fragments for the second source object.

39. The non-transitory computer-readable medium of claim 38, the codes further cause the computer to:

store the fragments for the second source object to a corresponding one or more existing storage nodes of the one or more existing storage nodes, wherein the storing the fragments for the second source object overwrites at least one transient fragment of the first one or more transient fragments.

\* \* \* \* \*